US011422692B2

(12) United States Patent
Kamath et al.

(10) Patent No.: US 11,422,692 B2
(45) Date of Patent: Aug. 23, 2022

(54) SYSTEM AND METHOD OF CONTROLLING DEVICES USING MOTION GESTURES

(71) Applicant: Apple Inc., Cupertino, CA (US)

(72) Inventors: Raghuram C. Kamath, San Jose, CA (US); Hameet Singh Oberoi, San Jose, CA (US); Iyappan Ramachandran, Santa Clara, CA (US); Jaemyung Lim, Sunnyvale, CA (US); Mohammad Shokoohi-Yekta, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/517,520

(22) Filed: Jul. 19, 2019

(65) Prior Publication Data

US 2020/0104038 A1 Apr. 2, 2020

Related U.S. Application Data

(60) Provisional application No. 62/738,339, filed on Sep. 28, 2018.

(51) Int. Cl.
    *G06F 3/04883* (2022.01)
    *G06F 3/01* (2006.01)
    *G06V 40/20* (2022.01)

(52) U.S. Cl.
    CPC .......... *G06F 3/04883* (2013.01); *G06F 3/017* (2013.01); *G06V 40/20* (2022.01)

(58) Field of Classification Search
    CPC ............. G06F 3/04883; G06F 3/04815; G06F 3/0487; G06F 3/0484; G06F 3/014;
    (Continued)

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| JP | 2000-163031 A | 6/2000 |
| JP | 2002-342033 A | 11/2002 |

(Continued)

OTHER PUBLICATIONS

J. Xu, Y. L. Dong and Y. Tang, "Gesture recognition based on wearable sensing," 2016 Chinese Control and Decision Conference (CCDC), Yinchuan, 2016, pp. 2763-2768. (Year: 2016).*

(Continued)

*Primary Examiner* — Kieu D Vu
*Assistant Examiner* — Rami R Okasha
(74) *Attorney, Agent, or Firm* — Kubota & Basol LLP

(57) ABSTRACT

In some embodiments, an electronic device performs an action in response to detection of a sequence of one or more motion gestures. Motion gesture information of a first electronic device optionally includes a first portion representing a respective attitude of the first electronic device relative to a frame of reference and a second portion that includes movement of the first electronic device from the respective attitude of the first electronic device. In accordance with a determination that the movement of the first electronic device during the second portion of the motion gesture meets movement criteria for a movement gesture that corresponds to the respective attitude of the first electronic device, a process is initiated to control the first electronic device or a second electronic device in accordance with the second portion of the motion gesture.

48 Claims, 66 Drawing Sheets

(58) Field of Classification Search
CPC ............ G06F 3/017; G06F 2203/0381; G06F 2203/0383; G06F 3/167; G06F 3/0346; G06K 9/00335; G06V 40/20
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,570,557 B1 | 5/2003 | Westerman et al. | |
| 6,677,932 B1 | 1/2004 | Westerman | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 8,570,273 B1* | 10/2013 | Smith .................. | G06F 3/0338 345/156 |
| 9,348,458 B2 | 5/2016 | Hotelling et al. | |
| 9,354,709 B1* | 5/2016 | Heller .................... | G06F 3/017 |
| 9,532,723 B2 | 1/2017 | Kim et al. | |
| 9,662,568 B2* | 5/2017 | Ohta ..................... | A63F 13/211 |
| 9,933,937 B2 | 4/2018 | Lemay et al. | |
| 10,171,643 B2* | 1/2019 | Liedholm ........... | H04M 1/7253 |
| 10,515,623 B1* | 12/2019 | Grizzel ................. | G10L 15/187 |
| 10,600,293 B2* | 3/2020 | McClintock ........... | G06F 3/017 |
| 2002/0015024 A1 | 2/2002 | Westerman et al. | |
| 2005/0190059 A1 | 9/2005 | Wehrenberg | |
| 2006/0017692 A1 | 1/2006 | Wehrenberg et al. | |
| 2006/0026521 A1 | 2/2006 | Hotelling et al. | |
| 2006/0033724 A1 | 2/2006 | Chaudhri et al. | |
| 2006/0097991 A1 | 5/2006 | Hotelling et al. | |
| 2006/0197753 A1 | 9/2006 | Hotelling | |
| 2008/0143676 A1* | 6/2008 | Choi ....................... | G06F 3/017 345/158 |
| 2009/0265671 A1* | 10/2009 | Sachs ................... | G06F 3/0346 715/863 |
| 2010/0328201 A1* | 12/2010 | Marvit ................. | G06F 1/1613 345/156 |
| 2012/0169482 A1* | 7/2012 | Chen ...................... | G08C 17/02 340/12.52 |
| 2012/0206350 A1* | 8/2012 | Figaro .................. | G06F 3/0346 345/158 |
| 2013/0033643 A1 | 2/2013 | Kim et al. | |
| 2013/0201113 A1* | 8/2013 | Hinckley ............ | G06F 3/04883 345/173 |
| 2013/0227418 A1* | 8/2013 | Sa ......................... | G06F 3/0488 715/728 |
| 2013/0229325 A1* | 9/2013 | Yu ........................... | G09G 5/12 345/2.3 |
| 2013/0229340 A1* | 9/2013 | Yu ......................... | G06F 3/1423 345/156 |
| 2013/0314238 A1* | 11/2013 | Li ......................... | G06F 1/1694 340/669 |
| 2014/0028539 A1* | 1/2014 | Newham ............... | G06F 1/1698 345/156 |
| 2014/0055351 A1* | 2/2014 | Shaw .................... | G06F 3/0346 345/156 |
| 2014/0139432 A1* | 5/2014 | Shaw ...................... | G06F 3/017 345/158 |
| 2014/0229845 A1* | 8/2014 | Ivanich ................ | H04N 5/4403 715/743 |
| 2014/0282270 A1* | 9/2014 | Slonneger ............... | G06F 3/017 715/863 |
| 2014/0306888 A1* | 10/2014 | Aoki ........................ | G06F 3/017 345/157 |
| 2014/0368422 A1* | 12/2014 | Gupta .................... | G06F 3/0304 345/156 |
| 2015/0012581 A1* | 1/2015 | Kim ........................ | H04W 4/80 709/201 |
| 2015/0123901 A1* | 5/2015 | Schwesinger ........... | G06F 3/011 345/158 |
| 2015/0160629 A1* | 6/2015 | Landers, Jr. .......... | G06F 1/1694 700/56 |
| 2015/0212593 A1* | 7/2015 | Wang ........................ | G06F 3/03 345/156 |
| 2015/0331490 A1* | 11/2015 | Yamada .................. | G06F 3/017 345/156 |
| 2015/0362998 A1* | 12/2015 | Park ........................ | G06F 3/017 345/173 |
| 2015/0381798 A1* | 12/2015 | Yoon ...................... | H04W 4/80 455/411 |
| 2016/0018887 A1* | 1/2016 | Tsukahara ............. | G06F 1/1694 345/8 |
| 2016/0034051 A1 | 2/2016 | Xi et al. | |
| 2016/0065847 A1* | 3/2016 | Jiang ........................ | G06F 3/017 348/207.1 |
| 2016/0085311 A1 | 3/2016 | Midholt et al. | |
| 2016/0092504 A1* | 3/2016 | Mitri ..................... | G06F 16/245 707/737 |
| 2016/0103501 A1* | 4/2016 | Rabii ..................... | G06F 3/0346 345/156 |
| 2016/0357265 A1 | 12/2016 | Maani | |
| 2016/0358460 A1* | 12/2016 | Lee ...................... | H04M 1/7253 |
| 2017/0064071 A1* | 3/2017 | Won ..................... | H04M 1/7253 |
| 2017/0123487 A1 | 5/2017 | Hazra et al. | |
| 2018/0322774 A1* | 11/2018 | Wang .................... | G08C 17/02 |

FOREIGN PATENT DOCUMENTS

| | | |
|---|---|---|
| WO | 2013/169849 A2 | 11/2013 |
| WO | 2014/105276 A1 | 7/2014 |
| WO | 2019/095050 A1 | 5/2019 |

OTHER PUBLICATIONS

Lee, et al., "A Multi-Touch Three Dimensional Touch-Sensitive Tablet", CHI'85 Proceedings, Apr. 1985, pp. 21-25.
Rubine, Dean H., "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Shokhoohi-Yekta, et al., "Generalizing Dynamic Time Warping to the Multi-Dimensional Case Requires an Adaptive Approach", 2015, 39 pages.
Shokoohi-Yekta, et al., "On the Non-Trivial Generalization of Dynamic Time Warping to the Multi-Dimensional Case", SIAM, Available online at: <http://www.siam.org/journals/ojsa.php>. Accessed on Jun. 26, 2018, pp. 289-297.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
International Search Report received for PCT Patent Application No. PCT/US2019/049009, dated Feb. 4, 2020, 5 pages.
Invitation to Pay Additional Fees received for PCT Patent International Application No. PCT/US2019/049009, dated Dec. 11, 2019, 15 pages.

* cited by examiner

700

702 — Obtain first gesture information describing a motion gesture performed by a first electronic device, wherein the motion gesture includes a first portion that includes detection of a respective attitude of the first electronic device relative to a respective frame of reference followed by detection of a second portion that includes movement of the first electronic device from the respective attitude of the first electronic device relative to the respective frame of reference

704 — In response to obtaining the first gesture information

706 — In accordance with a determination that the motion gesture satisfies gesture-control criteria that are satisfied when the movement of the first electronic device during the second portion of the motion gesture meets movement criteria for a movement gesture that corresponds to the respective attitude of the first electronic device, initiate a process to control the first electronic device or a second electronic device in accordance with the second portion of the movement gesture

708 — In accordance with a determination that the motion gesture does not satisfy the gesture-control criteria because the movement of the first electronic device during the second portion of the motion gesture does not meet the movement criteria for a movement gesture that corresponds to the respective attitude of the first electronic device, forgo initiating the process to control the first electronic device or the second electronic device in accordance with the second portion of the movement gesture (A)

FIG. 7A

SYSTEM AND METHOD OF CONTROLLING DEVICES USING MOTION GESTURES

CROSS-REFERENCE TO RELATED APPLICATION

This application claims benefit of U.S. Provisional Patent Application No. 62/738,339, filed Sep. 28, 2018, the contents of which are hereby incorporated by reference in their entirety for all purposes.

FIELD OF THE DISCLOSURE

This relates generally to electronic devices that perform one or more actions in response to detection of a sequence of one or more motion gestures, and user interactions with such devices.

BACKGROUND

User interaction with electronic devices has increased significantly in recent years. These devices can be devices such as computers, tablet computers, televisions, multimedia devices, mobile devices, and the like.

In some circumstances, users wish to control electronic devices using motion gestures. Enhancing these interactions improves the user's experience with the device and decreases user interaction time, which is particularly important where input devices are battery-operated.

SUMMARY

Some embodiments described in this disclosure are directed to one or more electronic devices that perform actions in response to detection of a sequence of one or more motion gestures. Some embodiments described in this disclosure are directed to one or more electronic devices that perform actions such as playing, pausing, fast forwarding, rewinding, or changing the playback volume of media playing on the one or more electronic devices.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 7A-7J are flow diagrams illustrating a method of performing an action in response to detection of a sequence of one or more motion gestures in accordance with some embodiments of the disclosure.

DETAILED DESCRIPTION

Figure 1A:
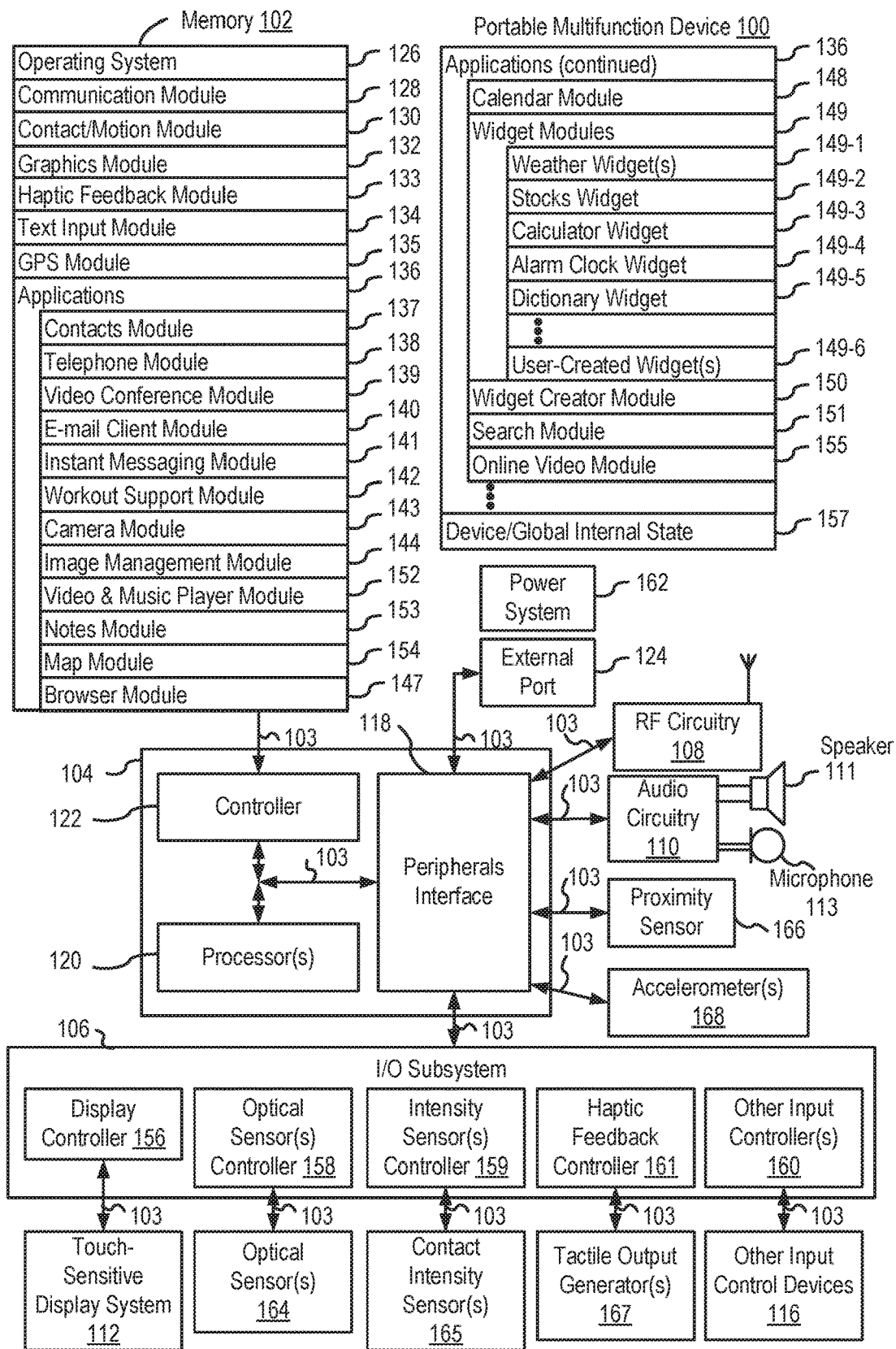
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods for controlling devices (e.g., the same device or other devices). Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
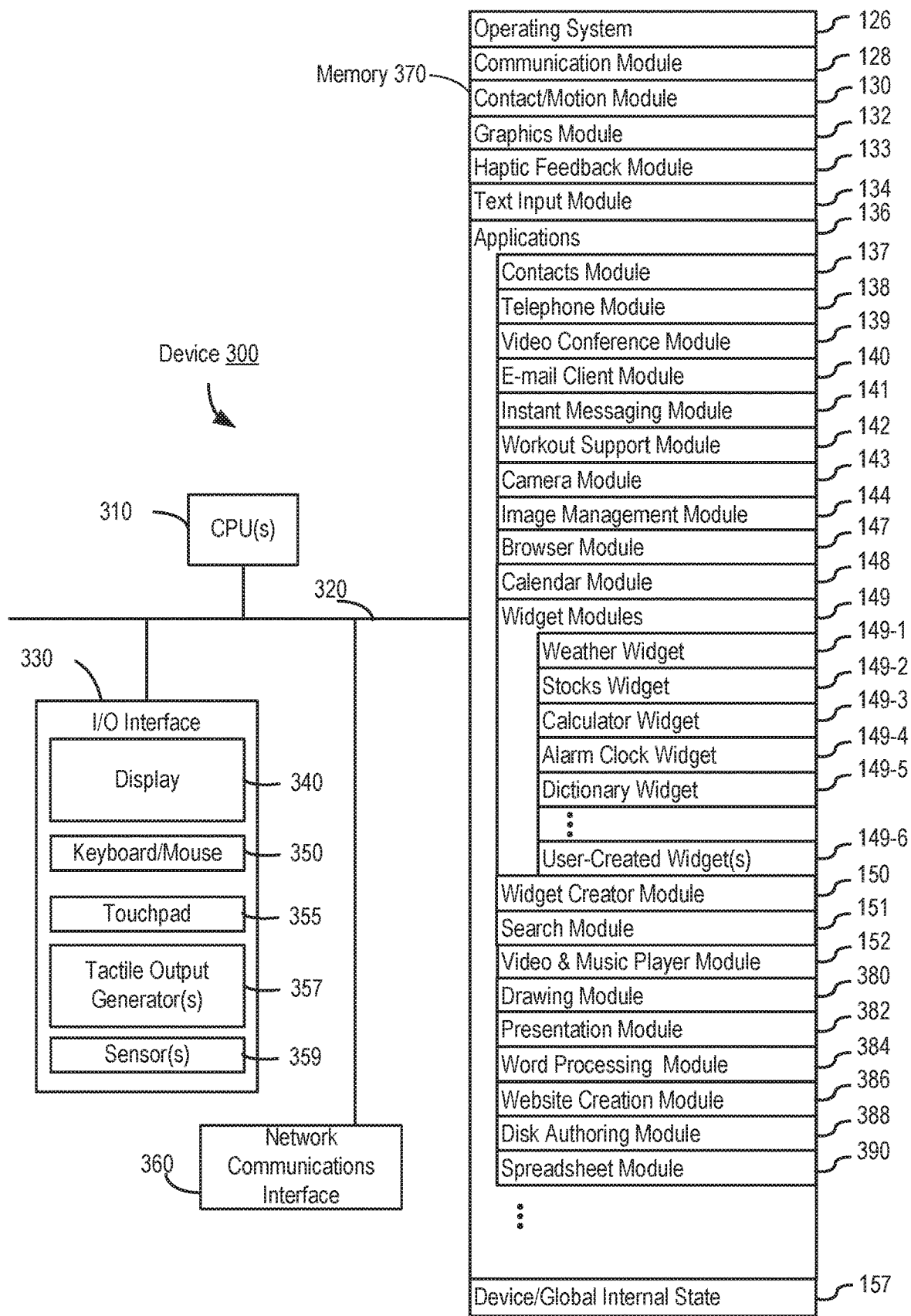
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
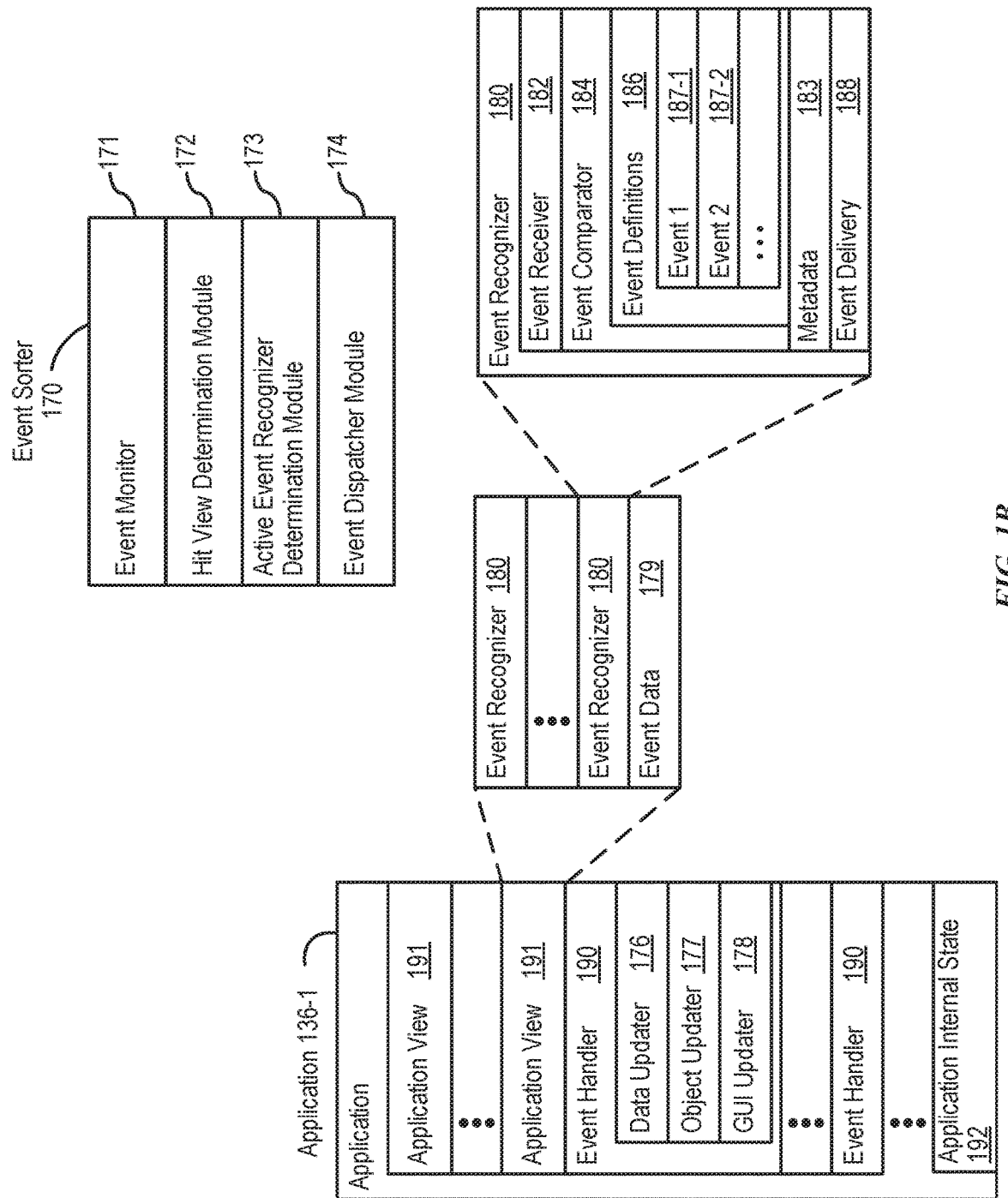
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
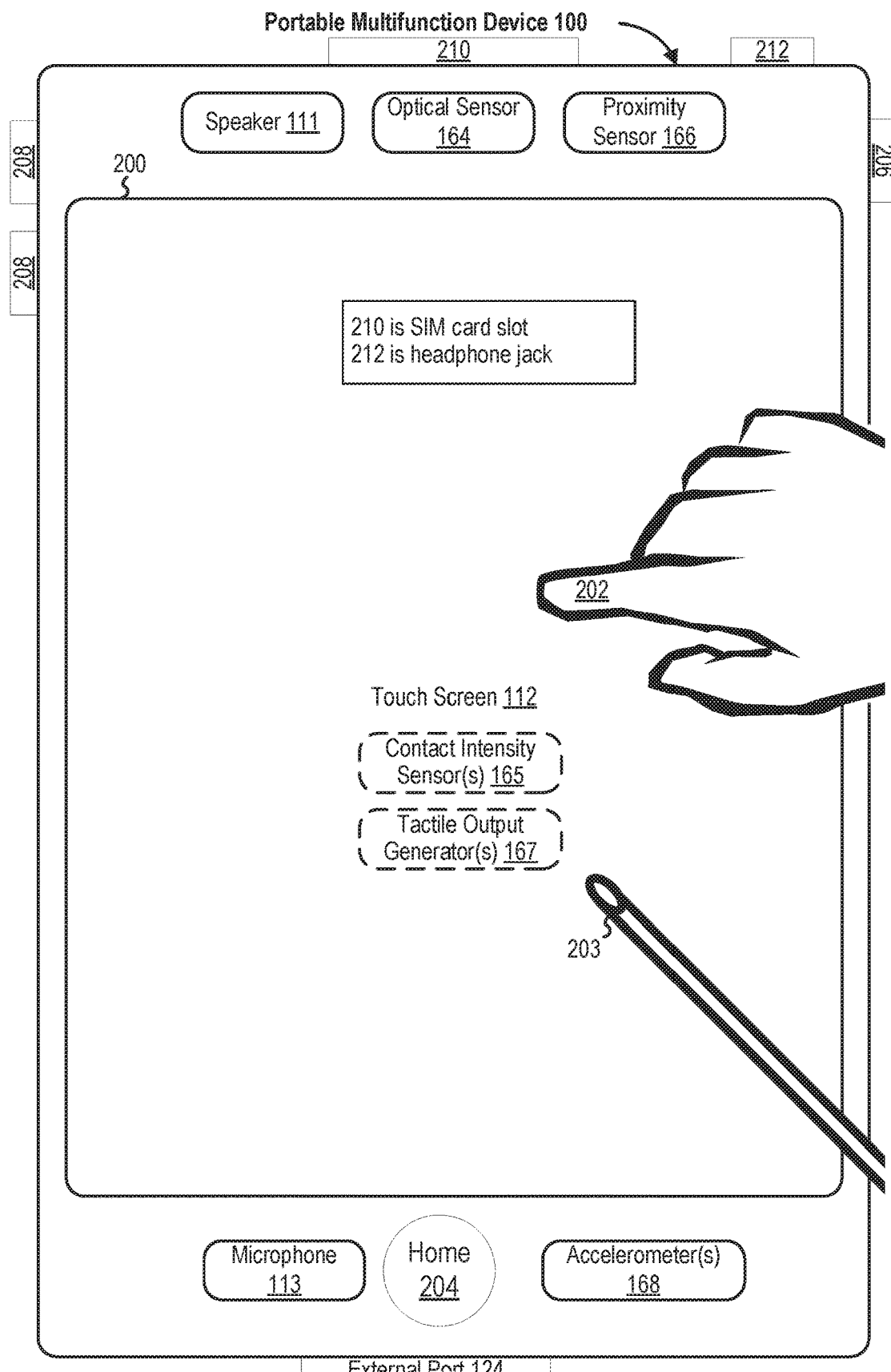
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
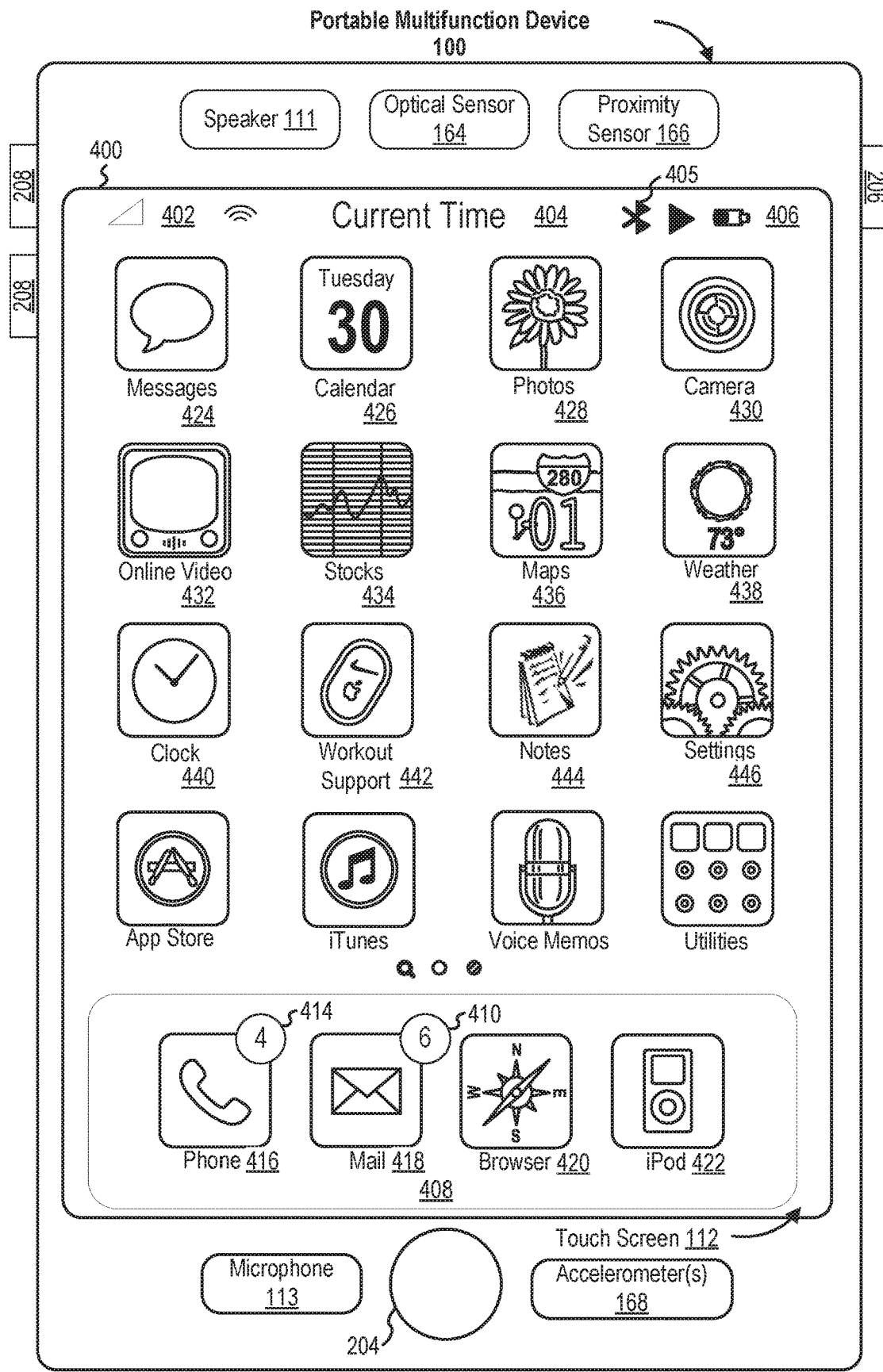
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
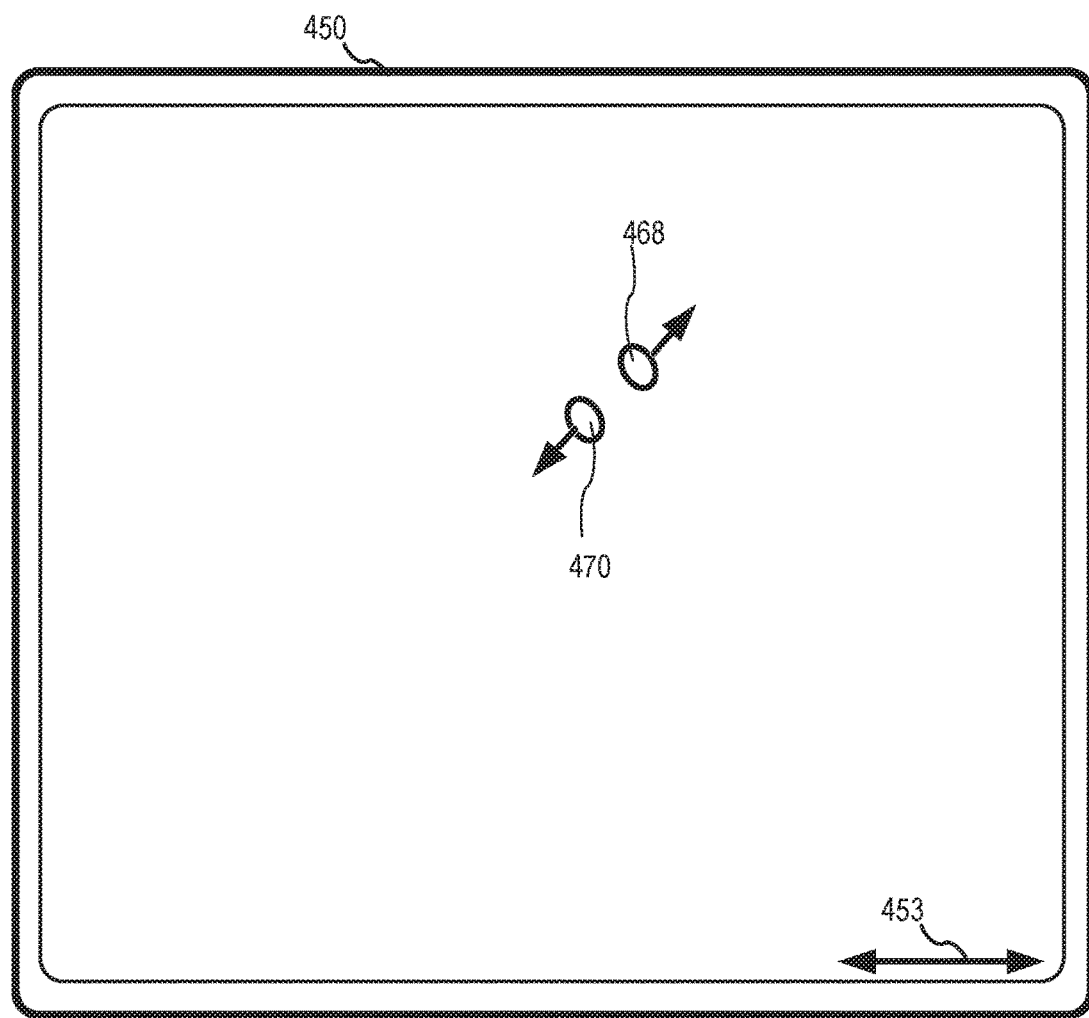
FIG. 4B illustrates an exemplary user interface for a multifunction device with a touch-sensitive surface that is separate from the display in accordance with some embodiments.
Figure 4B:
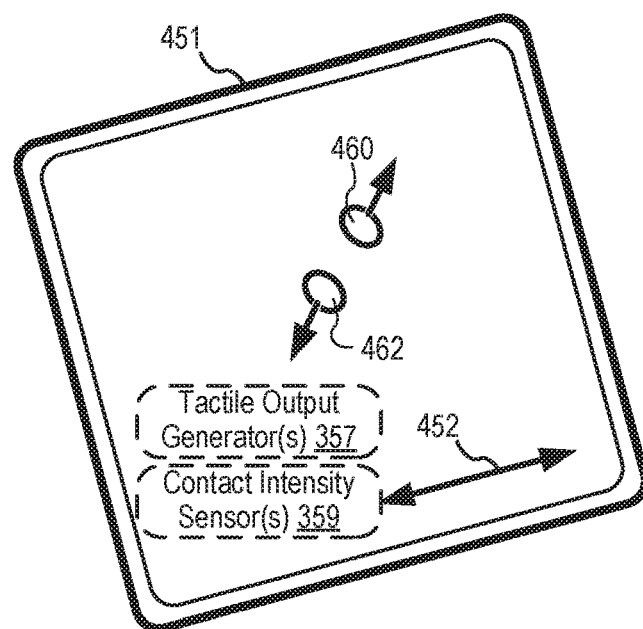

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
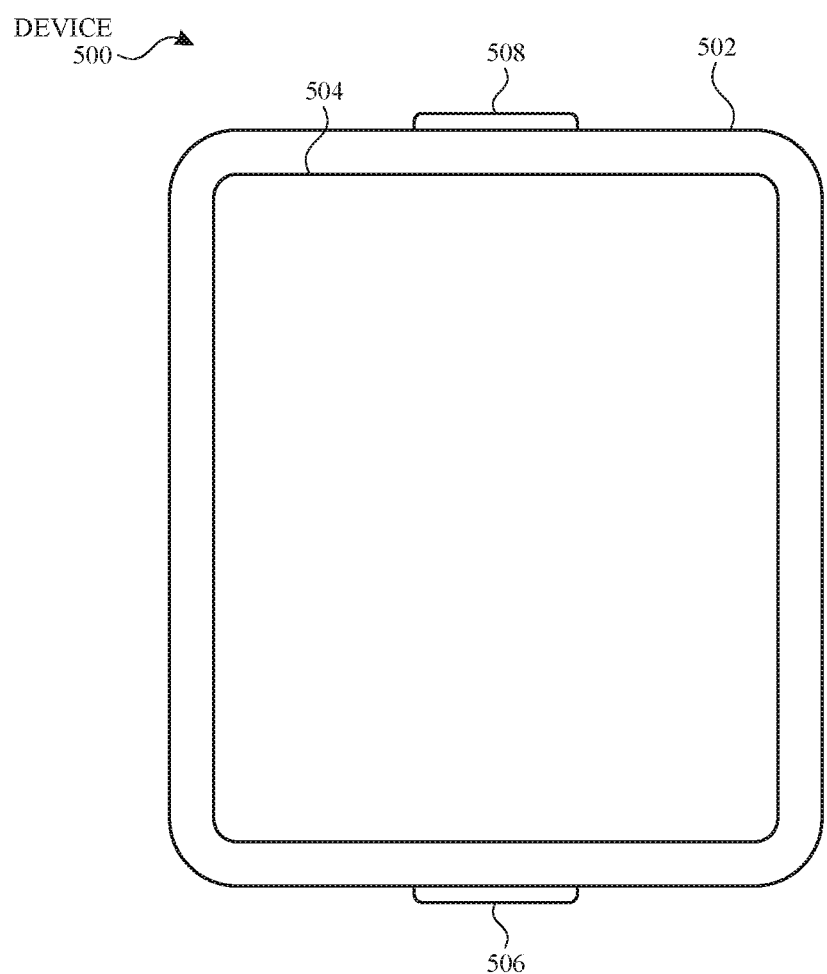
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
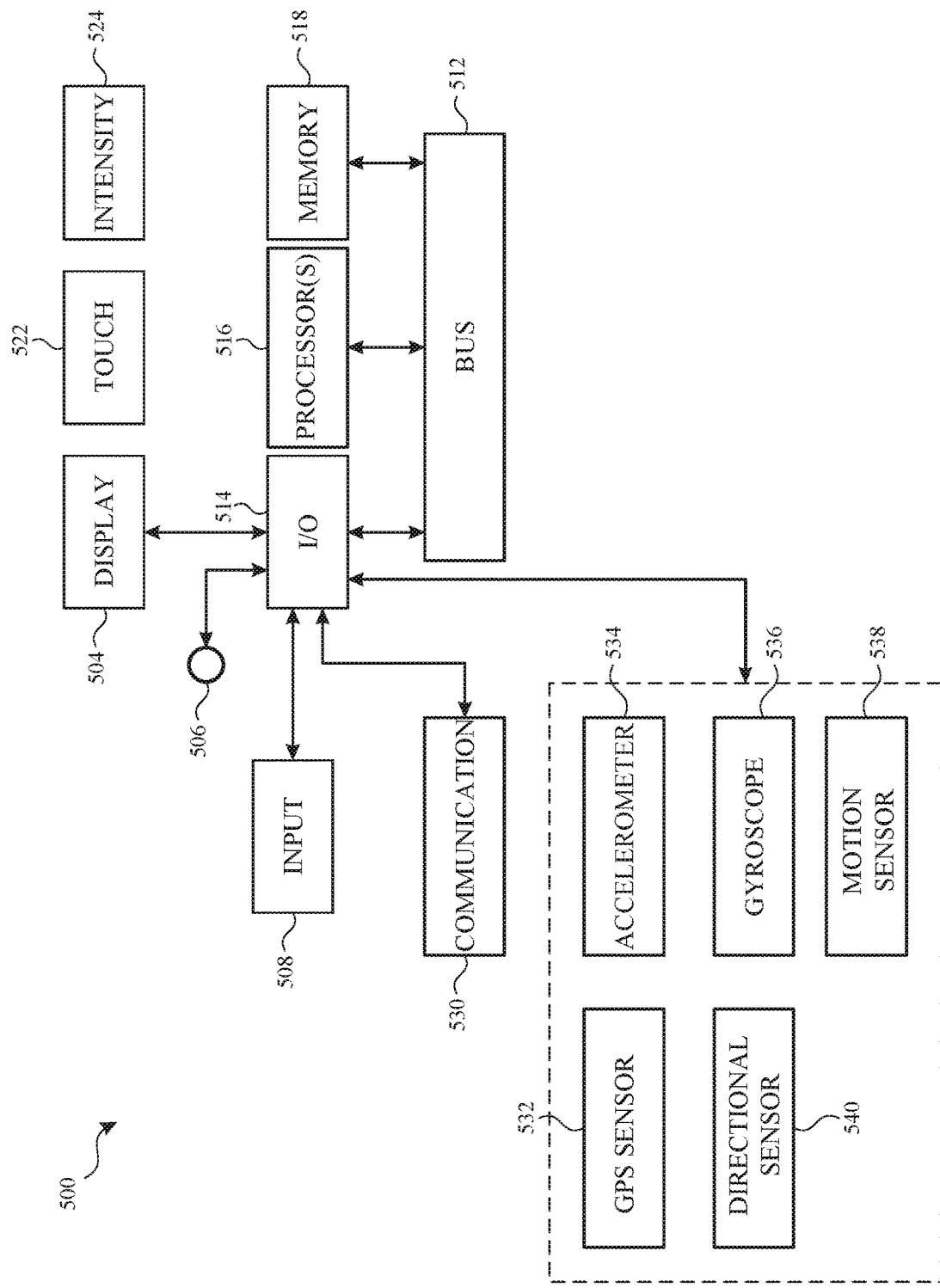
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
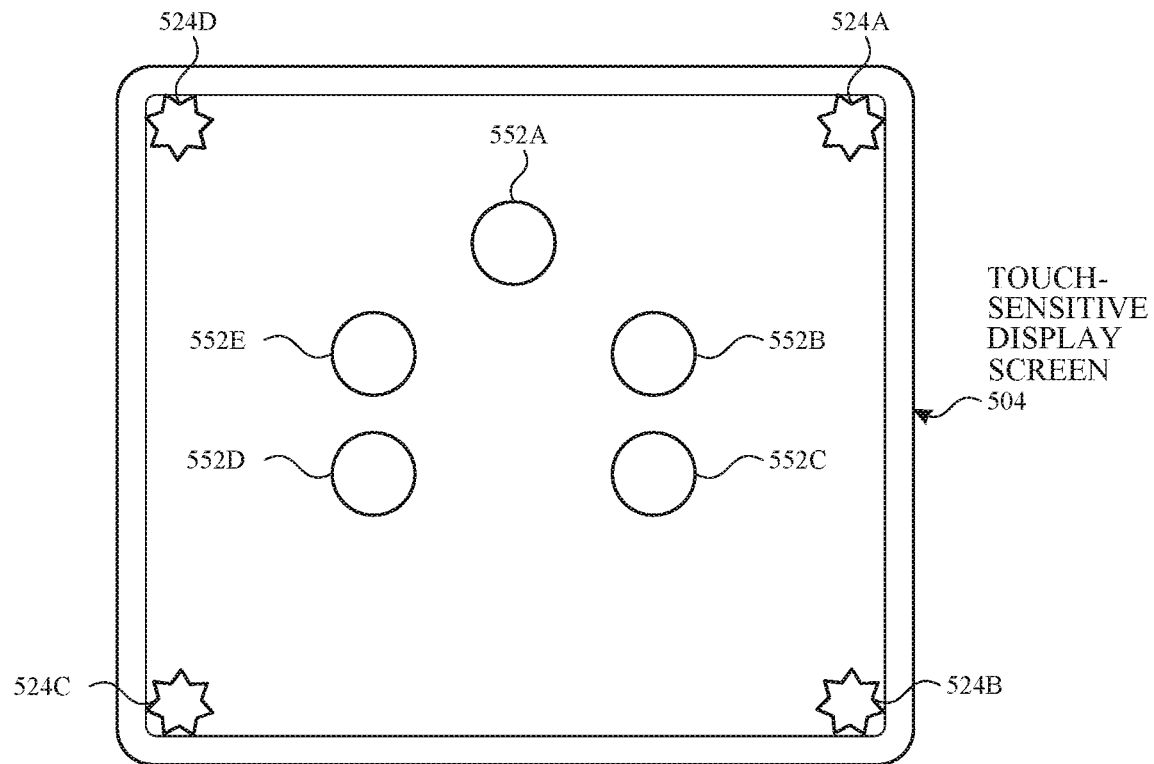
FIGS. 5C-5D illustrate exemplary components of a personal electronic device having a touch-sensitive display and intensity sensors in accordance with some embodiments.
Figure 5C:
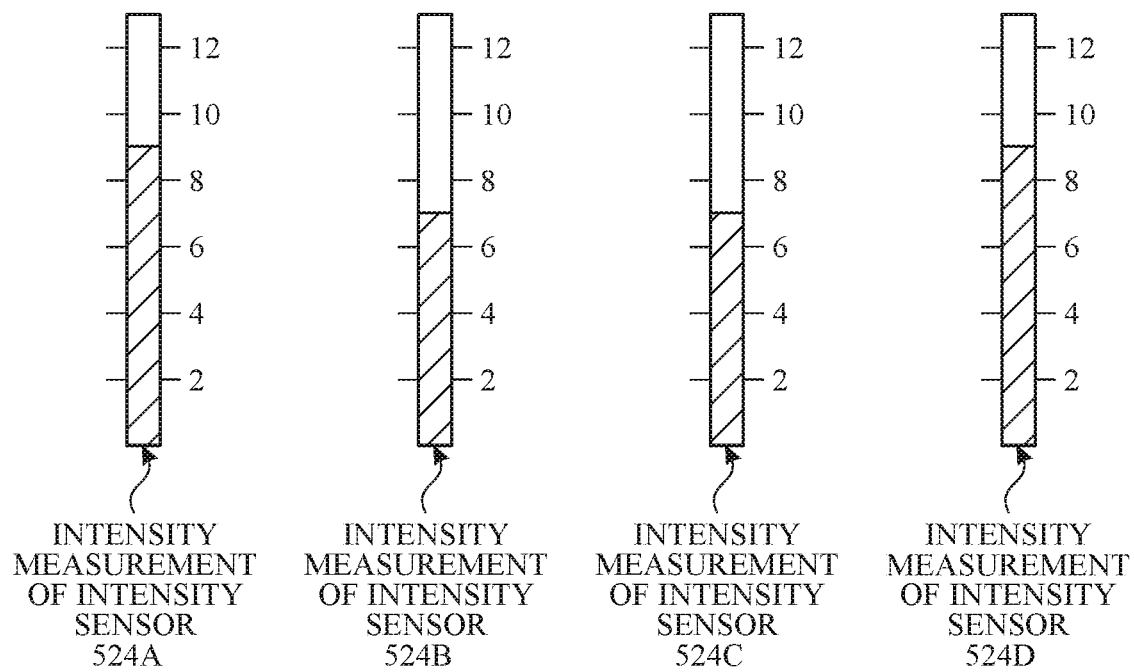
Figure 5D:
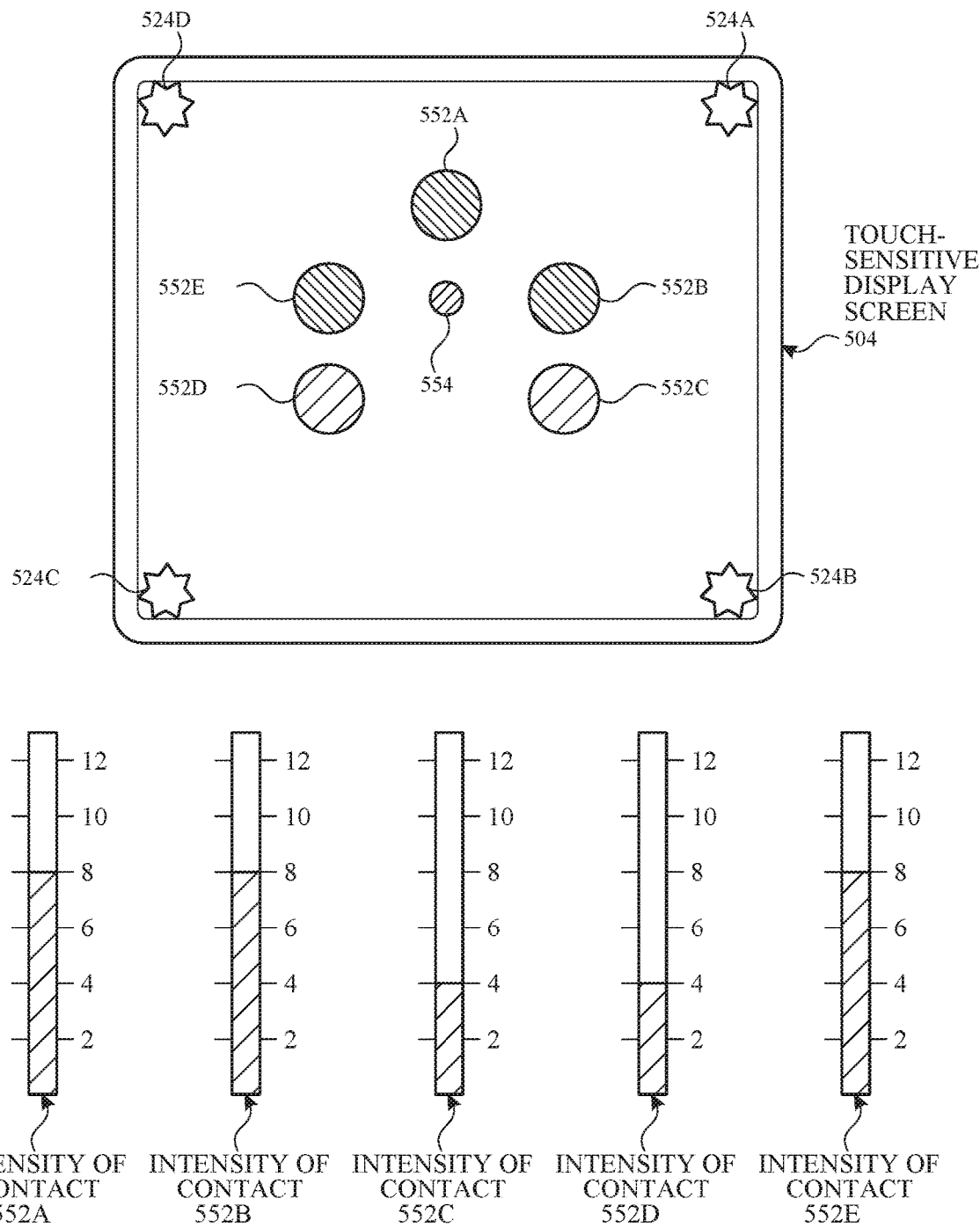

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
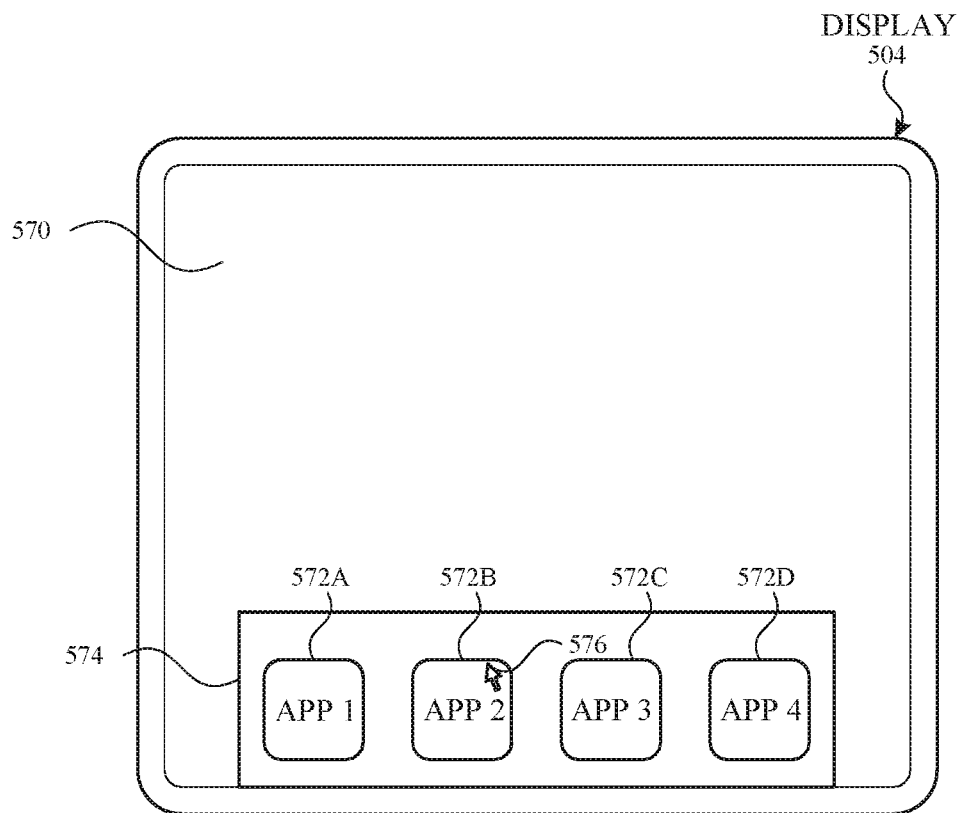
FIGS. 5E-5J illustrate exemplary components and user interfaces of a personal electronic device in accordance with some embodiments.
Figure 5E:
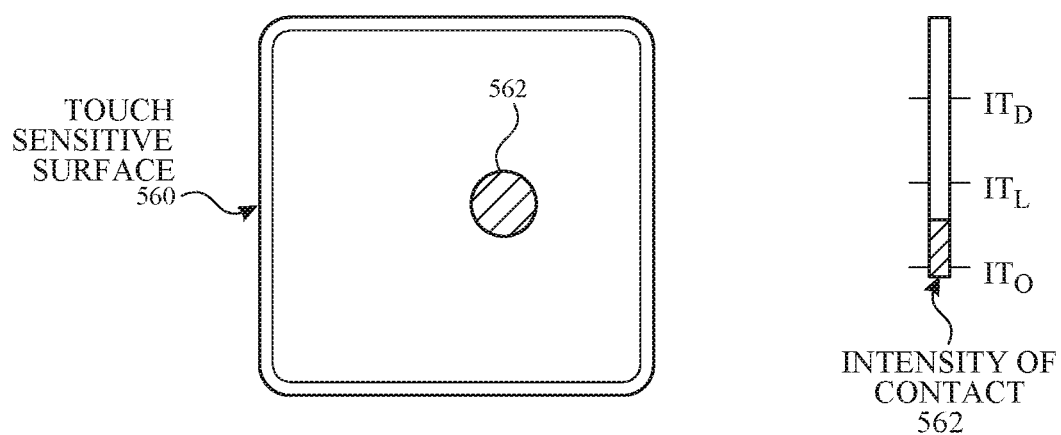
Figure 5F:
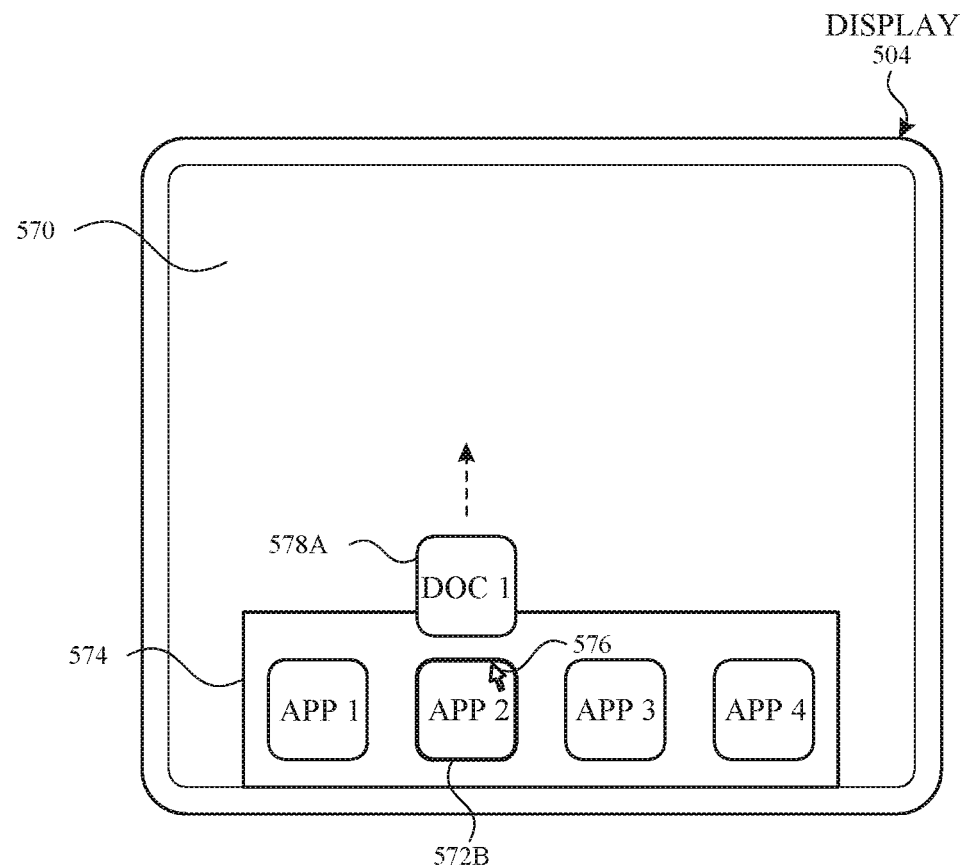
Figure 5F:
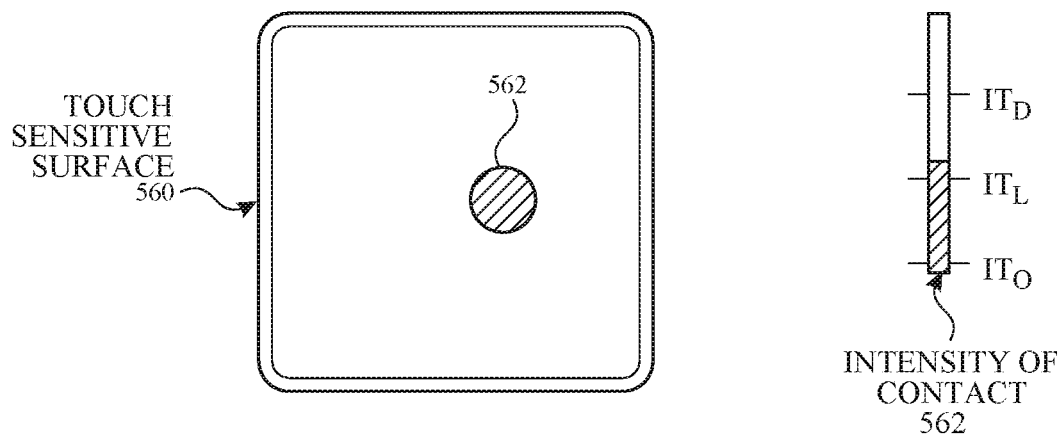
Figure 5G:
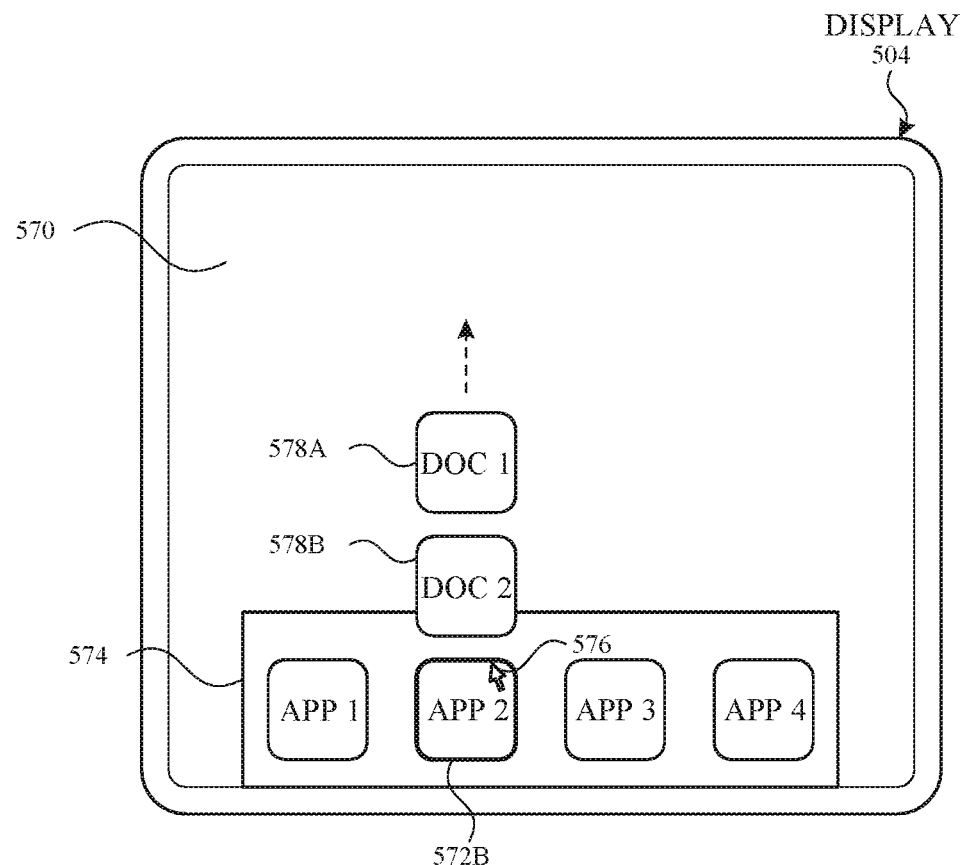
Figure 5G:
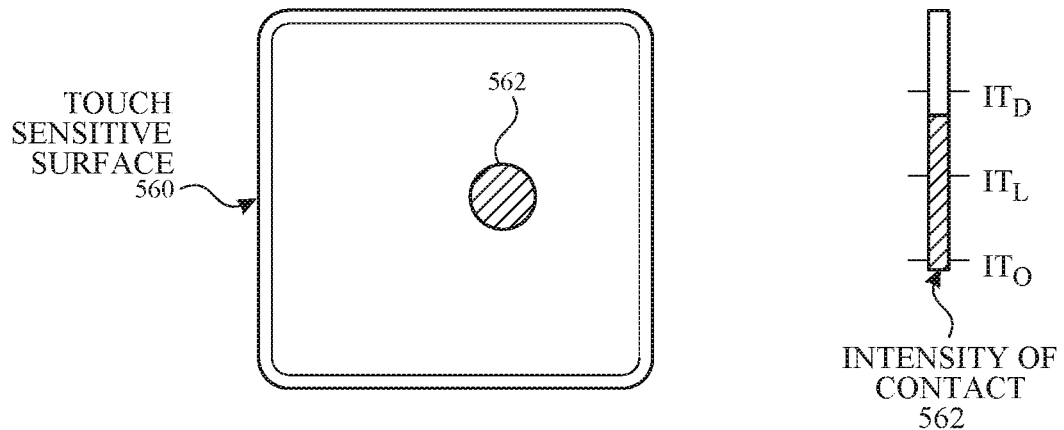
Figure 5H:
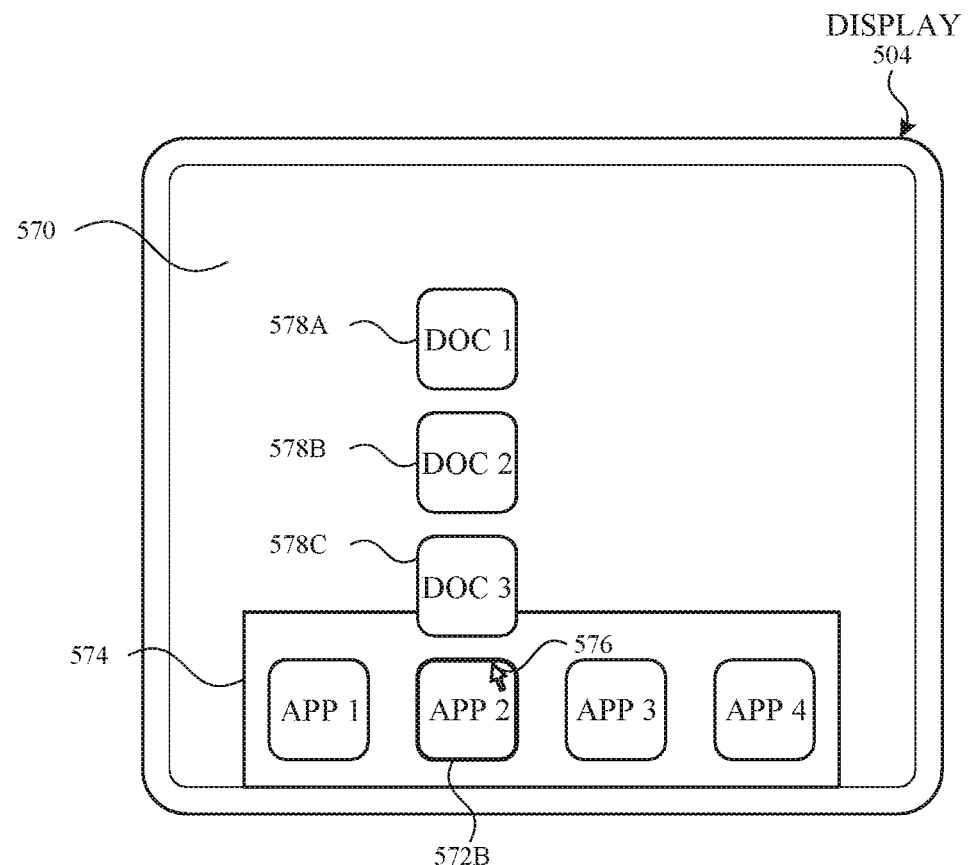
Figure 5H:
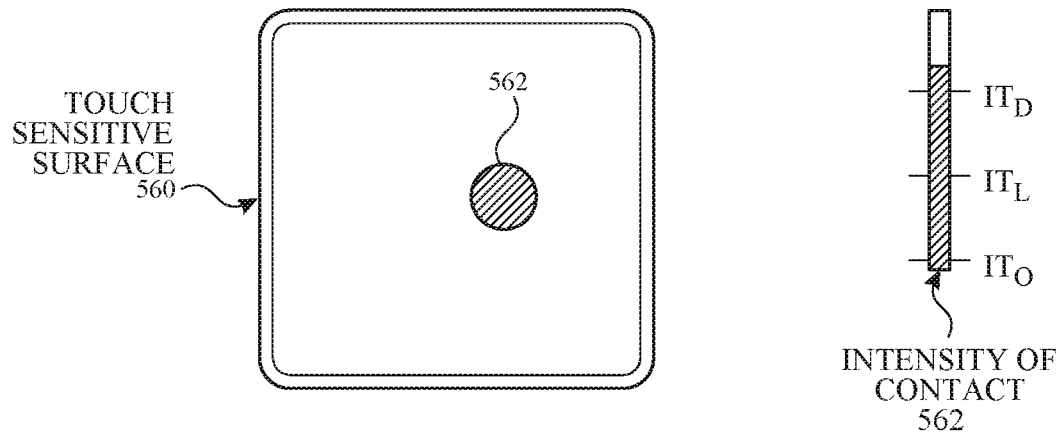

FIGS. 5E-5H illustrate detection of a gesture that includes a press input that corresponds to an increase in intensity of a contact 562 from an intensity below a light press intensity threshold (e.g., "IT$_L$") in FIG. 5E, to an intensity above a deep press intensity threshold (e.g., "IT$_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT$_D$"). Contact 562 is maintained on touch-sensitive surface 560. In response to the detection of the gesture, and in accordance with contact 562 having an intensity that goes above the deep press intensity threshold (e.g., "IT$_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT$_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5I:
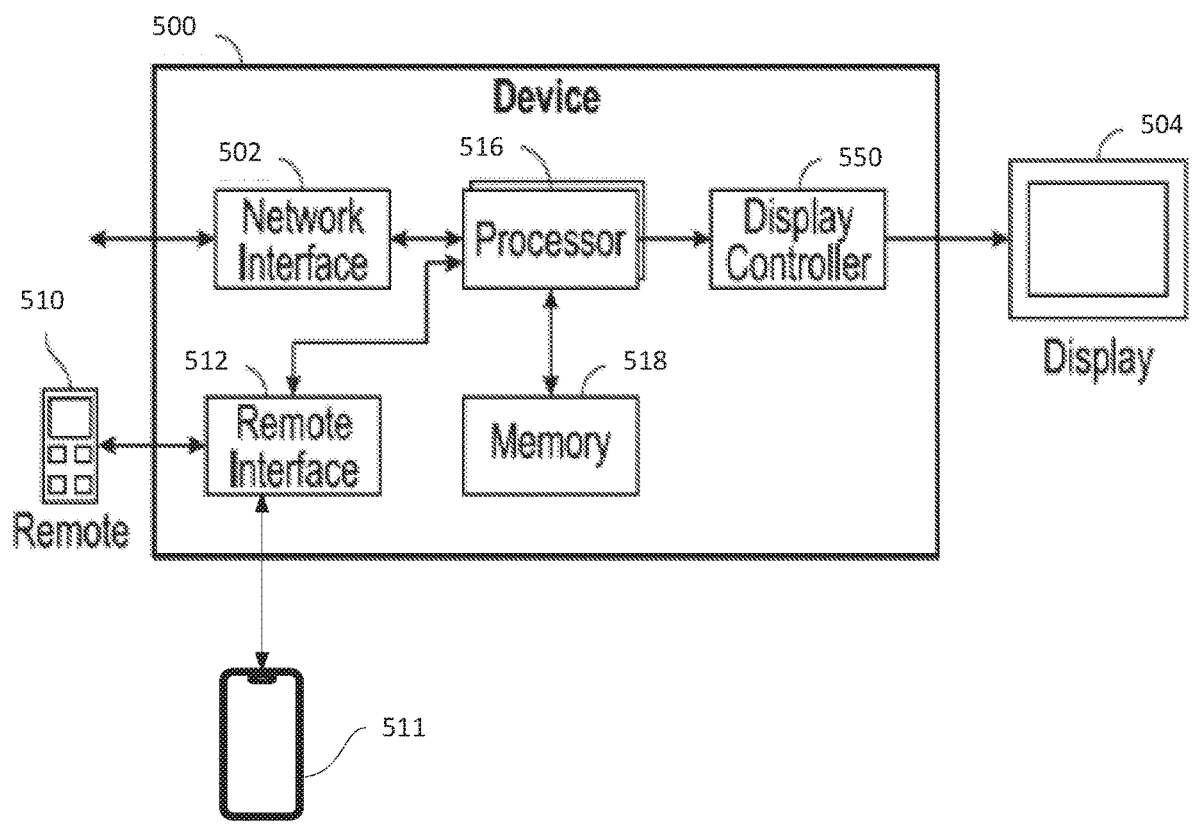

FIG. 5I illustrates a block diagram of an exemplary architecture for a device 500 according to some embodiments of the disclosure. In the embodiment of FIG. 5I, media or other content is optionally received by device 500 via network interface 502, which is optionally a wireless or wired connection. The one or more processors 516 optionally execute any number of programs stored in memory 518 or storage, which optionally includes instructions to perform one or more of the methods and/or processes described herein (e.g., method 700).

In some embodiments, display controller 550 causes the various user interfaces of the disclosure to be displayed on display 504. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5I is not meant to limit the features of the device of the disclosure, and that other components to facilitate other features described in the disclosure are optionally included in the architecture of FIG. 5I as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 516 optionally corresponds to one or more of processor(s) 120 in FIG. 1A and CPU(s) 310 in FIG. 3; display controller 550 optionally corresponds to one or more of display controller 156 in FIG. 1A and I/O interface 330 in FIG. 3; memory 518 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 510 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 504 optionally corresponds to one or more of touch-sensitive display system 112 in FIGS. 1A and 2, and display 340 in FIG. 3.

Figure 5J:
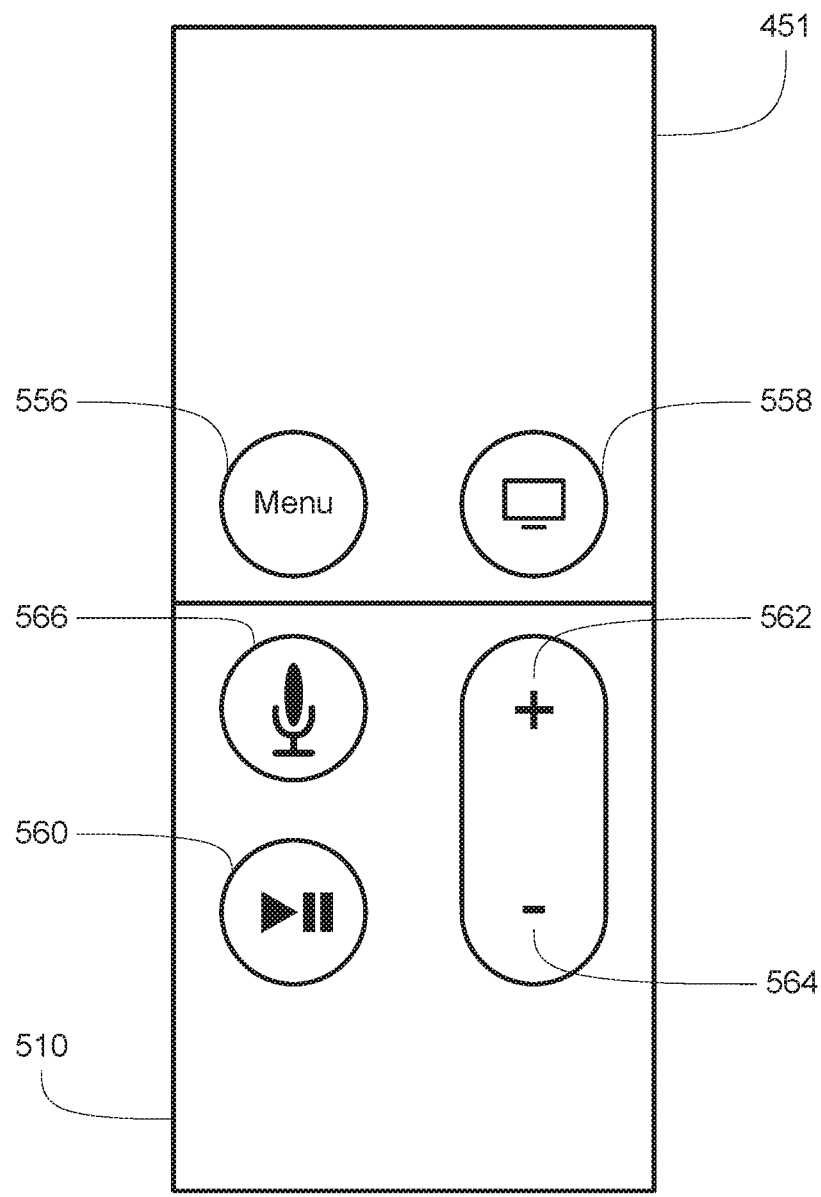

FIG. 5J illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5J). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 556, 558, 560, 562, 564 and 566. Buttons 556, 558, 560, 562, 564 and 566 are optionally mechanical buttons or mechanical button alternatives that are able to sense contact with, or depression of, such buttons to initiate corresponding action(s) on, for example, device 500. In some embodiments, selection of "menu" button 556 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 558 by a user navigates device 500 to a main, home, or root user interface from any user interface that is displayed on device 500 (e.g., to a home screen of device 500 that optionally includes one or more applications accessible on device 500). In some embodiments, selection of "play/pause" button 560 by a user toggles between playing and pausing a currently-playing content item on device 500 (e.g., if a content item is playing on device 500 when "play/pause" button 560 is selected, the content item is optionally paused, and if a content item is paused on device 500 when "play/pause" button 560 is selected, the content item is optionally played). In some embodiments, selection of "+" 562 or "−" 564 buttons by a user increases or decreases, respectively, the volume of audio reproduced by device 500 (e.g., the volume of a content item currently-playing on device 500). In some embodiments, selection of "audio input" button 566 by a user allows the user to provide audio input (e.g., voice input) to device 500, optionally, to a voice assistant on the device. In some embodiments, remote 510 includes a microphone via which the user provides audio input to device 500 upon selection of "audio input" button 566. In some embodiments, remote 560 includes one or more accelerometers for detecting information about the motion of the remote.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Motion Gesture Control

Users interact with electronic devices in many different manners, including entering user inputs to cause electronic devices to perform actions. In some embodiments, the electronic device performs an action in response to detection of a sequence of one or more motion gestures. The embodiments described below provide ways in which an electronic device performs actions that correspond to the detected sequences of one or more motion gestures. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
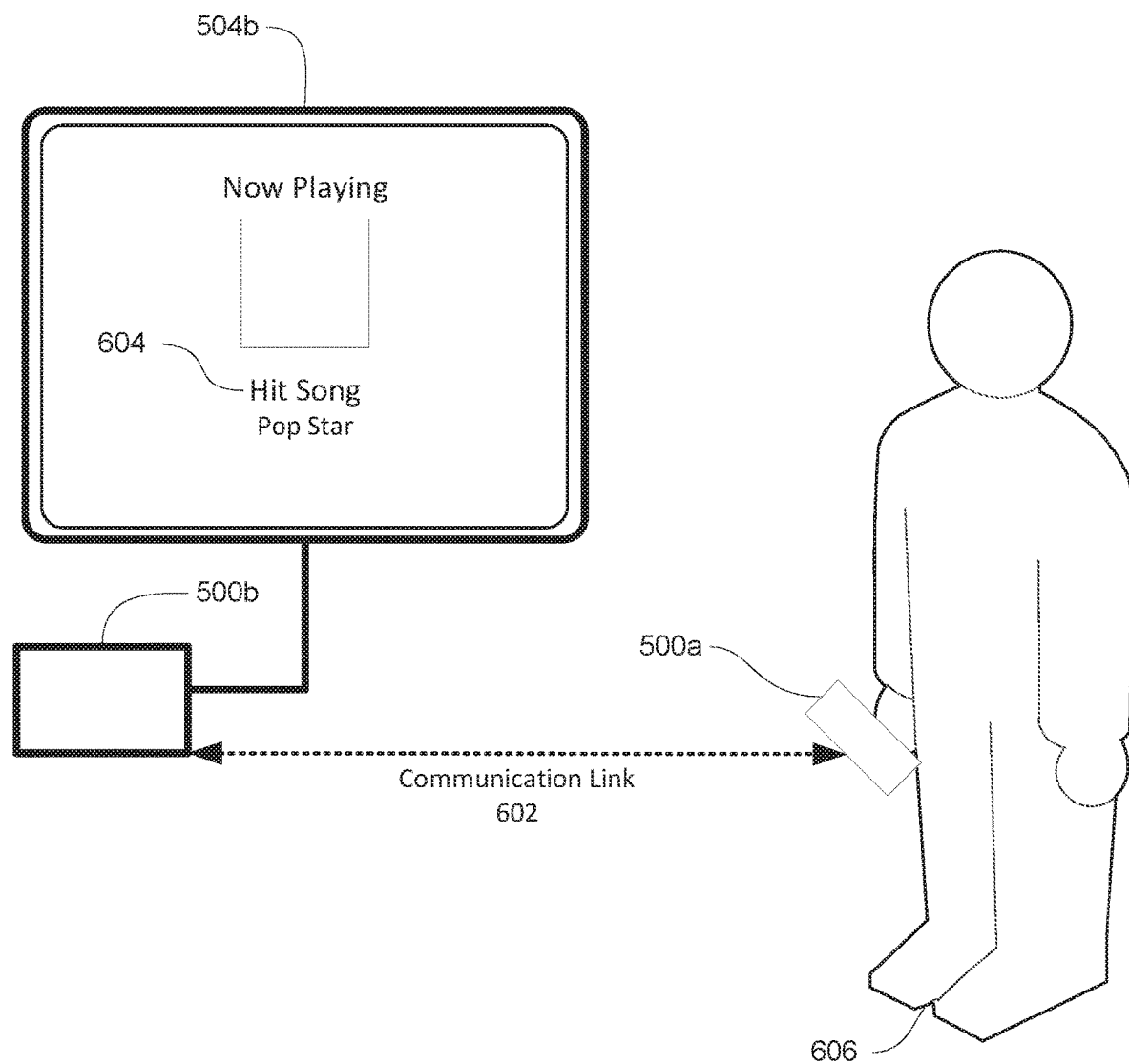
FIGS. 6A-6NN illustrate exemplary ways in which an electronic device performs an action in response to detection of a sequence of one or more motion gestures in accordance with some embodiments.
Figure 6B:
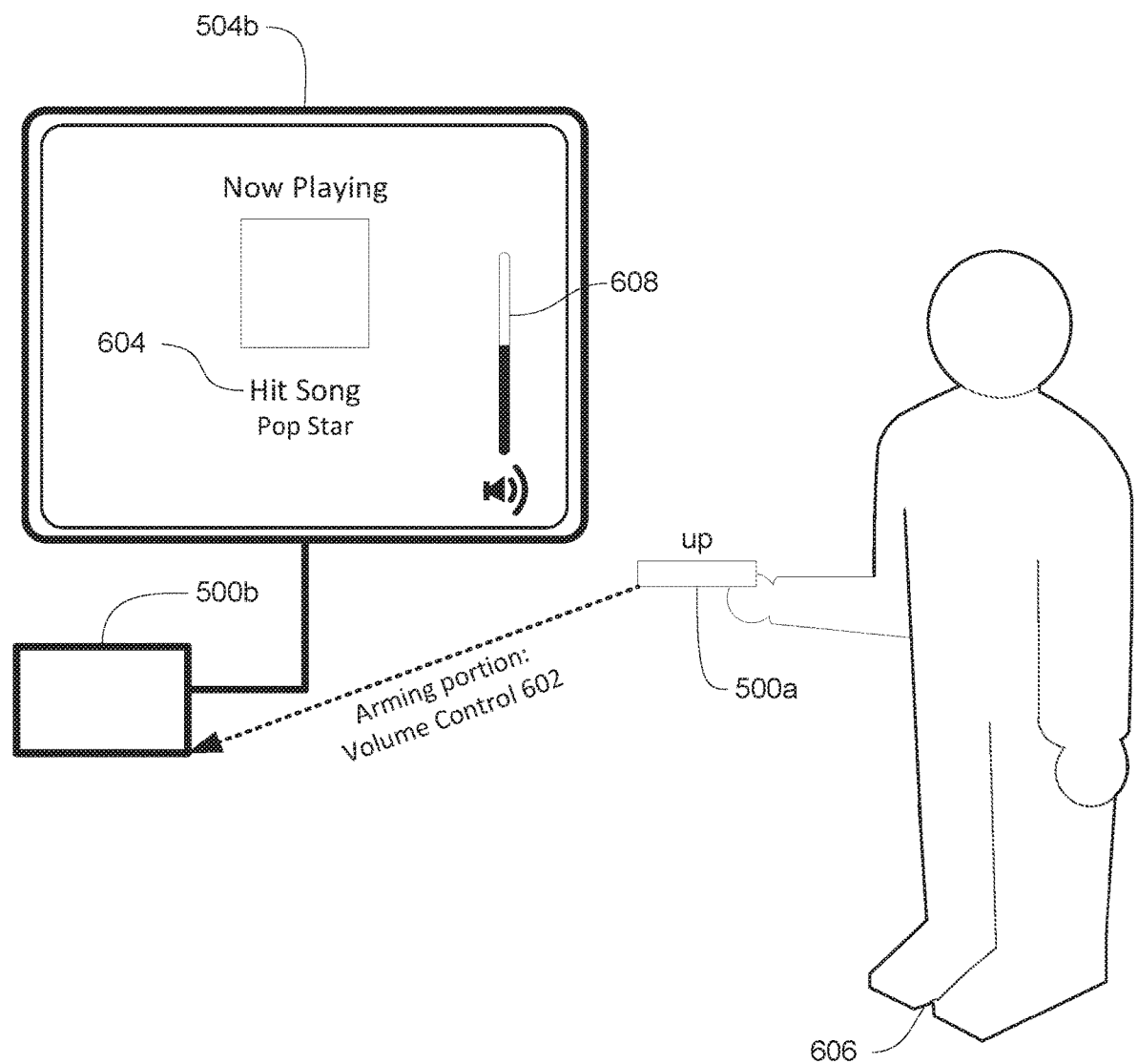
Figure 6C:
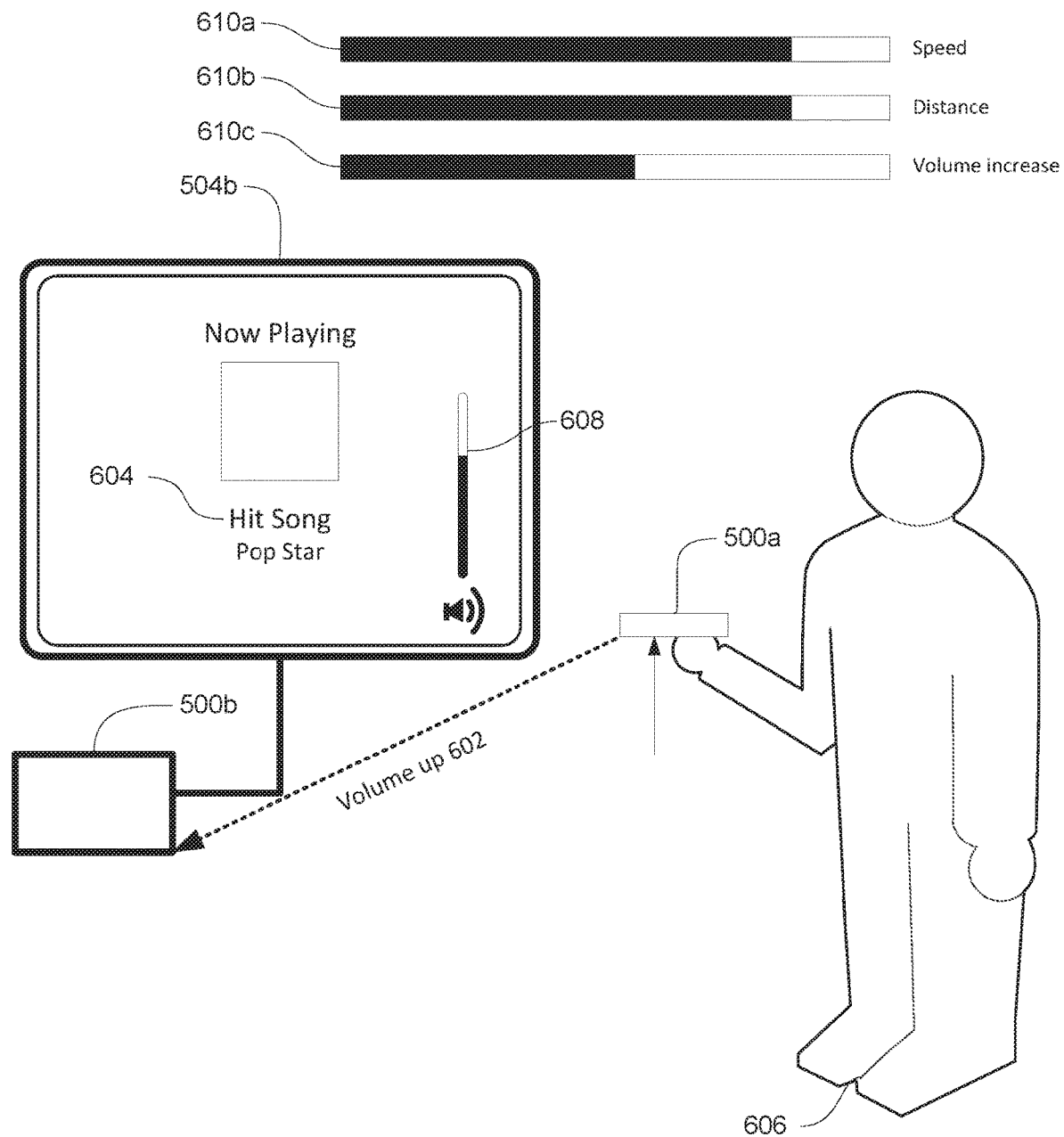
Figure 6D:
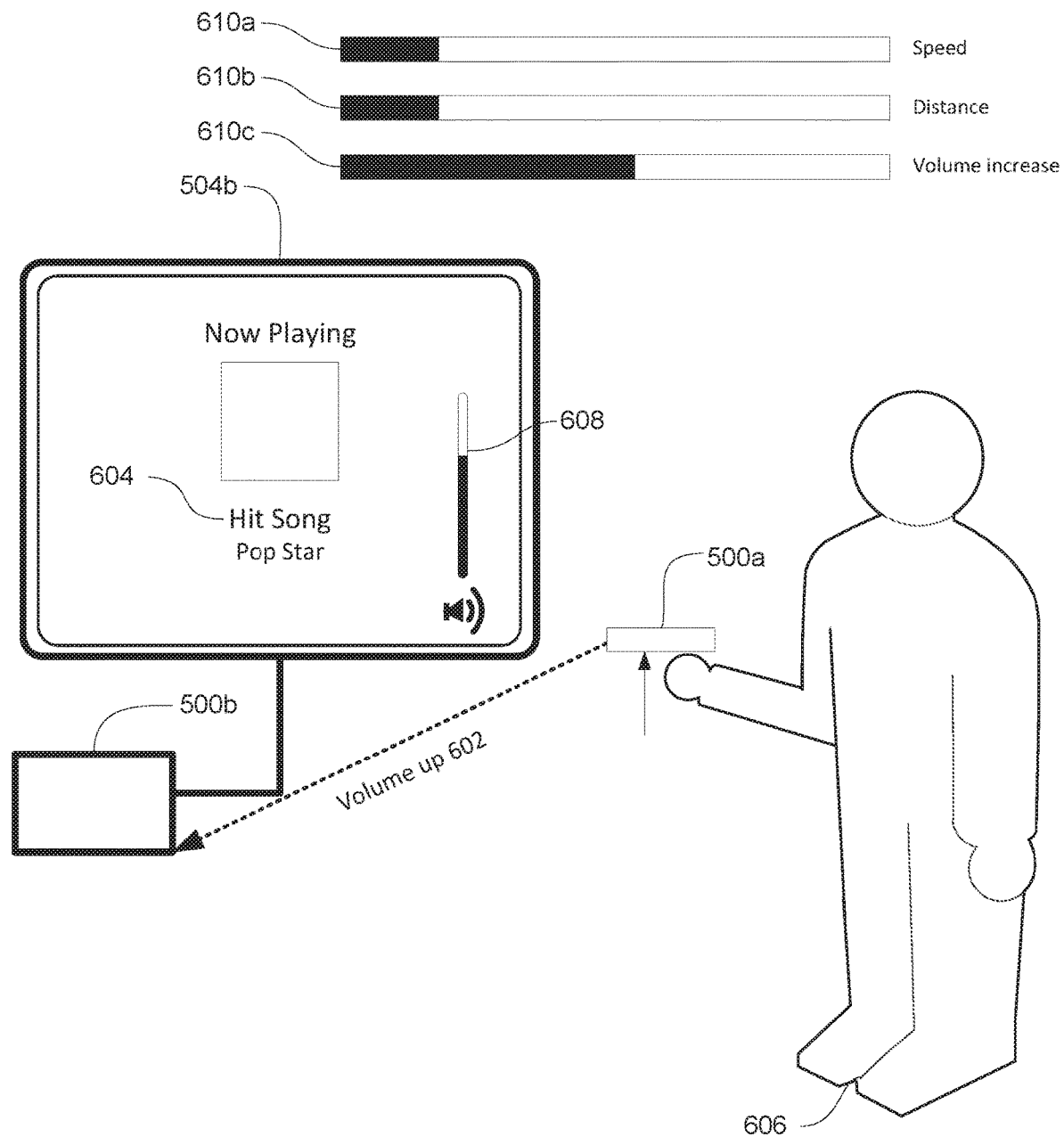
Figure 6E:
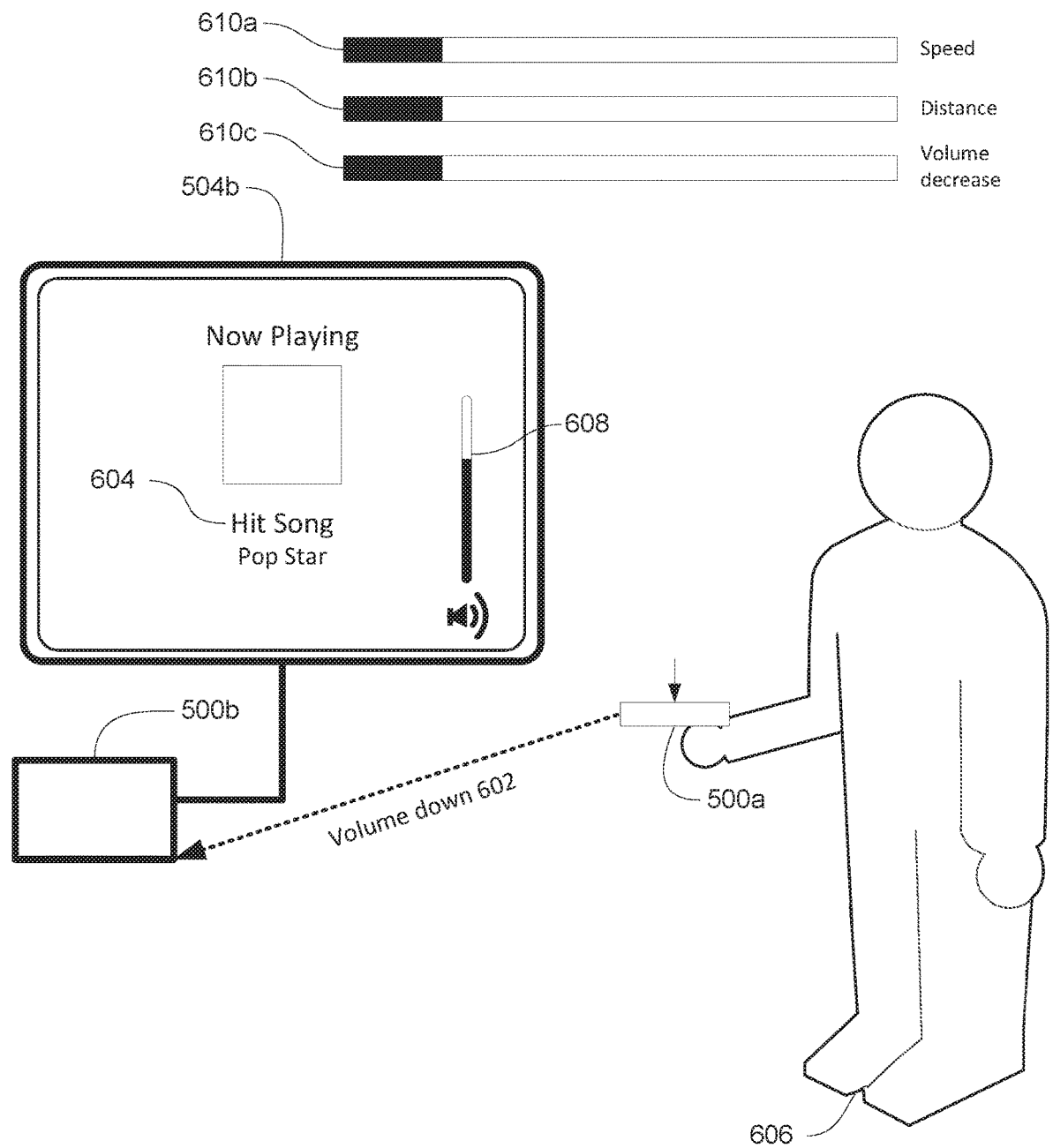
Figure 6F:
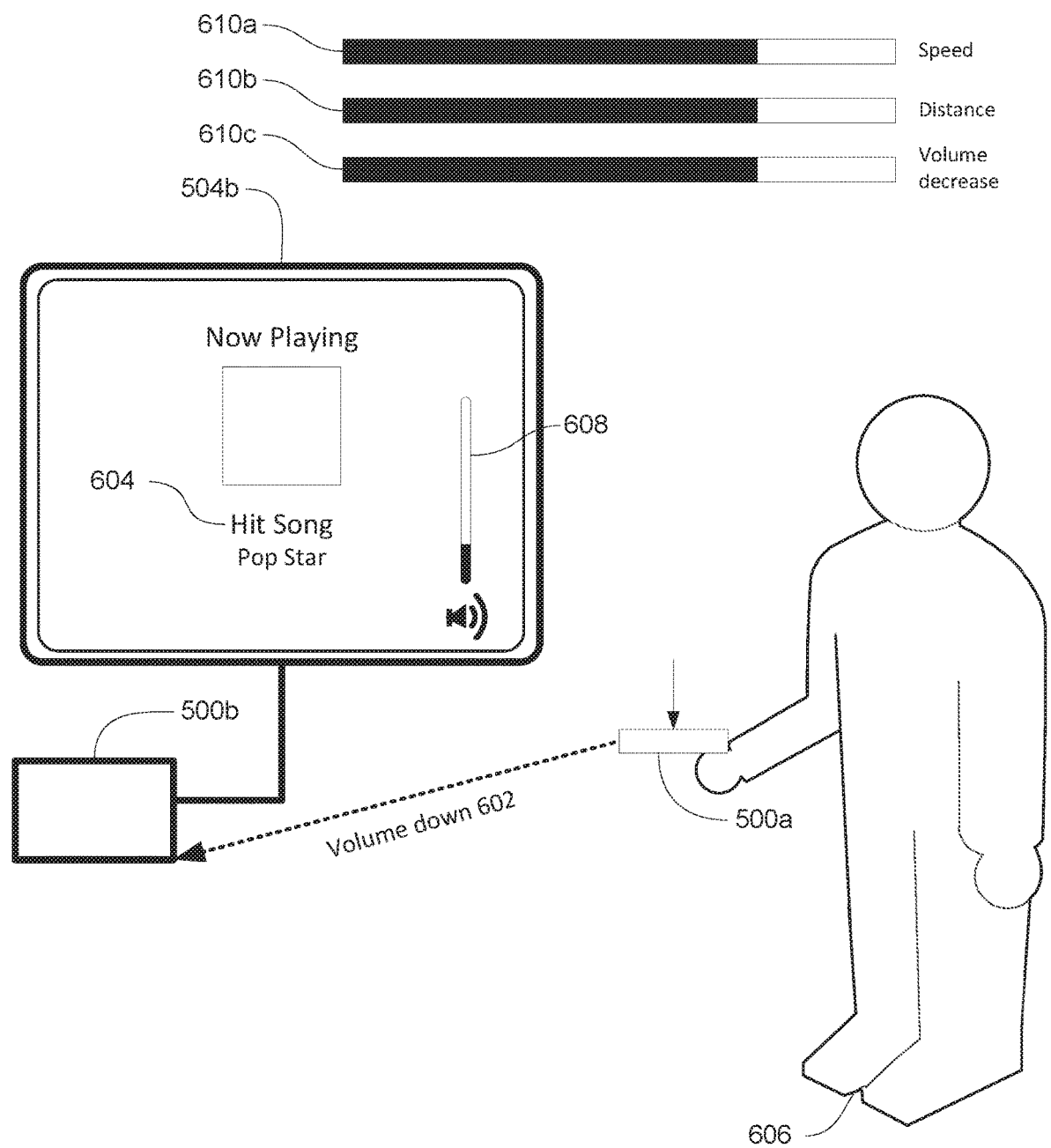
Figure 6G:
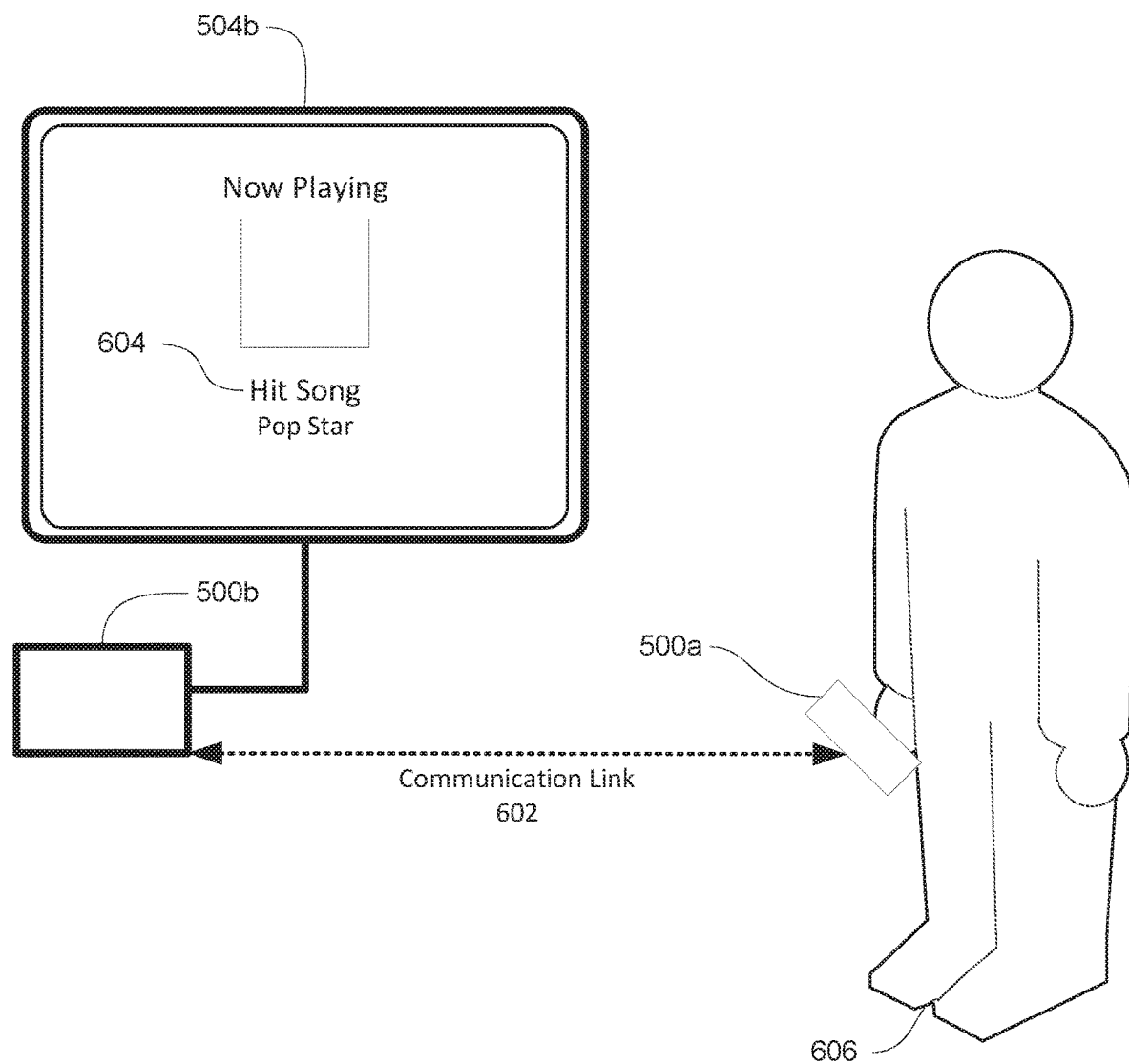
Figure 6H:
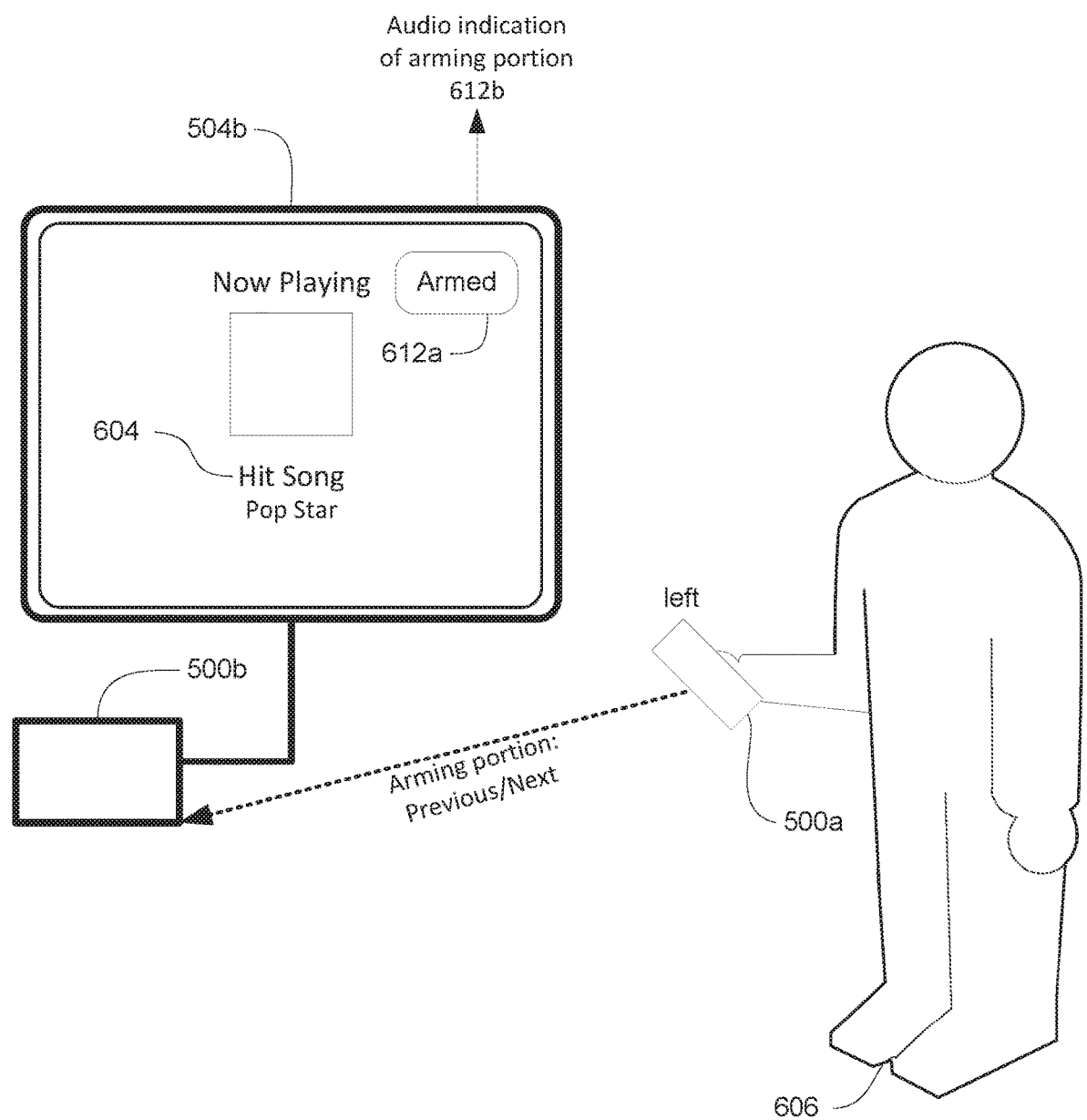
Figure 6I:
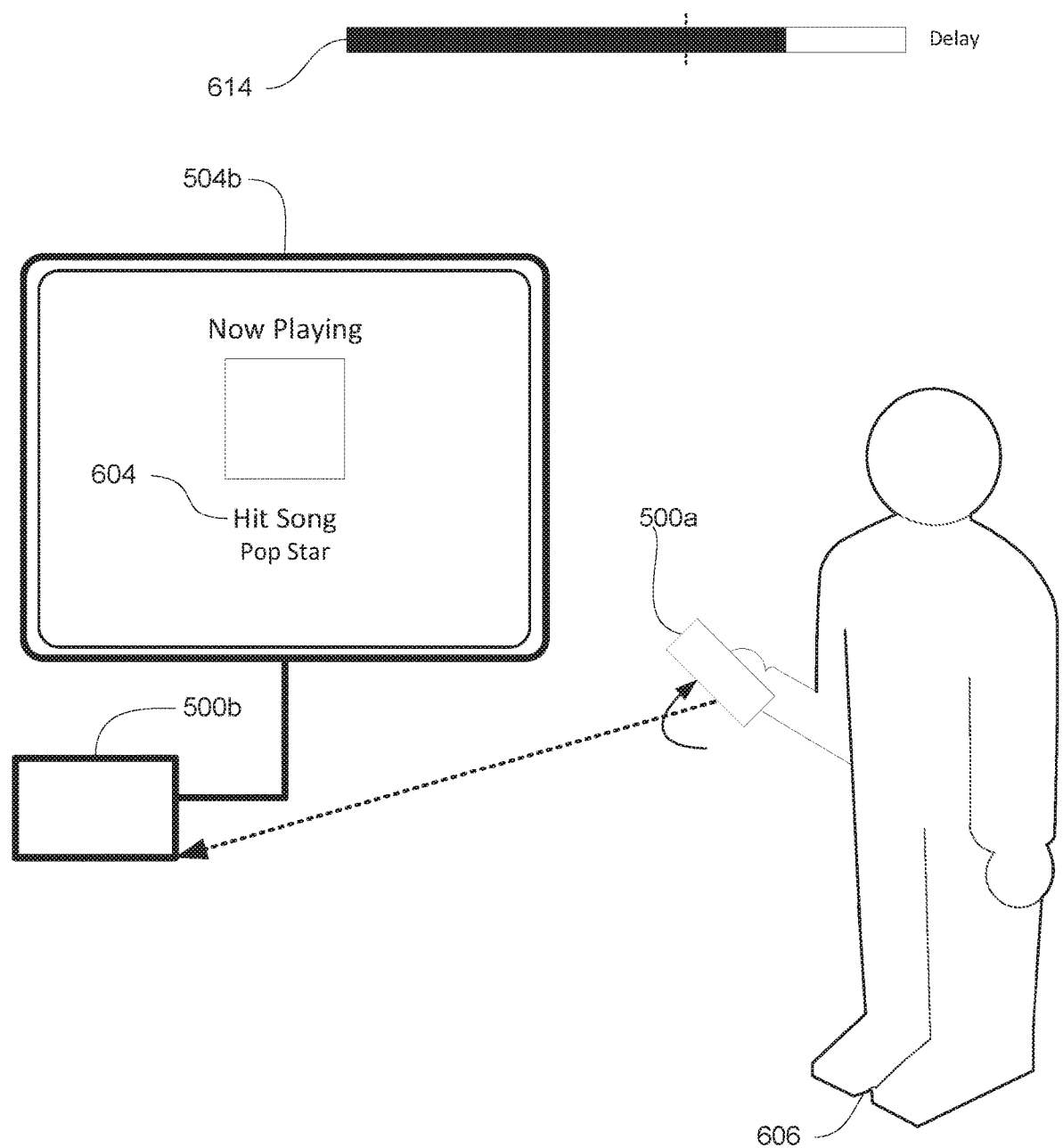
Figure 6J:
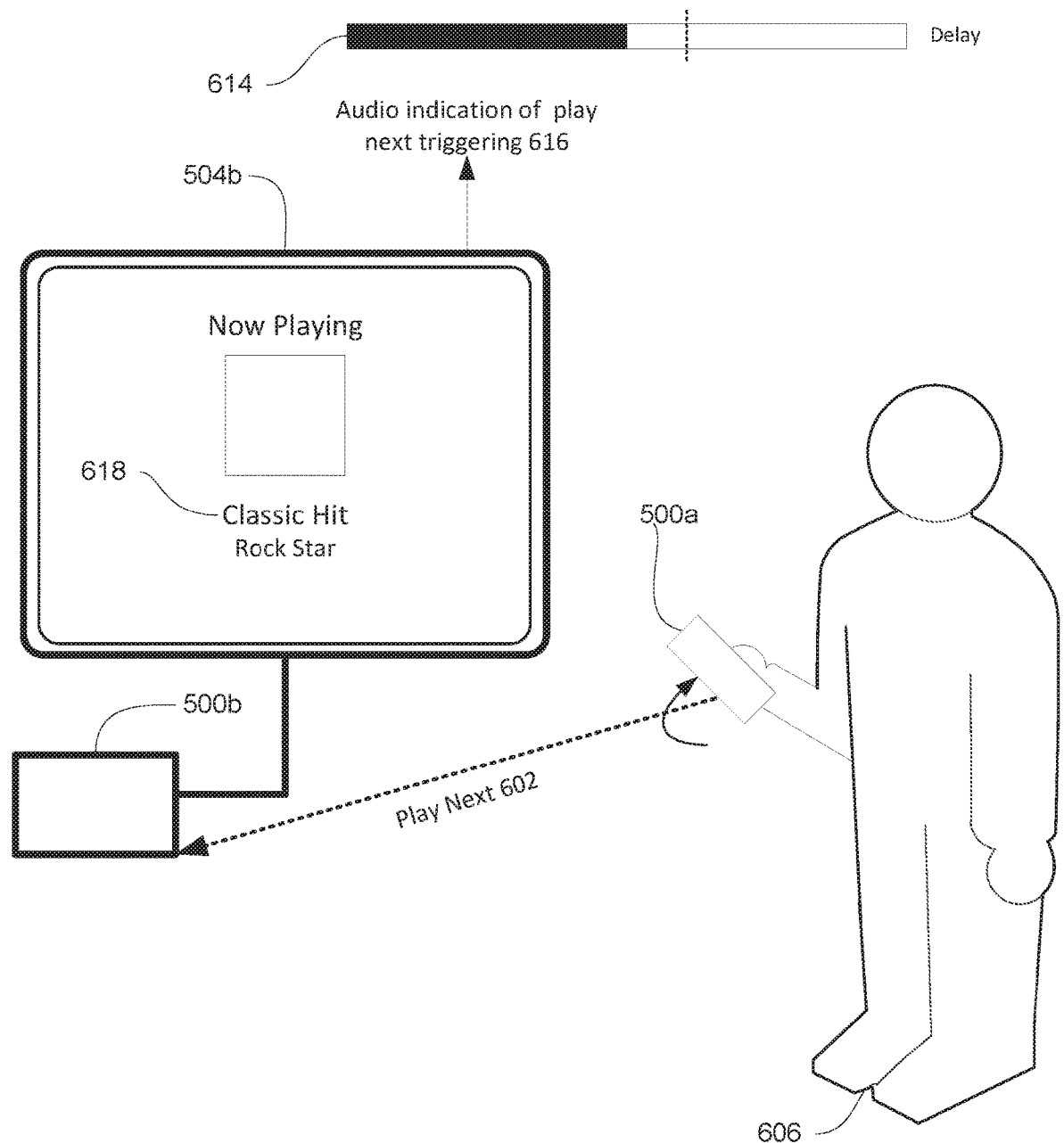
Figure 6K:
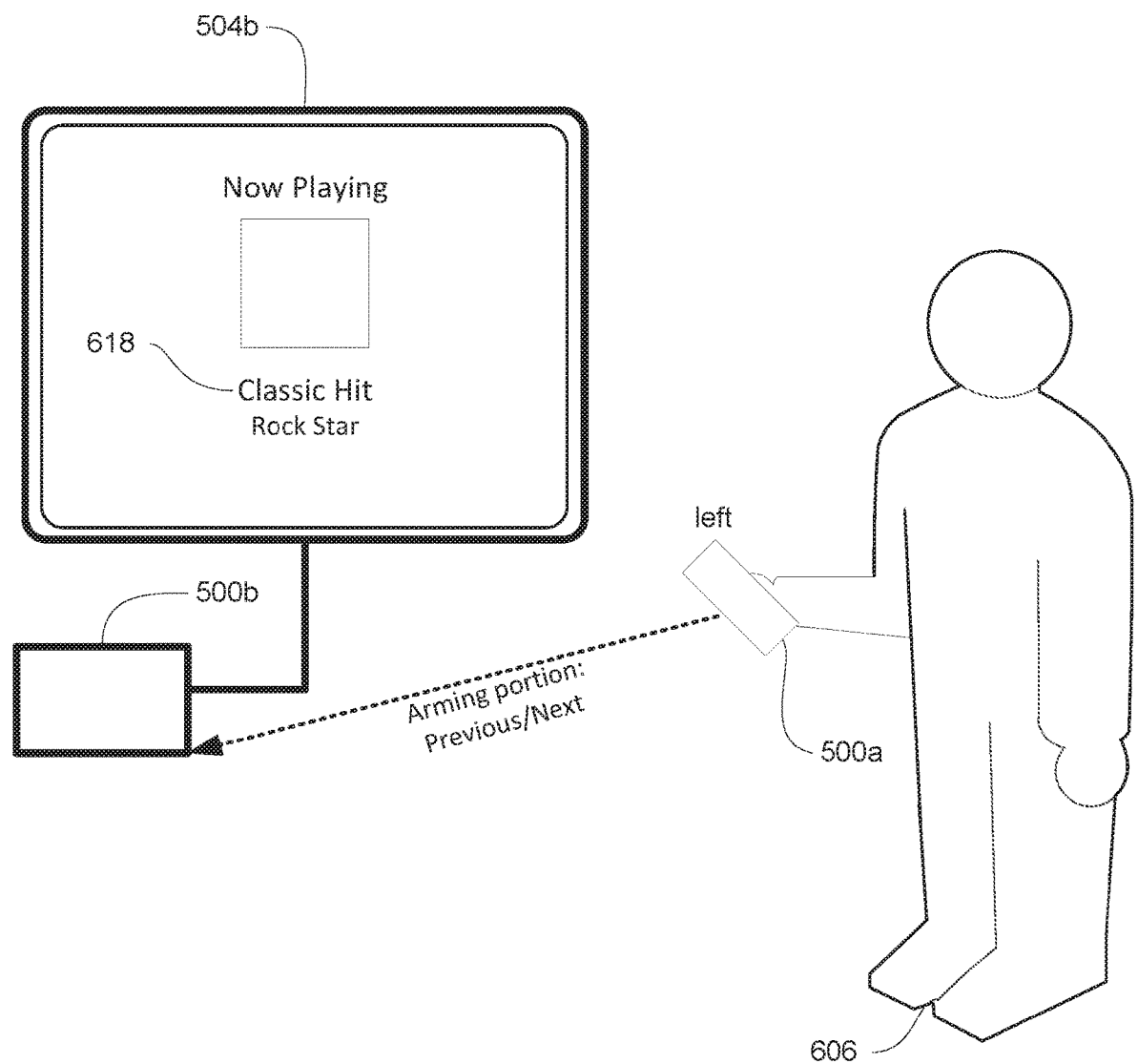
Figure 6L:
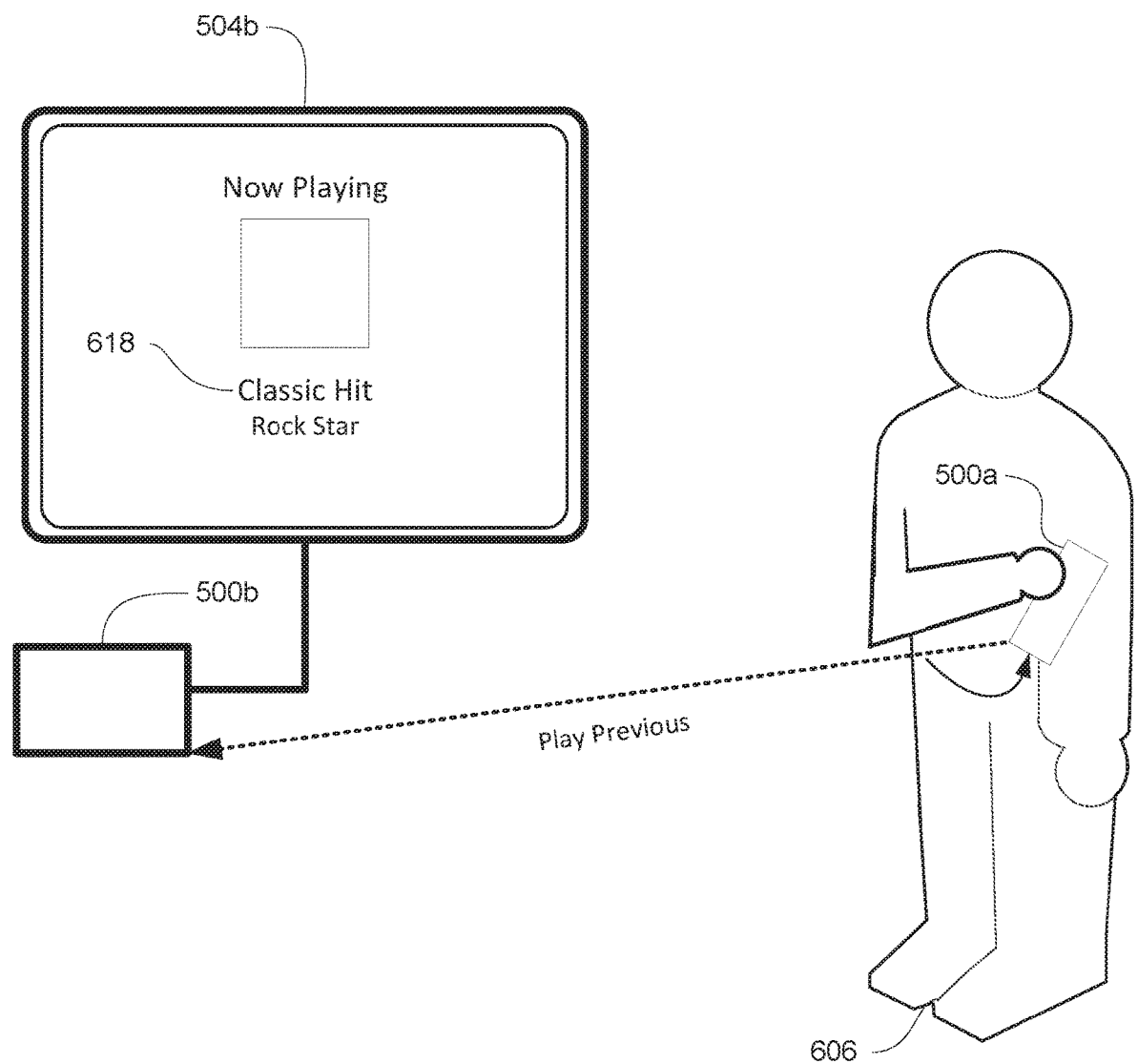
Figure 6M:
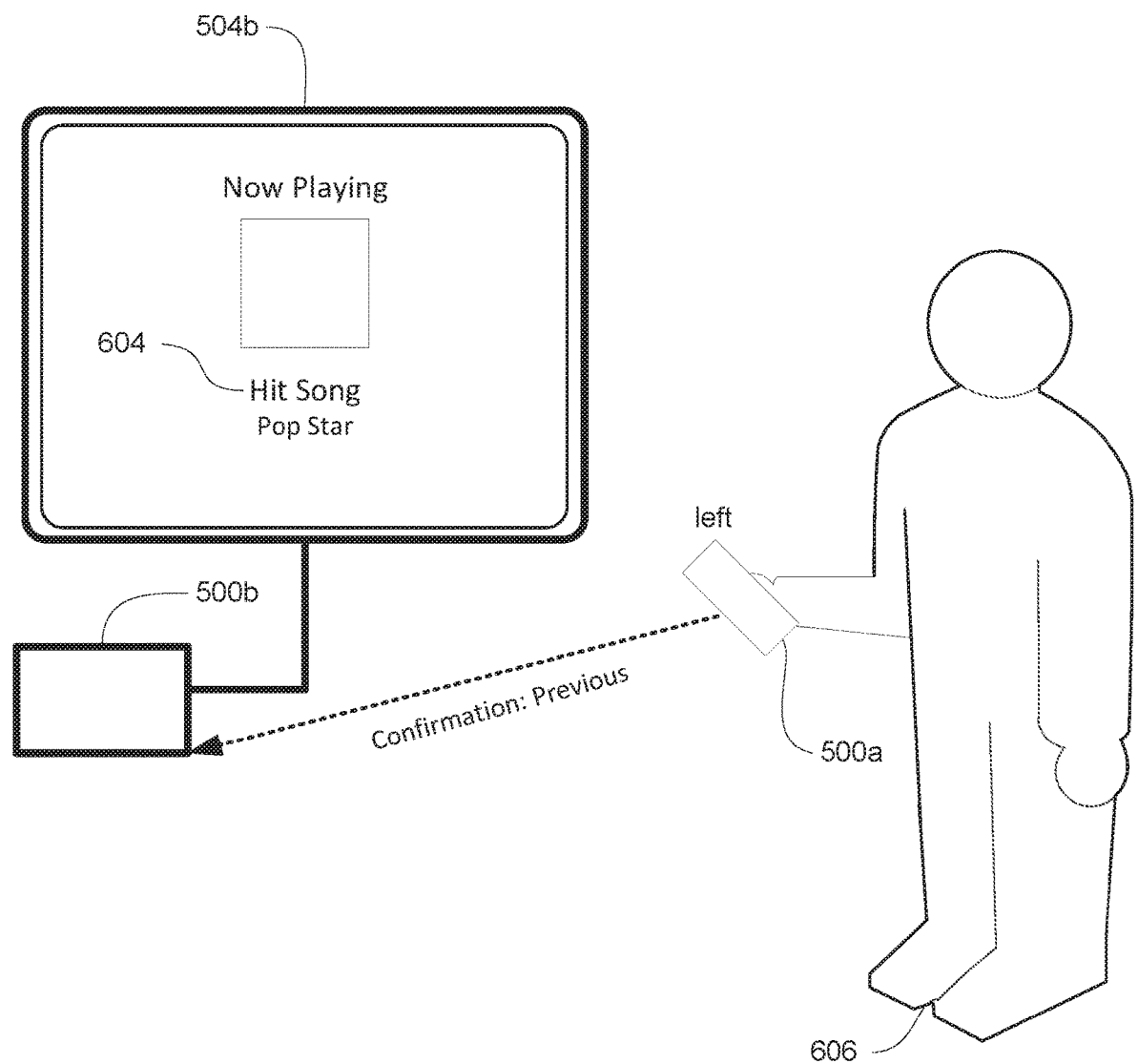
Figure 6N:
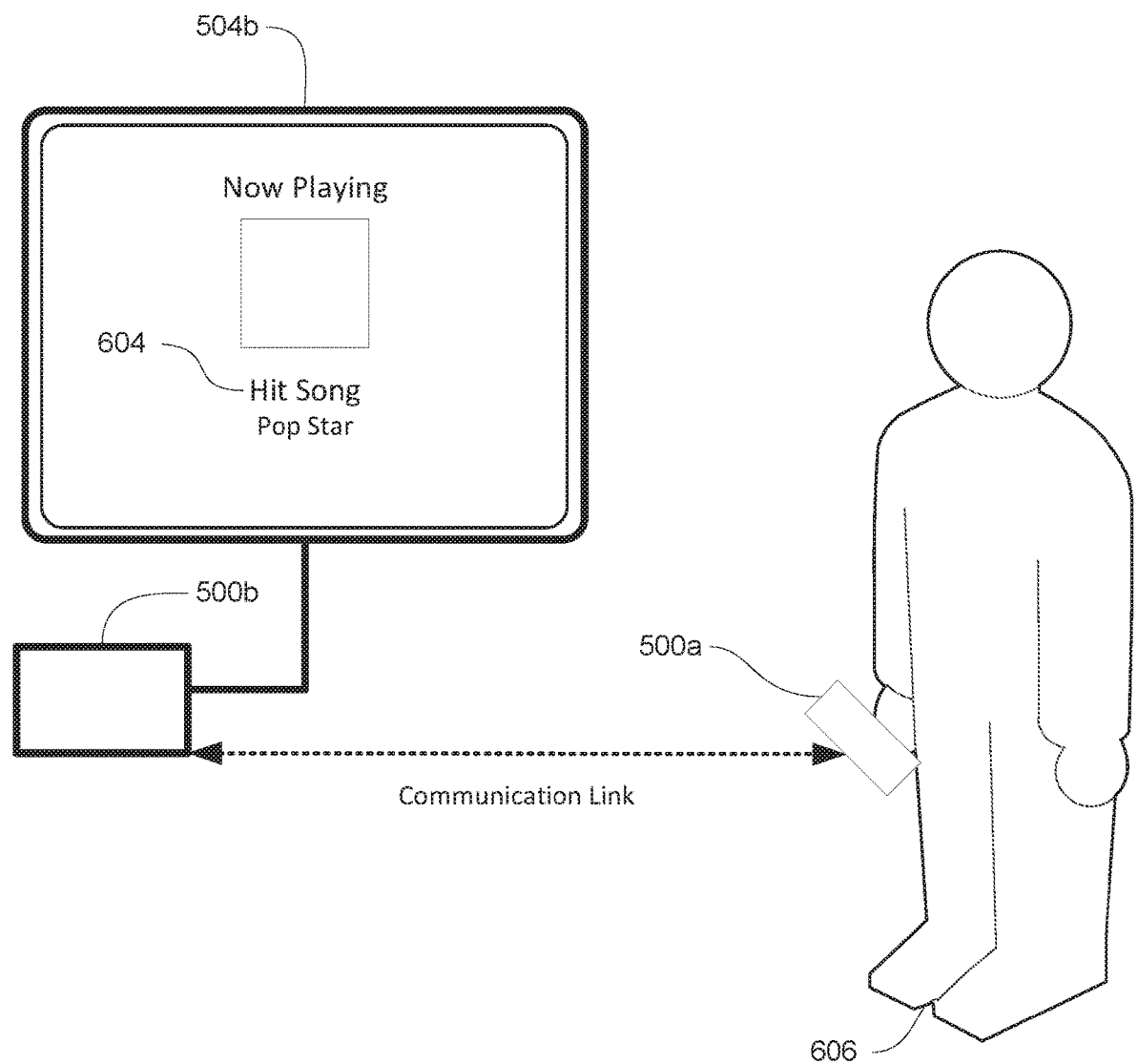

FIGS. 6A-6NN illustrate exemplary ways in which an electronic device performs an action in response to detection of a sequence of one or more motion gestures (a "motion gesture sequence") in accordance with some embodiments of the disclosure. The embodiments in these figures are used to illustrate the processes described below, including the processes described with reference to FIGS. 7A-7J.

FIG. 6A illustrates a first exemplary device 500a in communication with a second exemplary device 500b, such as described with reference to FIGS. 5A-5H. The second electronic device 500b (e.g., device 500 illustrated in FIG.

5I) is in communication with display screen 504b (e.g., display 504 illustrated in FIG. 5I) which is able to display various content. The first electronic device 500a optionally corresponds to remote 510 illustrated in FIGS. 5I-5J.

The first electronic device 500a is able to transmit motion gesture information via communication link 602. The motion gesture information is optionally unprocessed motion data of the first electronic device 500a that the second electronic device 500b analyzes to detect performance of a predetermined sequence of one or more motion gestures, processed (e.g., by device 500a) motion data of the first electronic device 500a that the second electronic device 500b analyzes to detect performance of a predetermined sequence of one or more motion gestures, or an indication to perform an action based on the motion data collected and analyzed by the first electronic device 500a. That is to say, the first electronic device 500a and/or the second electronic device 500b are capable of analyzing motion data of the first electronic device 500a to detect a motion gesture sequence.

FIGS. 6A-6F illustrate the second electronic device 500b performing volume operations in response to detection of a motion gesture sequence performed with the first electronic device 500a in accordance with some embodiments. In the example illustrated in FIG. 6A, the first electronic device 500a and second electronic device 500b are in wireless communication with one another (e.g., via communication link 602). In the example of FIGS. 6A-6F, the first electronic device 500a is a remote control device (e.g., remote 511 illustrated in FIGS. 5I-J) including motion and/or position sensors and the second electronic device 500b (e.g., device 500 illustrated in FIG. 5I) is a set-top box in communication with display 504b (e.g., display 504 illustrated in FIG. 5I) and one or more speakers (e.g., one or more speakers built in to display 504b or one or more other speakers in communication with the second electronic device 500b).

As shown in FIG. 6A, the display 504b presents an indication 604 of media content (e.g., "Hit Song") playing on the second electronic device 500b. The media content is optionally provided by the second electronic device 500b and plays through the one or more speakers in communication with the second electronic device 500b (e.g., speakers built into display 504b).

FIG. 6B illustrates an arming portion of a motion gesture sequence that, if performed, causes the second electronic device 500b to change the playback volume of the media content playing on the second electronic device 500b. The arming portion of the motion gesture sequence is detected in response to motion data of the first electronic device 500a indicating that the user 606 moves the first electronic device 500a to the position illustrated in FIG. 6B. As shown in FIG. 6B, the first electronic device 500a is positioned such that a particular side (e.g., the front or the back) of the first electronic device 500a is facing up. In response to the detection of the arming portion of the motion gesture sequence for controlling playback volume, the display 504b presents a volume level indication as a visual indication to the user that the volume control arming motion gesture has been detected.

FIGS. 6C and 6D illustrate triggering portions of a motion gesture sequence that, if performed, causes the second electronic device 500b to increase the playback volume of the media content playing on the second electronic device 500b by a predetermined amount. After detecting the arming portion of the motion gesture sequence for controlling playback volume, as illustrated in FIG. 6B, the triggering portion of the motion gesture sequence is detected. As illustrated in FIG. 6C, the triggering portion of the motion gesture sequence is detected in response to motion data of the first electronic device 500a indicating that the user moves the electronic device 500a upwards. In some embodiments, the triggering portion of the motion gesture sequence is detected in response to the translational motion of the first electronic device 500a (e.g., motion data in one dimension to detect upwards motion), in some embodiments without other types of motion (e.g., rotational) of the device. In the example illustrated in FIG. 6C, the upwards motion has a relatively large speed 610a and/or a relatively large distance 610b compared to the motion that will be described with reference to FIG. 6D below. In response to the detection of the upwards motion illustrated in FIG. 6C, the second electronic device 500b increases the playback volume of the media content by a predetermined amount indicated by an amount of volume increase 610c. The volume indication 608 of the display 504b increases to reflect the change in playback volume.

FIG. 6D illustrates another example of a triggering portion of the motion gesture sequence for controlling the playback volume. The triggering portion of the motion gesture sequence is detected after detecting the arming portion of the motion gesture sequence illustrated in FIG. 6B. In the example illustrated in FIG. 6D, the upward motion of the triggering portion of the motion gesture sequence has a relatively slow speed 610a and/or a relatively short distance 610d compared to the motion illustrated in FIG. 6C. In response to the detection of the upwards motion, the second electronic device 500b increases the playback volume of the media content by the same predetermined amount as in FIG. 6C, indicated by an amount of volume increase 610c. The volume indication 608 of the display 504b increases to reflect the change in playback volume. In the examples described with reference to FIGS. 6C and 6D, the second electronic device 500b increases the playback volume by the same predetermined amount, regardless of the speed 610a or distance 610b of the triggering portion of the motion gesture sequence. It is understood that in some embodiments, the examples of FIGS. 6C and 6D apply analogous to volume decreases rather than volume increases. In some embodiments, the triggering portion of the motion gesture sequence is detected in response to the translational motion of the first electronic device 500a (e.g., motion data in one dimension to detect upwards motion), in some embodiments without other types of motion (e.g., rotational) of the device.

FIGS. 6E and 6F illustrate triggering portions of a motion gesture sequence that, if performed, causes the second electronic device 500b to decrease the playback volume of the media content playing on the second electronic device 500b by an amount that is in accordance with the speed and/or distance of the triggering portion of the motion gesture. After detecting the arming portion of the motion gesture sequence illustrated in FIG. 6B, the triggering portion of the motion gesture sequence is detected. As illustrated in FIG. 6E, the triggering portion of the motion gesture sequence is detected in response to the motion data of the first electronic device 500a indicating that the user moves the first electronic device 500a downwards. In some embodiments, the triggering portion of the motion gesture sequence is detected in response to the translational motion of the first electronic device 500a (e.g., motion data in one dimension to detect downwards motion), in some embodiments without other types of motion (e.g., rotational) of the device. In the example illustrated in FIG. 6E, the downwards motion has a relatively low speed 610a and/or short distance 610b compared to the motion gesture described below with reference to FIG. 6F. In response to detecting the downward motion illustrated in FIG. 6E, the second electronic device 500b decreases the playback volume by an amount 610c that is based on the speed 610a and/or distance 610b of the motion gesture.

FIG. 6F illustrates another example of a triggering portion of the motion gesture that, if performed, causes the second electronic device 500b to decrease the playback volume of the media content. The triggering portion of the motion gesture sequence is detected after the arming portion of the motion gesture sequence illustrated in FIG. 6B. As illustrated in FIG. 6F, the triggering portion is detected in response to the motion data of the first electronic device 500a indicating that the user moves the first electronic device 500a downwards. In some embodiments, the triggering portion of the motion gesture sequence is detected in response to the translational motion of the first electronic device 500a (e.g., motion data in one dimension to detect downwards motion), in some embodiments without other types of motion (e.g., rotational) of the device. In the example illustrated in FIG. 6F, the downwards motion has a relatively high speed 610a and/or large distance 610b compared to the motion gesture described above with reference to FIG. 6E. In response to detecting the downward motion illustrated in FIG. 6F, the second electronic device 500b decreases the playback volume by an amount 610c that is based on the speed 610 and/or distance 610b of the motion gesture.

In the example described with reference to FIGS. 6E and 6F, the second electronic device 500b lowers the playback volume by a relatively small amount in response to the relatively slow and/or short motion gesture illustrated in FIG. 6E and lowers the playback volume by a relatively large amount in response to the relatively fast and/or long motion gesture illustrated in FIG. 6F. In other words, the amount of volume change depends on the speed and/or size of the triggering portion of the motion gesture sequence. It is understood that in some embodiments, the examples of FIGS. 6E and 6F apply analogous to volume increases rather than volume decreases.

FIGS. 6G-6M illustrate the second electronic device 500b performing play next and play previous operations in response to a motion gesture sequence performed with the first electronic device 500a. In the example illustrated in FIG. 6G, the first electronic device 500a and second electronic device 500b are in wireless communication with one another (e.g., via communication link 602). In the example of FIGS. 6G-6M, the first electronic device 500a is a remote control device including motion and/or position sensors and the second electronic device 500b is a set-top box in communication with display 504b and one or more speakers.

As shown in FIG. 6G, the display 504b presents an indication 604 of media content (e.g., "Hit Song") playing on the second electronic device 500b. The media content is optionally provided by the second electronic device 500b and plays through the one or more speakers in communication with the second electronic device 500b.

FIG. 6H illustrates an arming portion of a motion gesture sequence that, if performed, causes the second electronic device 500b to play the next item of media content in a list of media content or to play the previous item of media content in the list of media content. The arming portion of the motion gesture is detected in response to detecting the motion data of the first electronic device 500a that indicates the user is holding the first electronic device 500a such that a specific side of the first electronic device 500a (e.g., front or back) faces to the left. In response to the detection of the arming portion of the motion gesture sequence, the second electronic device 500b generates a visual indication 612a (e.g., displayed on display 504b) and an audio indication 612b (e.g., played on the one or more speakers in communication with the second electronic device 500b) that the arming portion of the next/previous motion gesture sequence has been detected.

In some embodiments, the triggering portion of a motion gesture sequence must be performed within a time threshold of the arming portion of the motion gesture sequence in order for the intended result to occur so as to reduce the occurrence of unintended input actions due to motion of device 500a. For example, FIG. 6I illustrates a motion gesture that is performed after the arming portion of the motion gesture sequence with a delay that exceeds a predetermined motion gesture control delay threshold 614. The motion performed by the user (e.g., moving the first electronic device 500a to the right) illustrated in FIG. 6I is the same as the triggering portion of the motion gesture sequence for performing a fast forward/next operation at the second electronic device 500b. However, the second electronic device 500b does not perform the fast-forward/next operation in the example illustrated in FIG. 6I, because the delay 614 between detecting the arming portion of the motion gesture sequence and detecting the motion of the first electronic device 500a to the right exceeds a predetermined threshold delay (e.g., 1 second, 2 seconds, or some other amount of time defined by one of the electronic devices 500a or 500b or set by the user).

FIG. 6J illustrates a triggering portion of a motion gesture sequence for causing the second electronic device 500b to perform a play next operation. The triggering portion of the motion gesture sequence is detected after detecting the arming portion of the motion gesture sequence described above with reference to FIG. 6H. As illustrated in FIG. 6H, the triggering portion of the motion gesture sequence is detected when the motion data of the first electronic device 500a indicates that the user 606 moves the first electronic device 500a to the right. In some embodiments, the triggering portion of the motion gesture sequence is detected in response to the translational motion of the first electronic device 500a (e.g., motion data in one dimension to detect motion to the right), in some embodiments without other types of motion (e.g., rotational) of the device. The delay in time 614 between detecting the arming portion of the motion gesture sequence and the triggering portion of the motion gesture sequence is less than the predetermined threshold of time. Thus, in response to the detection of the triggering portion of the motion gesture sequence within the predetermined threshold of time after detecting the arming portion of the motion gesture sequence, the second electronic device 500b plays the next item of content in the list of content. As shown in FIG. 6J, the second electronic device 500b plays a new song, "Classic Hit" instead of the song "Hit Song" that was playing when the arming portion of the motion gesture sequence was performed, as illustrated in FIG. 6H. In response to the triggering portion of the motion gesture sequence, the second electronic device 500b presents an audio indication 616 (e.g., with the one or more speakers in communication with the second electronic device 500b) of the triggering portion of the motion gesture sequence and updates the display 504b to present an indication 618 of the song "Classic Hit."

FIG. 6K illustrates, again, the arming portion of the motion gesture sequence for causing the second electronic device 500b to perform a play next or play previous operation. As described above with reference to FIG. 6H, the arming portion of the motion gesture sequence is detected when the motion data of the first electronic device 500a indicates that the user positions the first electronic device 500a such that a specific side of the first electronic device 500a faces left. Even if the last motion gesture sequence performed at the first electronic device 500a causes the second electronic device 500b to play the next song, in some embodiments, the arming portion of the motion gesture sequence optionally must be detected again before another action is performed in response to another triggering portion of the motion gesture sequence.

FIG. 6L illustrates a triggering portion of a motion gesture sequence for causing the second electronic device 500b to perform a play previous operation. The triggering portion of the motion gesture sequence is detected after detecting the arming portion of the motion gesture sequence described with reference to FIG. 6K. As shown in FIG. 6L, the triggering portion of the motion gesture sequence is detected when the motion data of the first electronic device 500a indicates that the user moves the first electronic device 500a to the left. In some embodiments, the triggering portion of the motion gesture sequence is detected in response to the translational motion of the first electronic device 500a (e.g., motion data in one dimension to detect motion to the left), in some embodiments without other types of motion (e.g., rotational) of the device. Although in some embodiments, the second electronic device 500b performs the operation corresponding to the detected motion gesture sequence in response to detection of the triggering portion of the motion gesture sequence, in some embodiments, the second electronic device 500b performs the operation in response to a confirmation portion of the motion gesture sequence detected after the triggering portion of the motion gesture sequence, as will be described below with reference to FIG. 6M. Thus, in some examples, the action to be taken by device 500b is not taken until the confirmation portion is detected, and as shown in FIG. 6L, device 500b has not yet started playing the previous song in response to the previous song triggering portion detected in FIG. 6L.

FIG. 6M illustrates a confirmation portion of a motion gesture sequence for causing the second electronic device 500b to play a previous item of content in the content list. The confirmation portion of the motion gesture sequence is detected after the triggering portion of the motion gesture sequence illustrated in FIG. 6L and the arming portion of the motion gesture sequence illustrated in Fig. K. The confirmation portion of the motion gesture sequence is detected when the motion data of the first electronic device 500a indicates that the user 500a positions the first electronic device 500a such that a specific side of the first electronic device 500a is facing left, as shown in FIG. 6M. In some embodiments, the confirmation portion of the motion gesture sequence is the same as the arming portion of the motion gesture sequence, though in some embodiments the confirmation portion is different from the arming portion. In response to the detection of the sequence of the arming portion, triggering portion, and confirmation portion, the second electronic device 500b plays the previous song, "Hit Song," as shown in FIG. 6M, and the display 504b is updated to present an indication 604 that "Hit Song" is currently playing.

FIGS. 6N-6R illustrate the second electronic device 500b performing a play operation, a pause operation, and a scrubbing operation in response to a motion gesture sequence performed at the first electronic device 500a. In the example illustrated in FIG. 6N, the first electronic device 500a and second electronic device 500b are in wireless communication with one another (e.g., via communication link 602). In the example of FIGS. 6N-6R, the first electronic device 500a is a remote control device including motion and/or position sensors and the second electronic device 500b is a set-top box in communication with display 504b and one or more speakers.

As shown in FIG. 6N, the display 504b presents an indication 604 of media content (e.g., "Hit Song") playing on the second electronic device 500b. The media content is optionally provided by the second electronic device 500b and plays through the one or more speakers in communication with the second electronic device 500b.

Figure 6O:
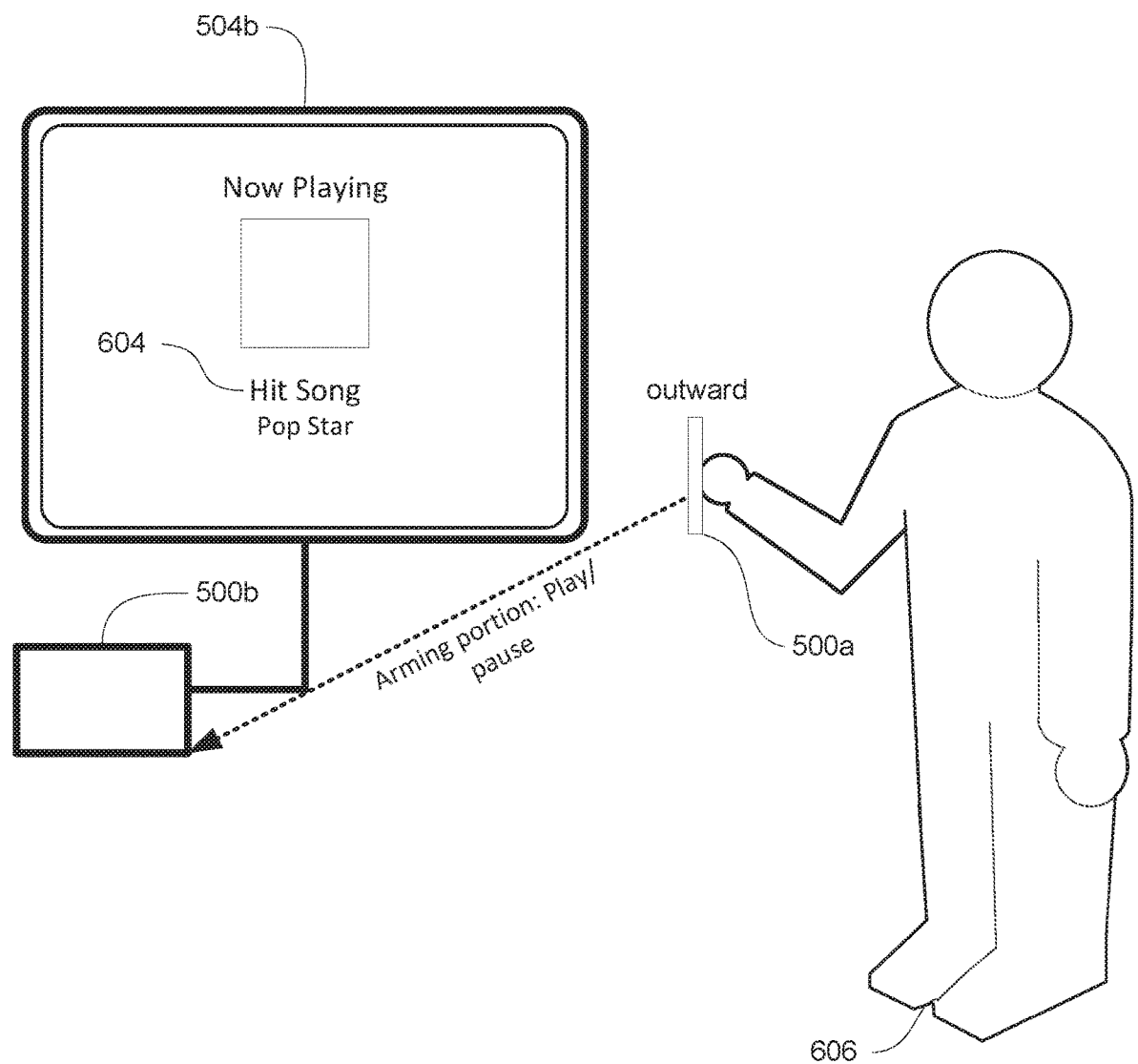

FIG. 6O illustrates an arming portion of a motion gesture sequence for causing the second electronic device 500b to perform a play operation or a pause operation. The arming portion of the motion gesture sequence is detected in response to the motion data of the first electronic device 500a indicating that the user 606 positions the first electronic device 500a such that a specific side (e.g., front or back) of the first electronic device 500a faces outward.

Figure 6P:
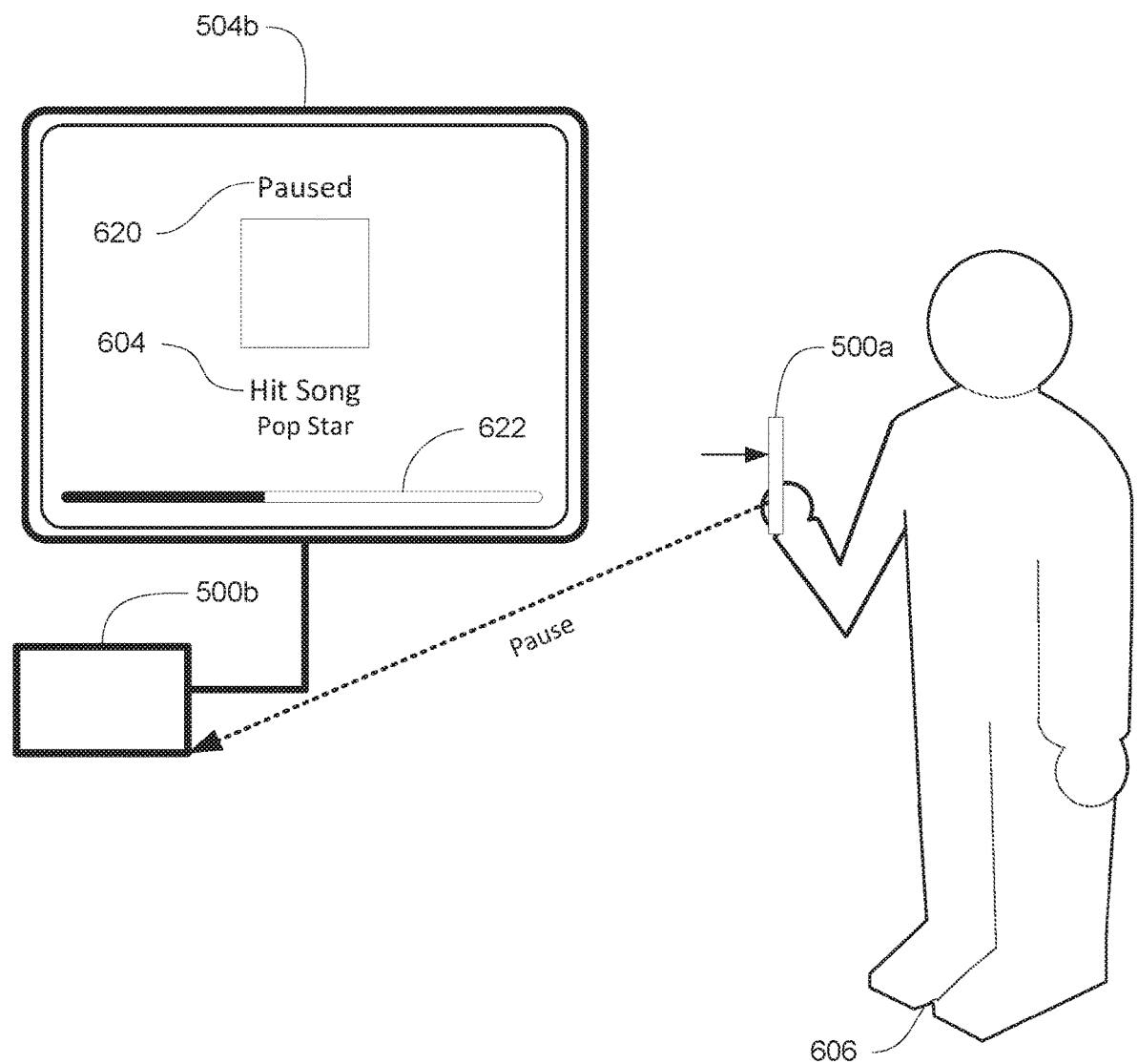

FIG. 6P illustrates a triggering portion of a motion gesture sequence for causing the second electronic device 500b to perform a pause operation. The triggering portion of the motion gesture sequence is detected after the arming portion of the motion gesture sequence. As shown in FIG. 6P, the triggering portion of the motion gesture sequence is detected when the motion data of the first electronic device 500a indicates that the user 606 moves the first electronic device 500a towards their torso. In some embodiments, the triggering portion of the motion gesture sequence is detected in response to the translational motion of the first electronic device 500a (e.g., e.g., motion data in one dimension—such as forward, backward, to the left, to the right, etc.—with respect to an orientation of the electronic device), in some embodiments without other types of motion (e.g., rotational) of the device. In some embodiments, the triggering portion of the motion gesture sequence is detected in response to the motion data of the first electronic device 500a indicating that the user 606 moves the first electronic device 500a away from their torso. In response to detecting the triggering portion of the motion gesture sequence after detecting the arming portion of the motion gesture sequence, the second electronic device 500b pauses the media content that is playing, as shown in FIG. 6P. The display 504b presents an indication 620 that the content is paused and a scrubber bar 622 indicating the playback position where the content is paused.

Figure 6Q:
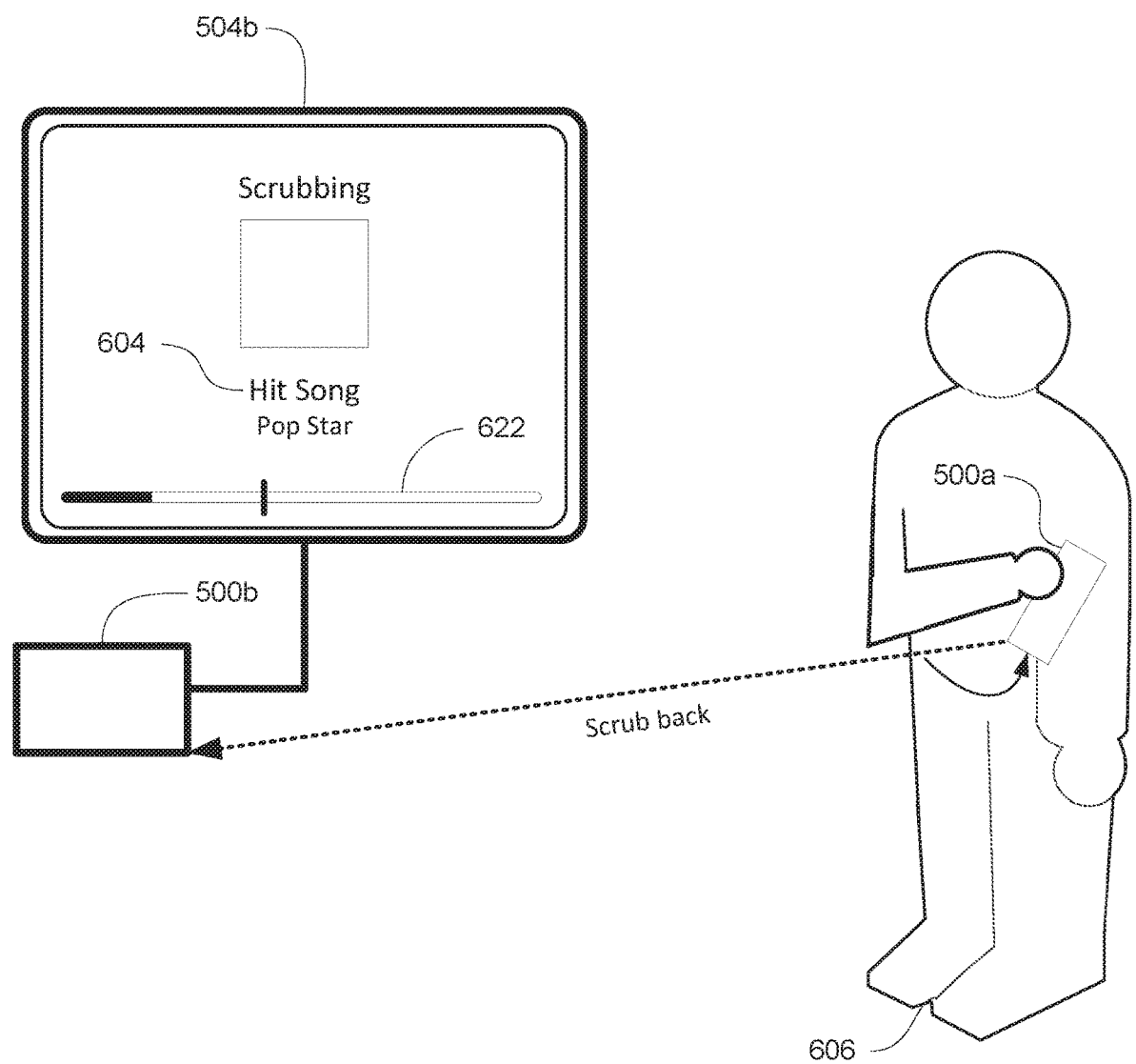

FIG. 6Q illustrates a triggering portion of a motion gesture sequence for causing the second electronic device 500b to scrub the media content played by the second electronic device 500b. In some embodiments, the triggering portion of the motion gesture sequence for scrubbing the content is detected after the triggering portion for pausing the content illustrated in FIG. 6P (e.g., in some embodiments, device 500b allows scrubbing of content after the content has been paused using motion gestures, as described here). In some embodiments, the arming portion of the motion gesture sequence shown in FIG. 6O must be performed again before the triggering portion of the motion gesture sequence for scrubbing the content is detected. In some embodiments, scrubbing can be performed without pausing the content first—that is, the arming portion of the motion gesture sequence illustrated in FIG. 6O or a different arming portion for scrubbing is detected followed by the triggering portion of the motion gesture sequence for scrubbing while the media content is playing on the second electronic device 500b. The triggering portion of the motion gesture sequence for causing the second electronic device 500*b* to scrub the content is detected when the motion data of the first electronic device 500*a* indicates that the user moves the first electronic device 500*a* to the left. In some embodiments, the triggering portion of the motion gesture sequence is detected in response to the translational motion of the first electronic device 500*a* (e.g., motion data in one dimension to detect motion to the left), in some embodiments without other types of motion (e.g., rotational) of the device. In response to the detection of the triggering portion of the motion gesture sequence performed at the first electronic device 500*a*, the second electronic device 500*b* scrubs the content back, as indicated by the scrubber bar 622 presented on display 504*b*. In some embodiments, the amount of scrubbing performed is based on the speed and/or distance of the movement of the first electronic device 500*a* (e.g., a fast or long movement causes scrubbing back by a relatively large amount while a slow or short movement causes scrubbing back by a relatively small amount).

Figure 6R:
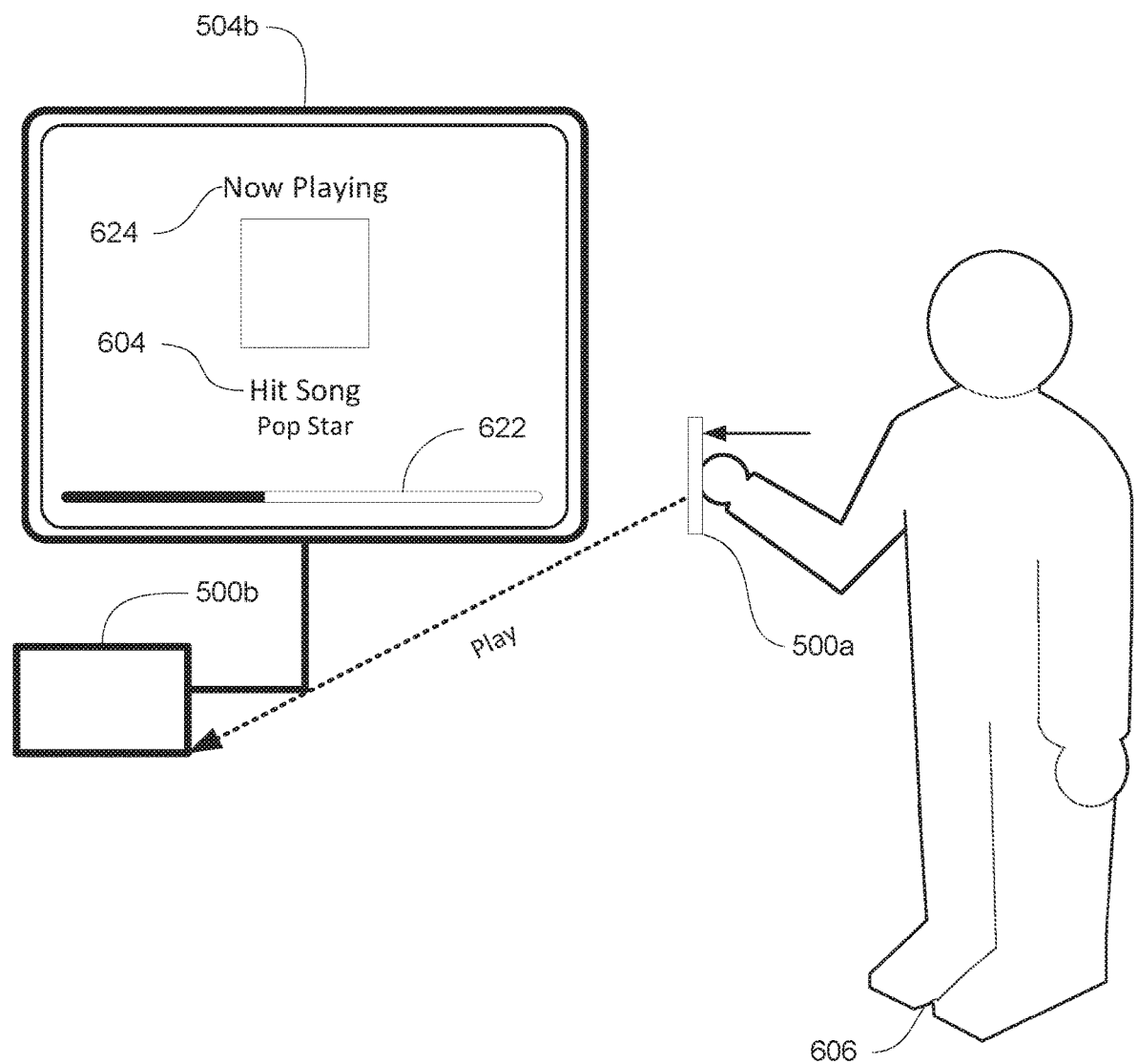

FIG. 6R illustrates a triggering portion of a motion gesture sequence for causing the second electronic device 500*b* to play the media content paused by the second electronic device 500*b*. In some embodiments, the triggering portion of the motion gesture sequence for causing the second electronic device 500*b* to play the media content is detected after detecting the arming portion of the motion gesture sequence illustrated in FIG. 6O. As shown in FIG. 6R, the triggering portion of the motion gesture sequence for causing the second electronic device 500*b* to play the media content is detected when the motion data of the first electronic device 500*a* indicates that the user moves the first electronic device 500*a* away from their torso. In some embodiments, the triggering portion of the motion gesture sequence is detected in response to the translational motion of the first electronic device 500*a* (e.g., motion data in one dimension—such as forward, backward, to the left, to the right, etc.—with respect to an orientation of the electronic device), in some embodiments without other types of motion (e.g., rotational) of the device. In response to detection of the triggering portion of the motion gesture sequence being performed at the first electronic device 500*a*, the second electronic device 500*b* plays the media content. The display 504*b* presents an indication 624 that the media content is being played by the second electronic device 500*b*.

Figure 6S:
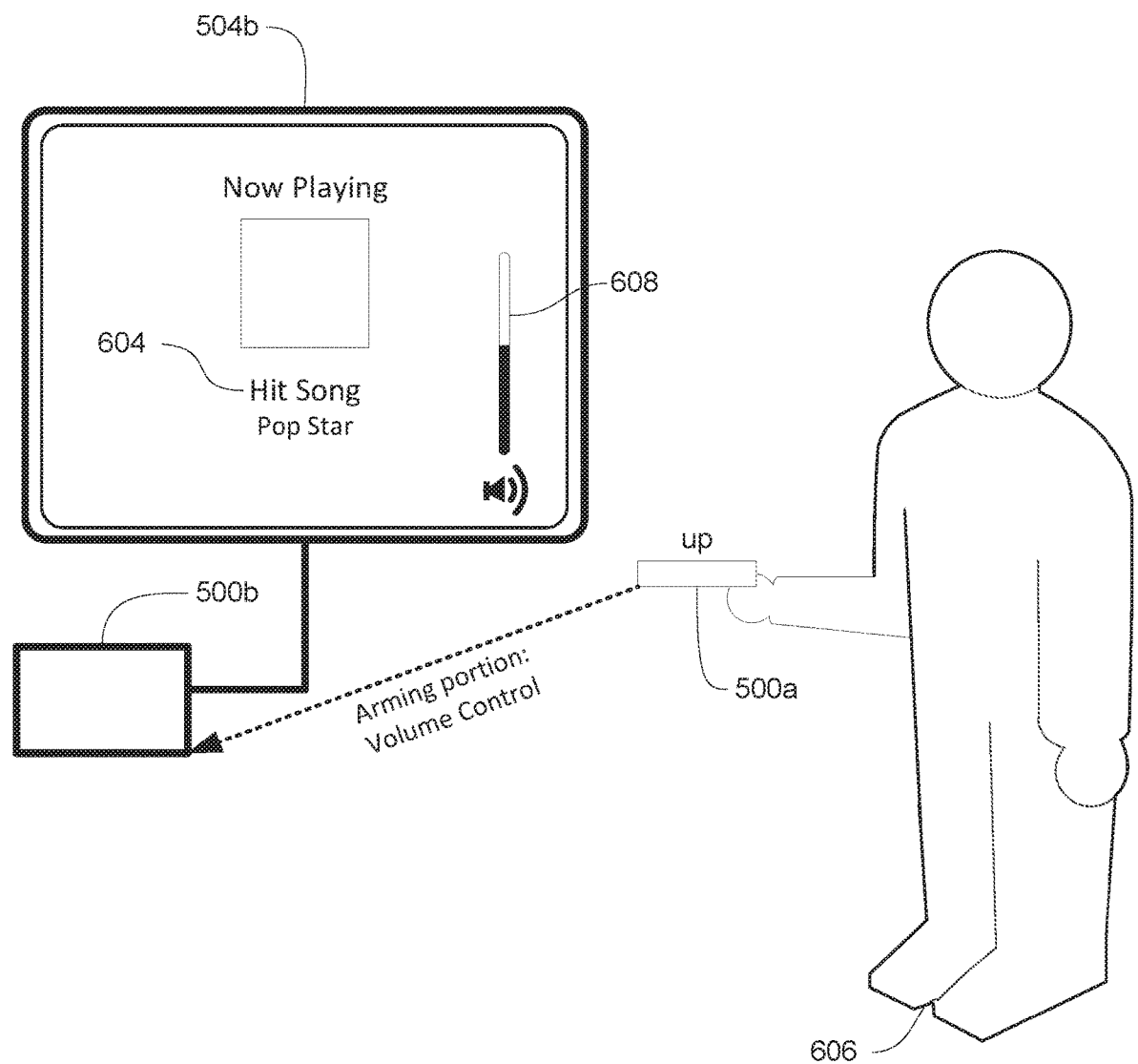

FIG. 6S illustrates the arming portion of the motion gesture sequence for causing the second electronic device 500*b* to change the playback volume of media content playing on the second electronic device 500*b*. In response to the detection of the arming portion of the motion gesture sequence for causing the second electronic device 500*b* to change the playback volume of the media content, the display presents an indication 608 of the playback volume level and the first electronic device 500*a* or second electronic device 500*b* determines whether subsequent motion data of the first electronic device 500*a* matches the triggering portion of the motion gesture sequence for either raising or lowering the playback volume. If the motion data of the first electronic device 500*a* after detection of the arming portion of the motion gesture sequence does not match the triggering portion of the motion gesture sequence for raising or lowering the playback volume, the second electronic device 500*b* does not perform a volume change operation in response to the motion data of the first electronic device 500*a*—if the motion data of the first electronic device 500*a* after detection of the arming portion of the motion gesture sequence does match the triggering portion of the motion gesture sequence for raising or lowering the playback volume, the second electronic device 500*b* does perform a volume change operation in response to the motion data of the first electronic device 500*a*, as previously described.

Figure 6T:
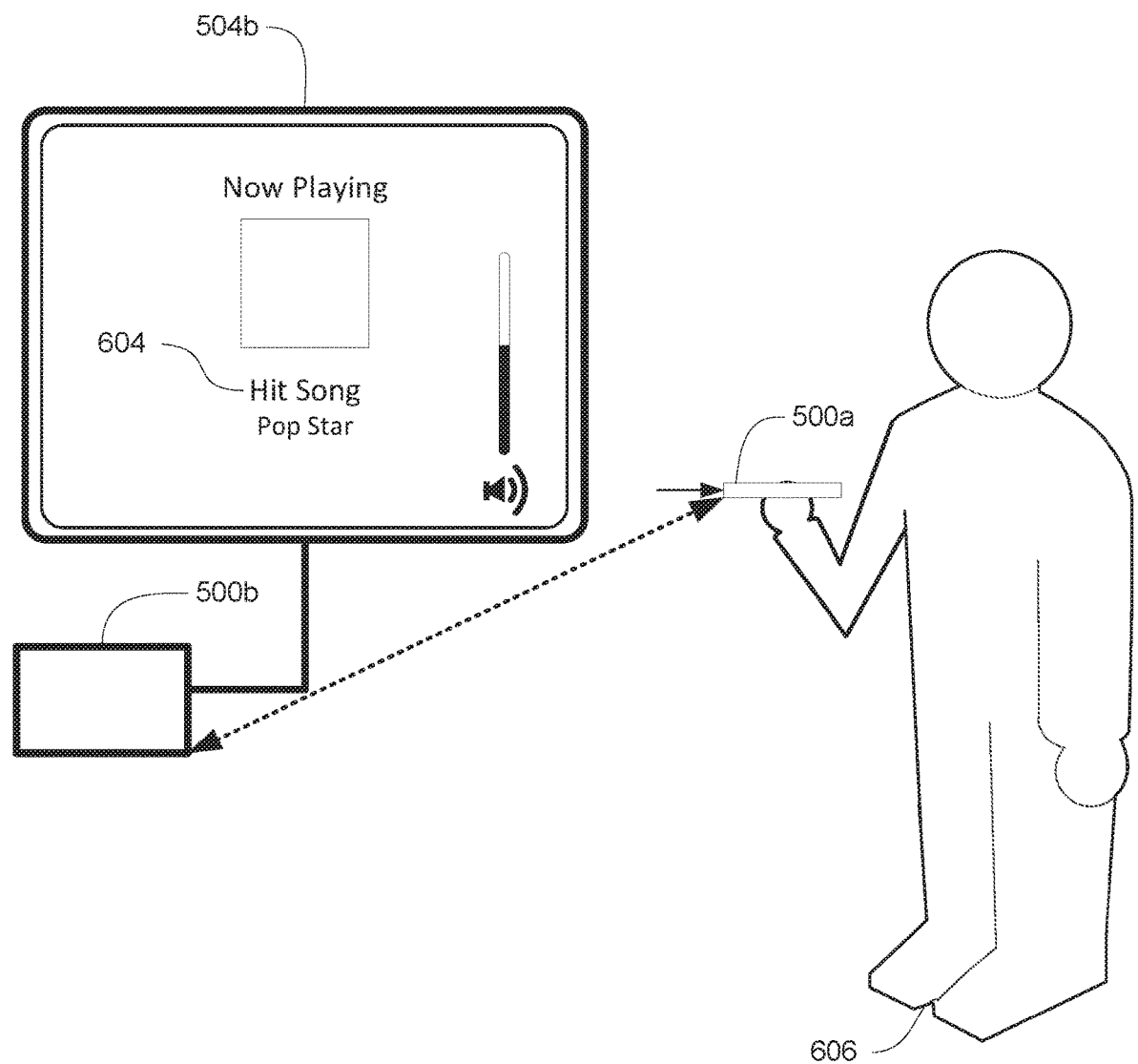

As shown in FIG. 6T, after performance of the arming portion of the motion gesture sequence for changing the playback volume, the user 606 performs the triggering portion of the motion gesture sequence for pausing the media content rather than for changing playback volume. Because the motion data of the first electronic device 500*a* does not indicate performance of the triggering portion of the motion gesture sequence for raising or lowering the playback volume (e.g., the triggering portion that corresponds to the arming portion that was performed in this case), the second electronic device 500*b* does not change the playback volume. Because the arming portion of the motion gesture sequence for pausing the media content was not detected prior to performance of the triggering portion of the motion gesture sequence for pausing the media, the second electronic device 500*b* does not pause the media content.

Figure 6U:
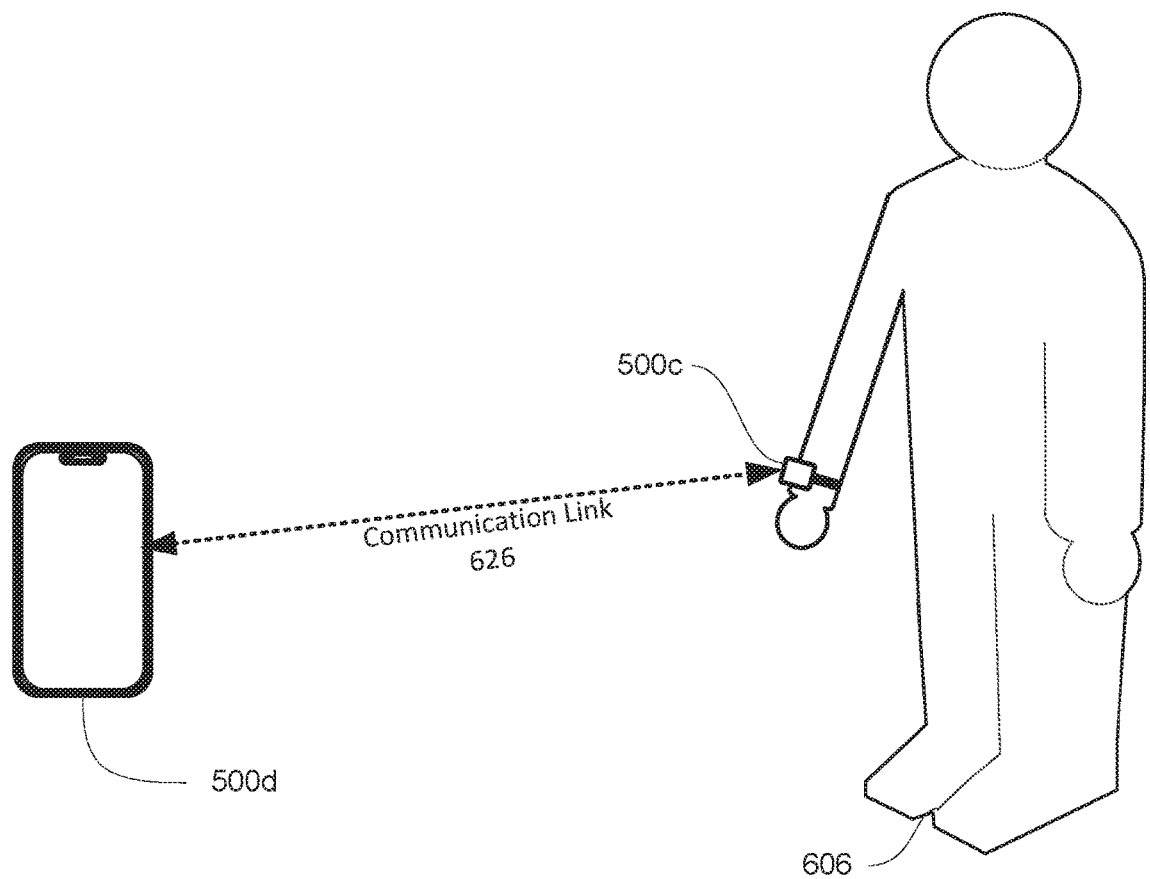

FIG. 6U illustrates a third exemplary electronic device 500*c*, such as described with reference to FIGS. 5A-5H, in communication with a fourth exemplary electronic device 500*d*, such as described with reference to FIGS. 5A-5H. The third electronic device 500*c* is a wearable device such as a smart watch, and the fourth electronic device 500*d* is a mobile device such as a smart phone, media player, or tablet.

The third electronic device 500*c* is able to transmit motion gesture information to device 500*d* via communication link 626. The motion gesture information is optionally unprocessed motion data of the third electronic device 500*c* that the fourth electronic device 500*d* analyzes to detect performance of a predetermined sequence of one or more motion gestures, processed (e.g., by device 500*c*) motion data of the third electronic device 500*c* that the fourth electronic device 500*d* analyzes to detect performance of a predetermined sequence of one or more motion gestures, or an indication to perform an action based on the motion data collected and analyzed by the third electronic device 500*c*. That is to say, the third electronic device 500*c* and/or the fourth electronic device 500*d* are capable of analyzing motion data of the third electronic device 500*c* to detect a motion gesture sequence.

Figure 6V:
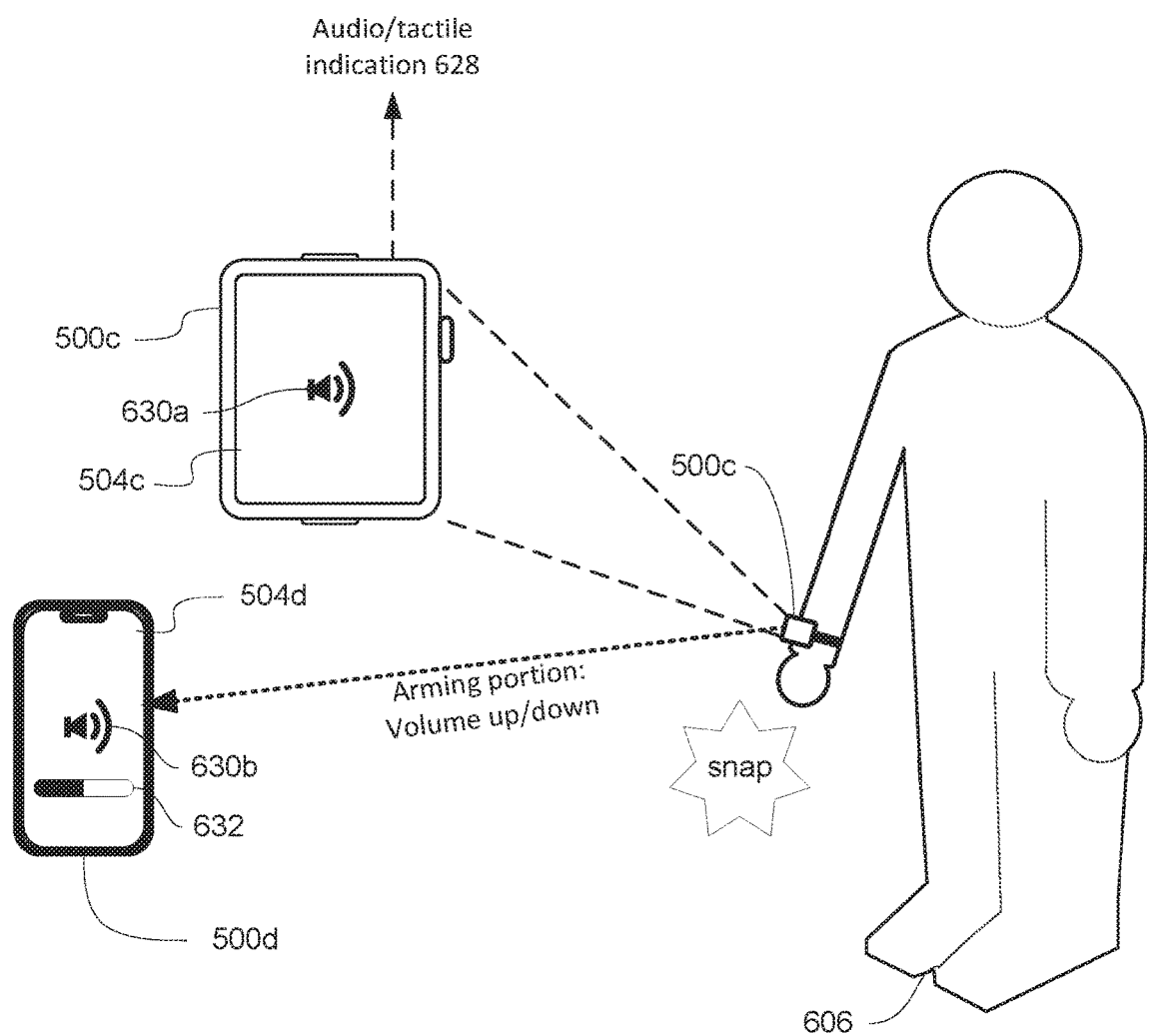
Figure 6W:
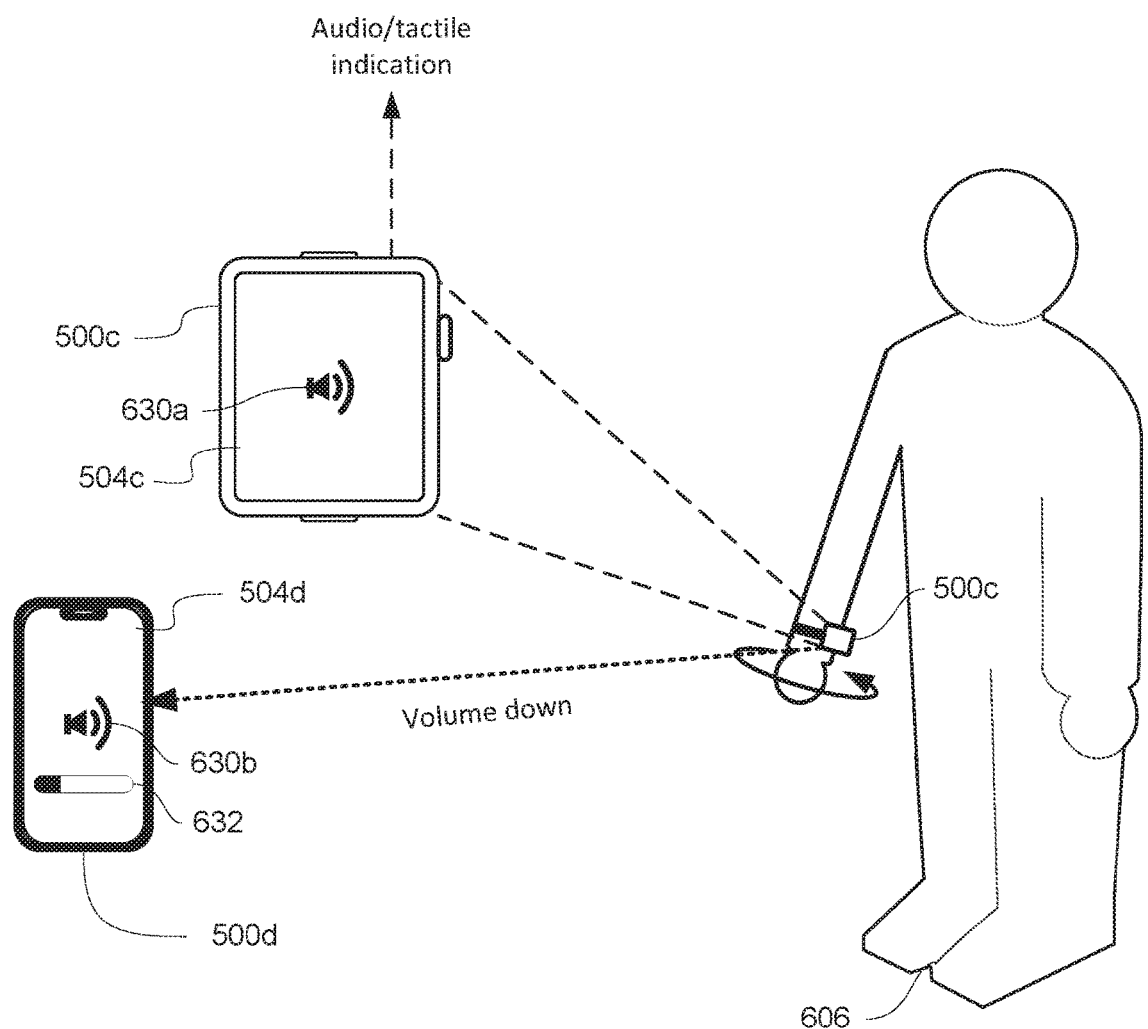
Figure 6X:
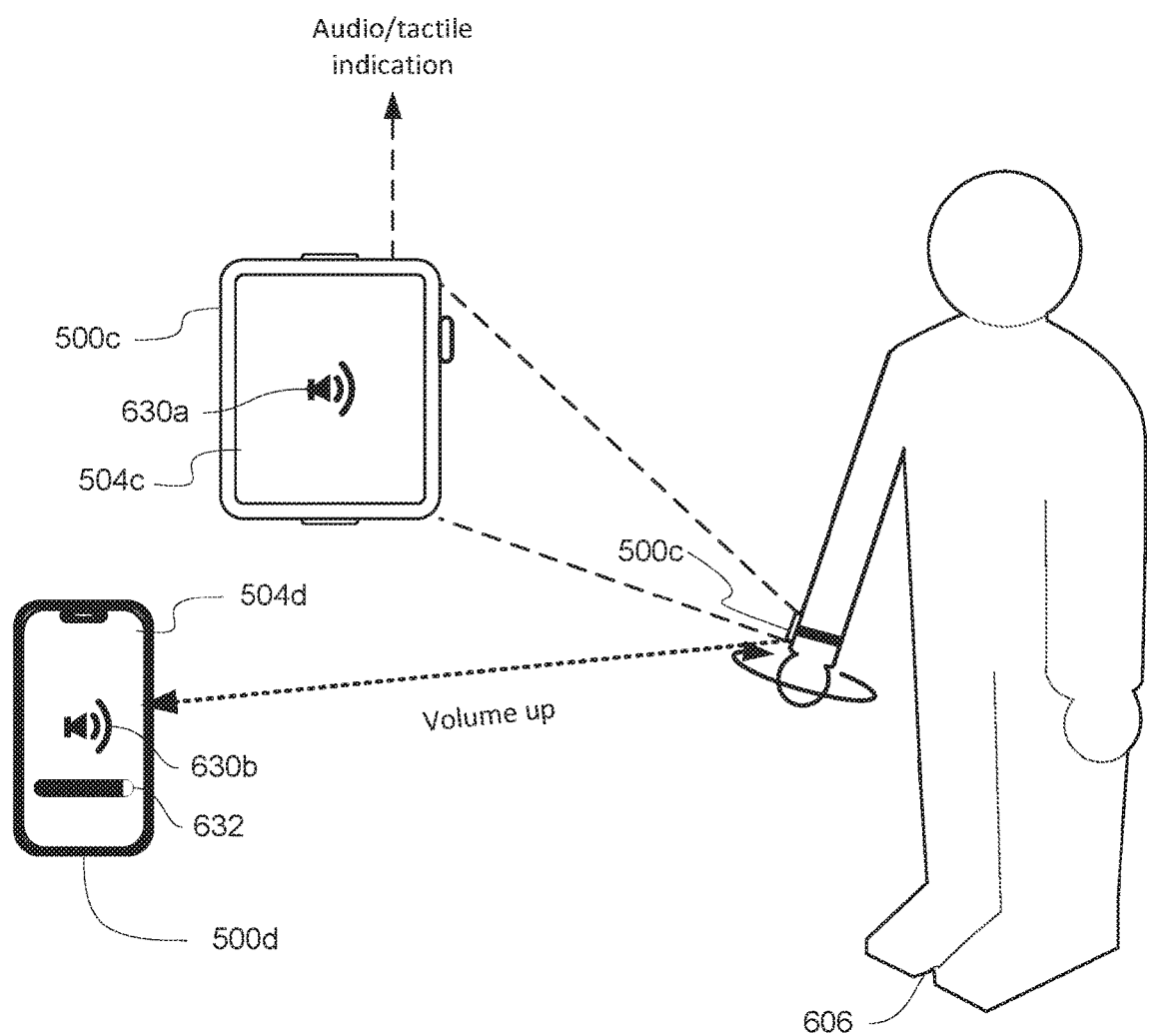

FIGS. 6V-6X illustrate a motion gesture sequence performed at the third electronic device 500*c* to cause the fourth electronic device 500*d* to change the playback volume of media content playing on the fourth electronic device 500*d* according to some embodiments.

FIG. 6V illustrates an arming portion of a motion gesture sequence performed at the third electronic device 500*c* that, if performed, causes the fourth electronic device 500*d* to change the playback volume of media content playing on the fourth electronic device 500*d*. As shown in FIG. 6V, the arming portion of the motion gesture sequence is detected when the motion and/or audio data of the third electronic device 500*c* indicates that the user 606 snaps their fingers while wearing the third electronic device 500*c*. In response to detecting the arming portion of the motion gesture sequence, the third electronic device 500*c* presents an audio and/or tactile indication 628 of the arming portion of the volume-change motion gesture sequence. The display 504*c* of the third electronic device 500*c* presents a visual indication 630*a* of the arming portion of the volume-change motion gesture sequence and the display 504*d* of the fourth electronic device 500*d* presents a visual indication 630*a* of the arming portion of the volume-change motion gesture sequence and an indication 632 of the current playback volume of the media playing on the fourth electronic device 500d.

FIG. 6W illustrates a triggering portion of a motion gesture sequence performed at the third electronic device 500c that, if performed, causes the fourth electronic device 500d to lower the playback volume of the media content playing on the fourth electronic device 500d. The triggering portion of the motion gesture sequence is detected after the arming portion of the motion gesture sequence illustrated in FIG. 6V is detected. As shown in FIG. 6W, the triggering portion of the motion gesture sequence is detected when the motion data of the third electronic device 500c indicates that the user twists their wrist counterclockwise (e.g., as though the user is turning a volume knob counterclockwise with their hand). In response to detection of the triggering portion of the motion gesture sequence, the fourth electronic device 500d lowers the playback volume of the media content playing on the fourth electronic device 500d. The indication 632 of the playback volume is updated in accordance with the change in playback volume.

FIG. 6X illustrates a triggering portion of a motion gesture sequence performed at the third electronic device 500c that, if performed, causes the fourth electronic device 500d to increase the playback volume of the media content playing on the fourth electronic device 500d. The triggering portion of the motion gesture sequence is detected after the arming portion of the motion gesture sequence illustrated in FIG. 6V is detected. As shown in FIG. 6X, the triggering portion of the motion gesture sequence is detected when the motion data of the third electronic device 500c indicates that the user twists their wrist clockwise (e.g., as though the user is turning a volume knob clockwise with their hand). In response to detection of the triggering portion of the motion gesture sequence, the fourth electronic device 500d increases the playback volume of the media content playing on the fourth electronic device 500d. The indication 632 of the playback volume is updated in accordance with the change in playback volume. Thus, as illustrated in FIGS. 6V-6X, the volume-control motion gesture sequence, if performed (e.g., at the third electronic device 500c), causes the fourth electronic device 500d to change the playback volume. It should be understood that other motion gesture sequences that cause the fourth electronic device 500d to perform other actions (e.g., play/pause, scrubbing, next/previous) are possible.

In some embodiments, one or more motion gesture sequences include an initiating motion gesture performed before the arming portion of the motion gesture sequence. That is to say, performance of the initiating motion gesture prior to the rest of the motion gesture sequence is optionally required in order to cause an electronic device to perform an operation in response to the motion gesture sequence. Requiring an initiating motion gesture before the rest of the motion gesture sequence optionally prevents inadvertent gesture detection (e.g., the user unintentionally performs a motion gesture sequence) and allows the electronic devices to save power by, in some embodiments, reducing the amount of motion data collected and/or analyzed until the initiating gesture is detected.

Figure 6Y:
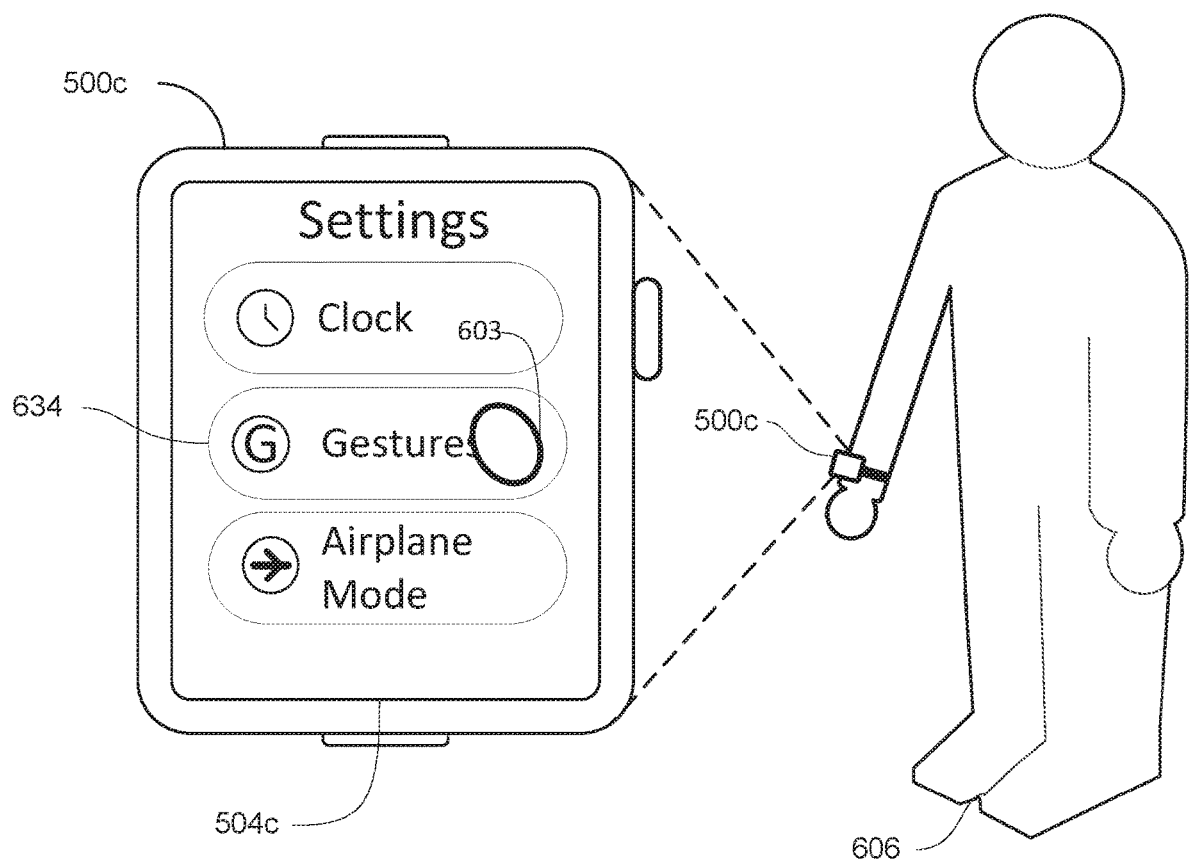

FIGS. 6Y-6HH illustrate an initiating portion of a motion gesture sequence that is detected before detecting the arming portion of the motion gesture sequence. The motion gesture sequence is performed at the third electronic device 500c to control operations of the third electronic device 500c. In some embodiments, the third electronic device 500c processes motion data during the motion gesture sequence and, in response to detection of a motion gesture sequence, performs the corresponding operation. In some embodiments, the third electronic device 500c transmits partially processed (e.g., by device 500c) or unprocessed motion data to a different electronic device (e.g., the fourth electronic device 500d) for the different electronic device to process. If the different electronic device detects a motion gesture sequence, the different electronic device optionally transmits to the third electronic device 500c an indication of an operation to be performed in response to the detected motion gesture sequence.

Figure 6Z:
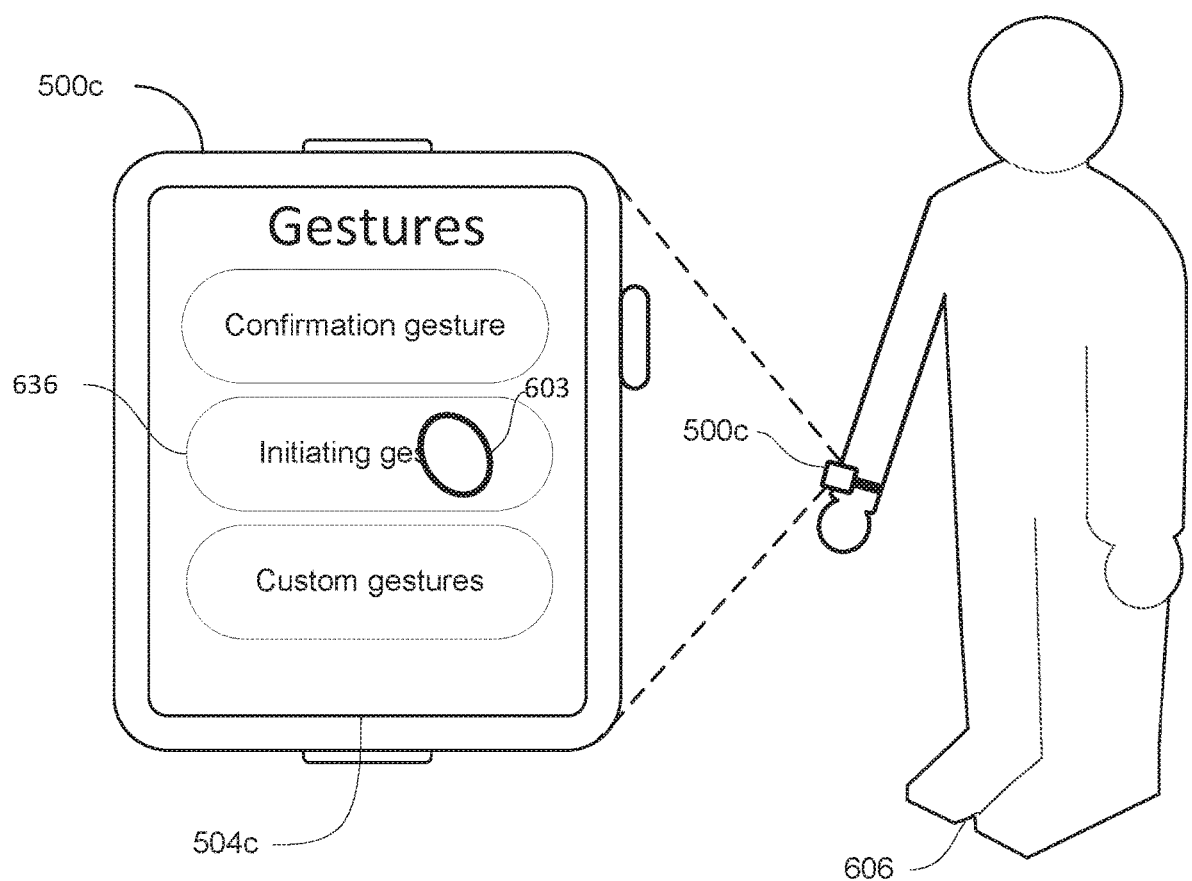
Figure 6A:
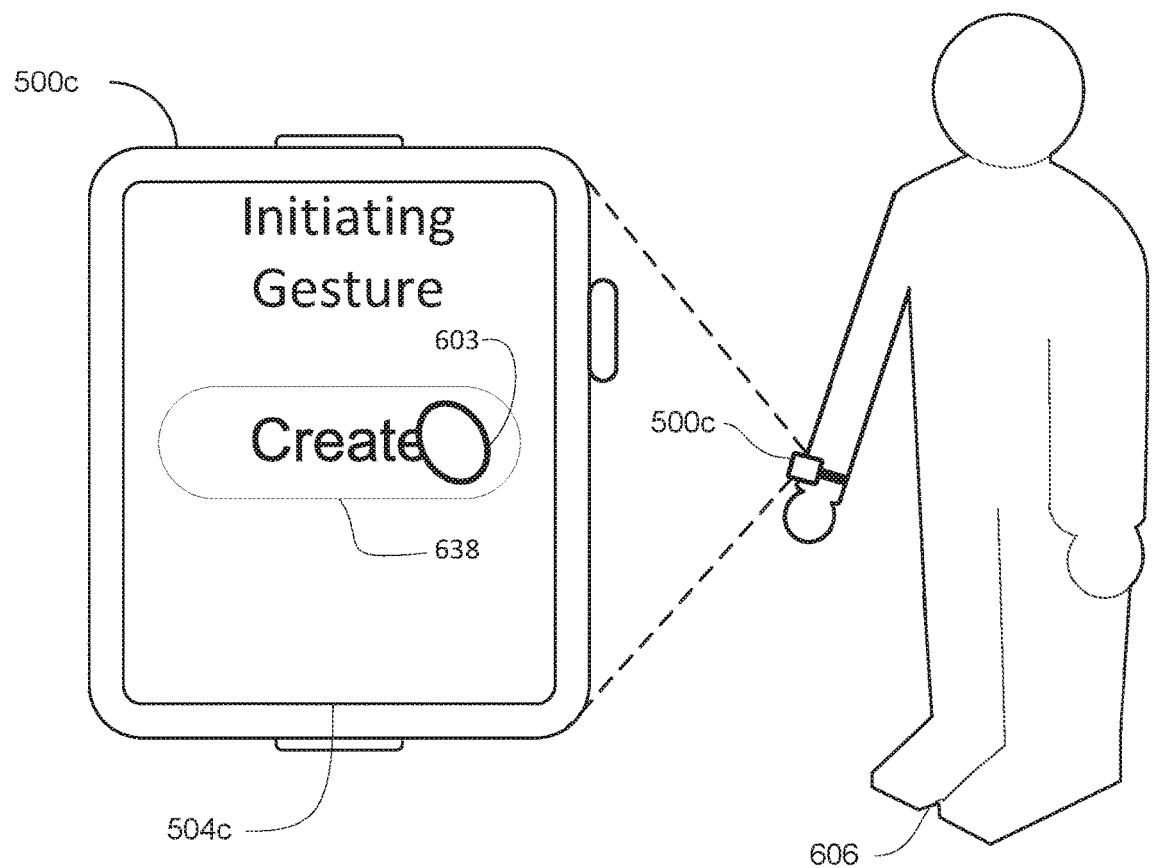
Figure 6B:
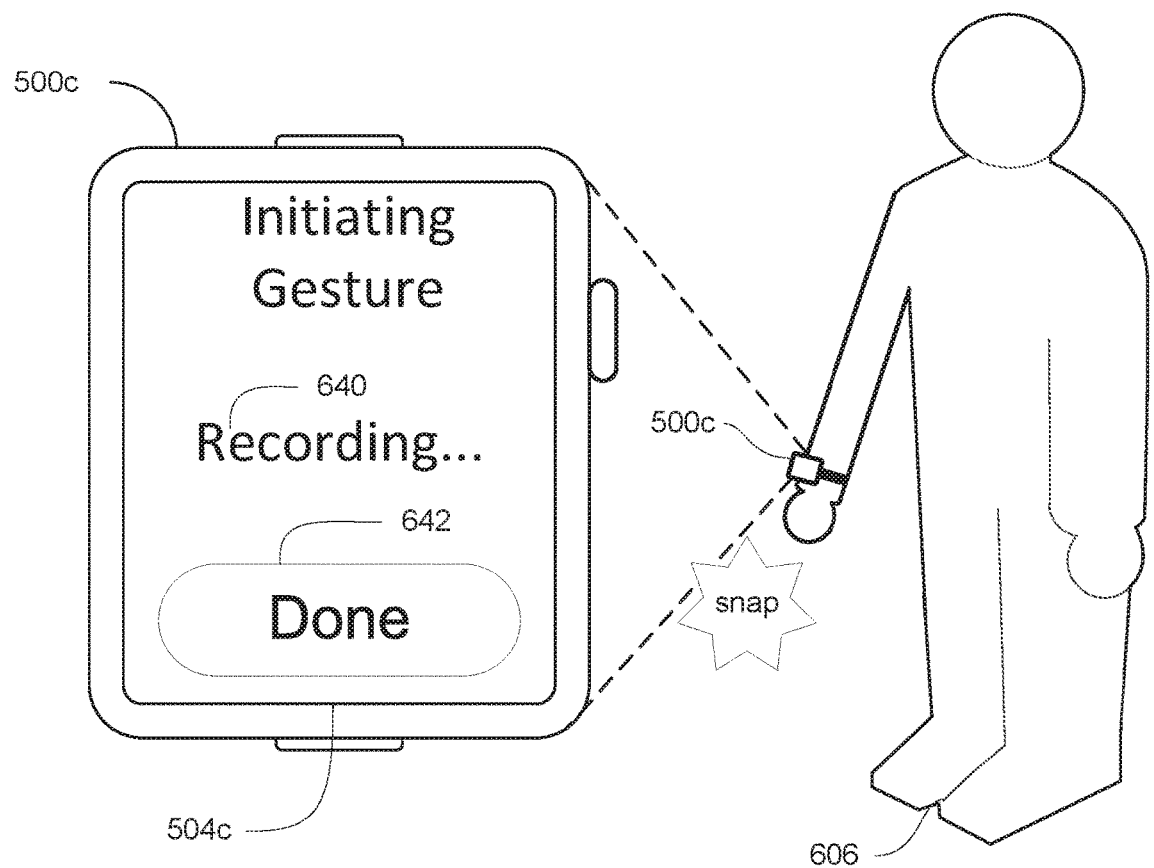
Figure 6C:
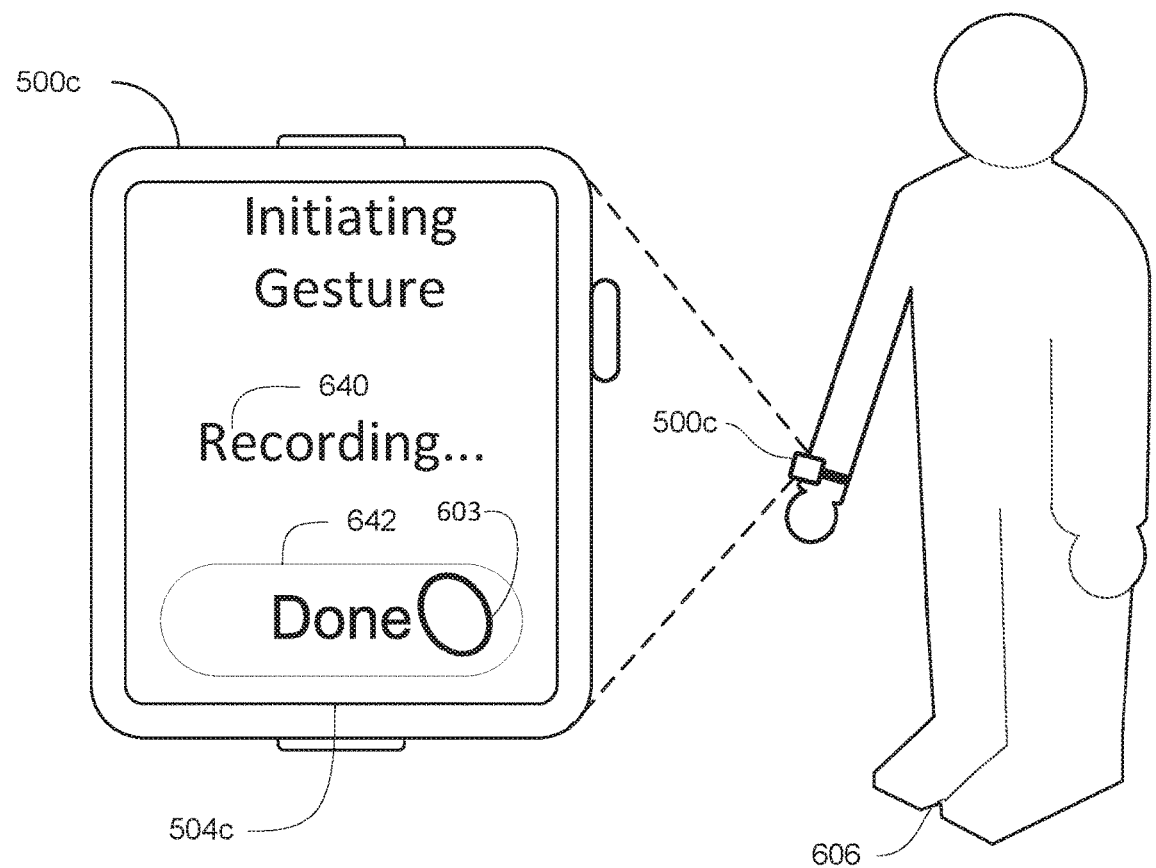
Figure 6D:
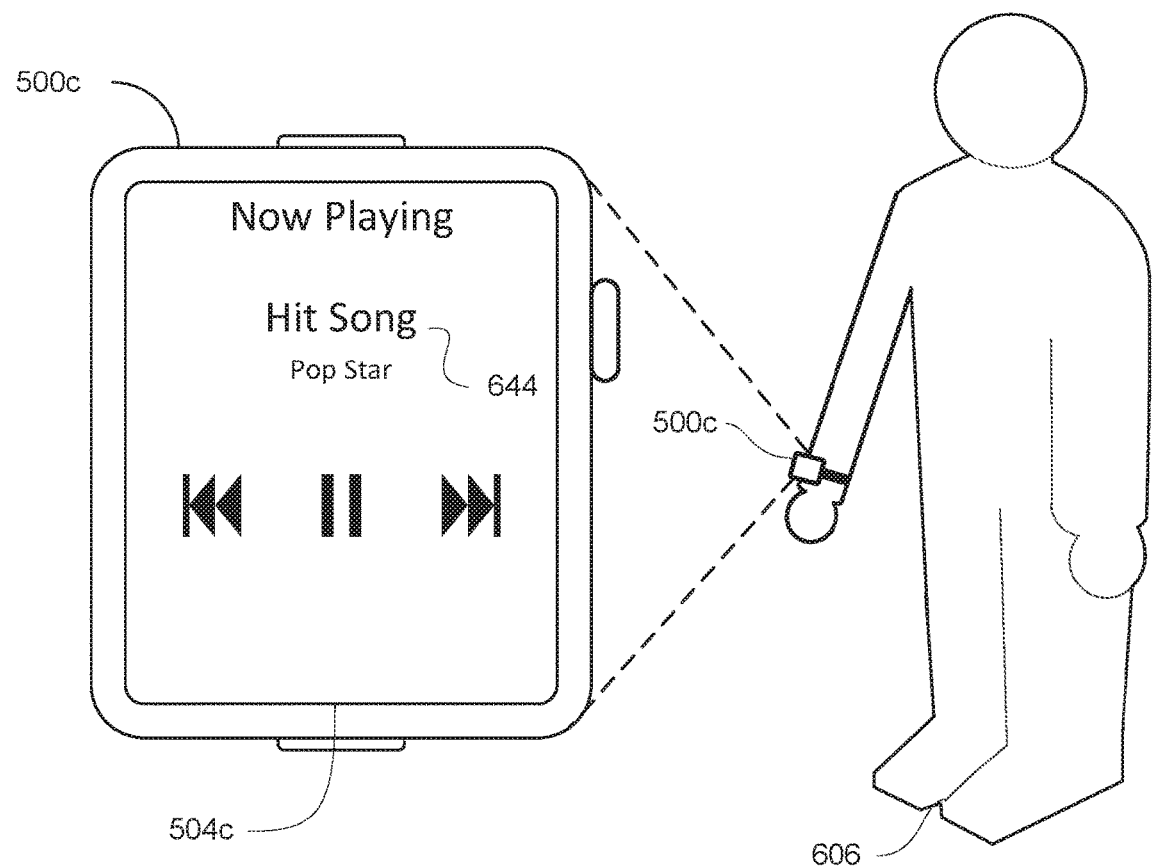
Figure 6E:
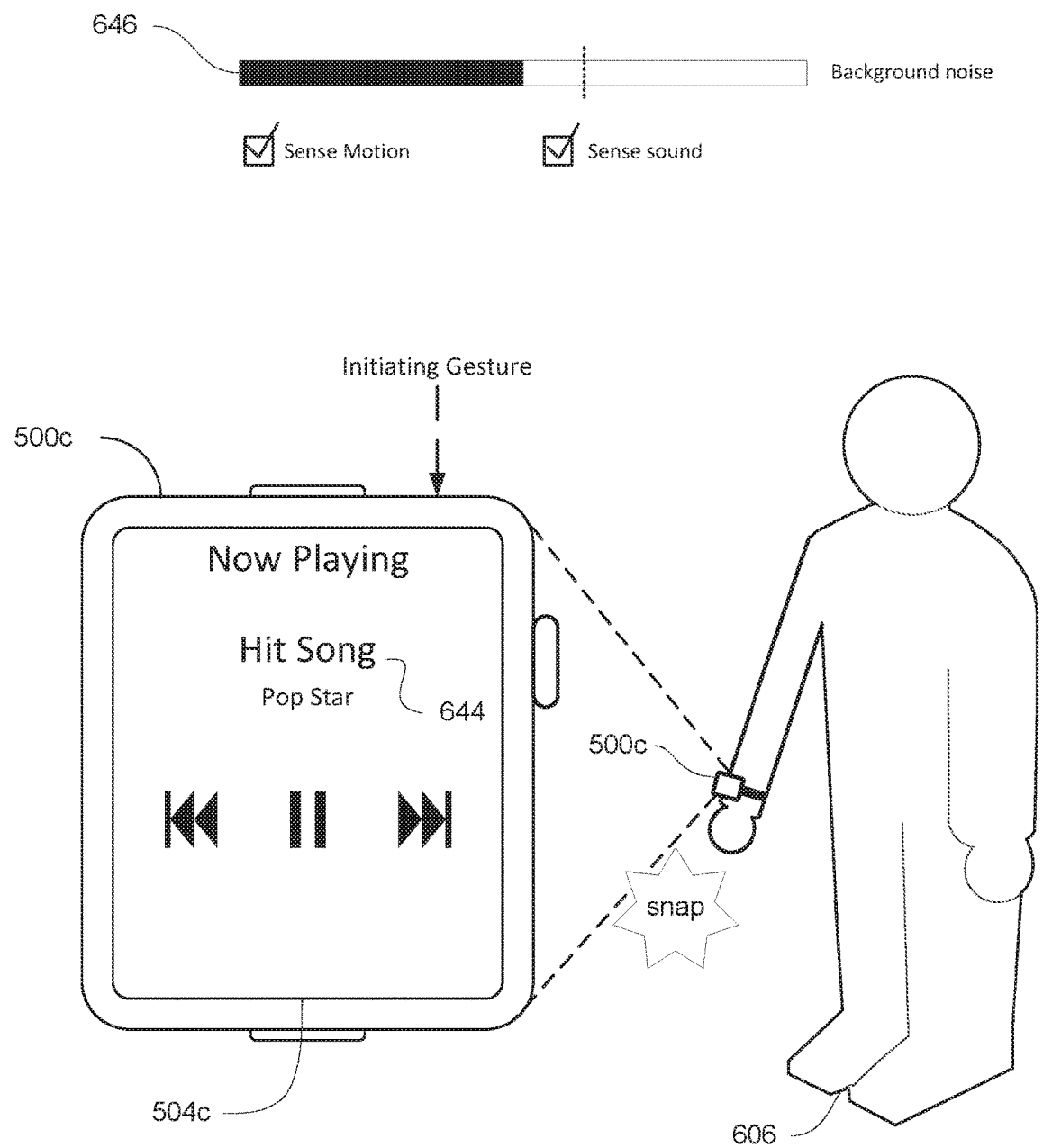
Figure 6F:
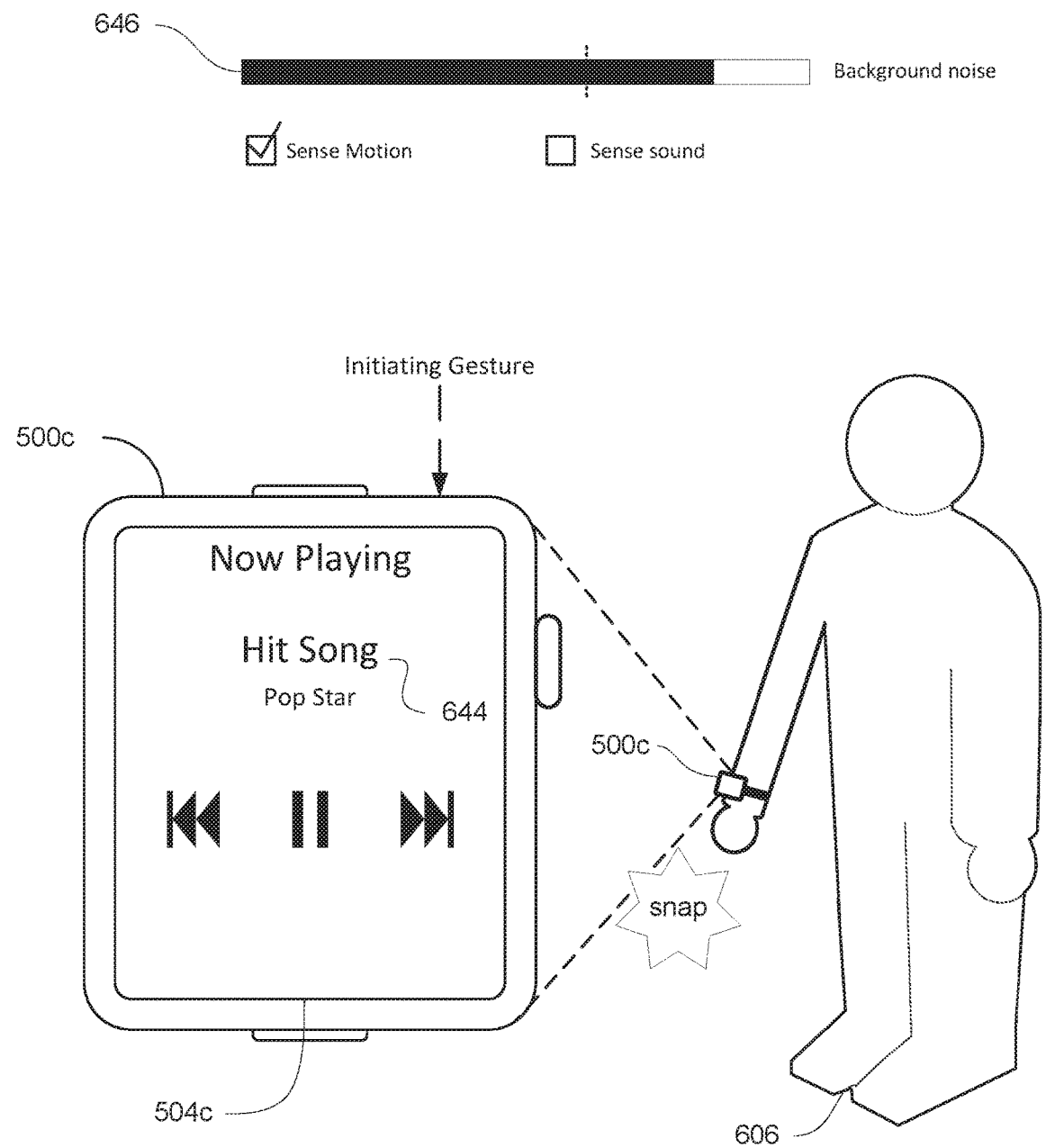
Figure 6G:
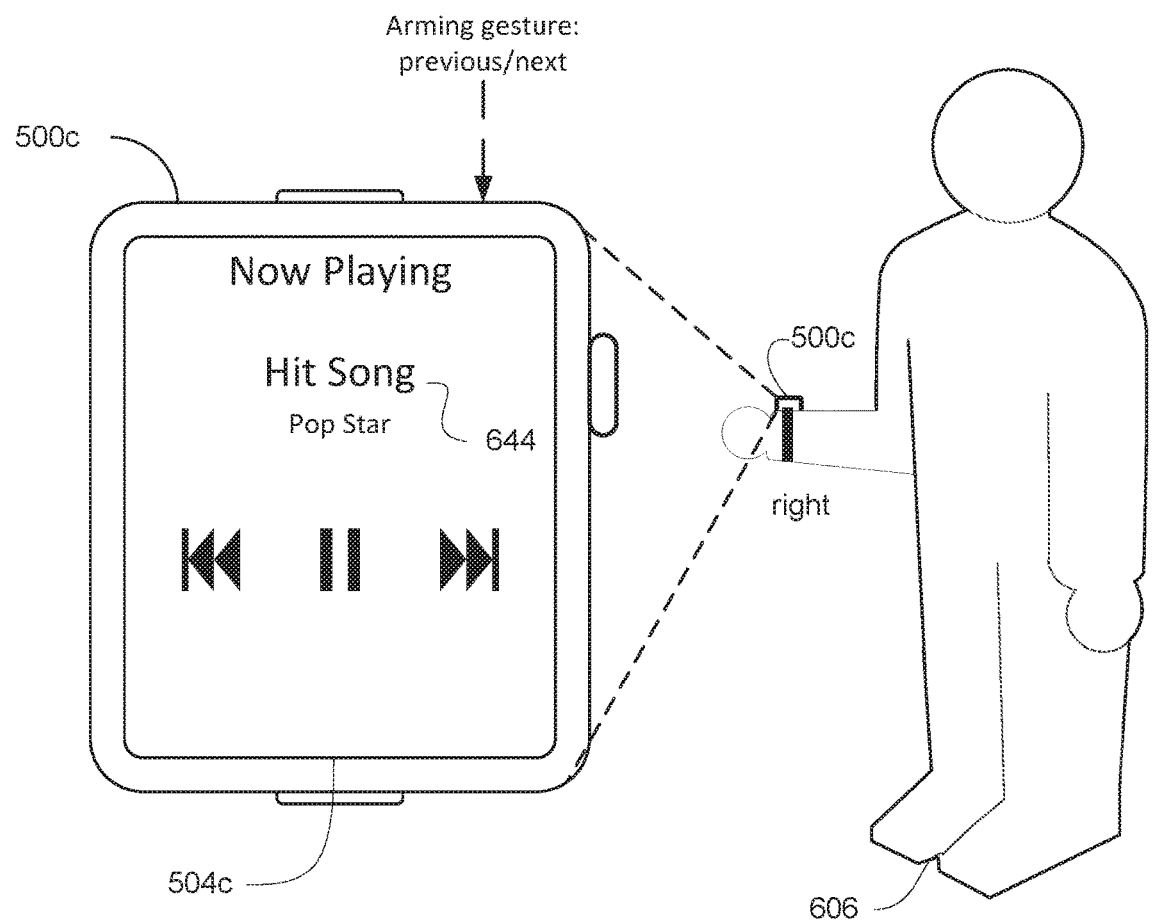
Figure 6H:
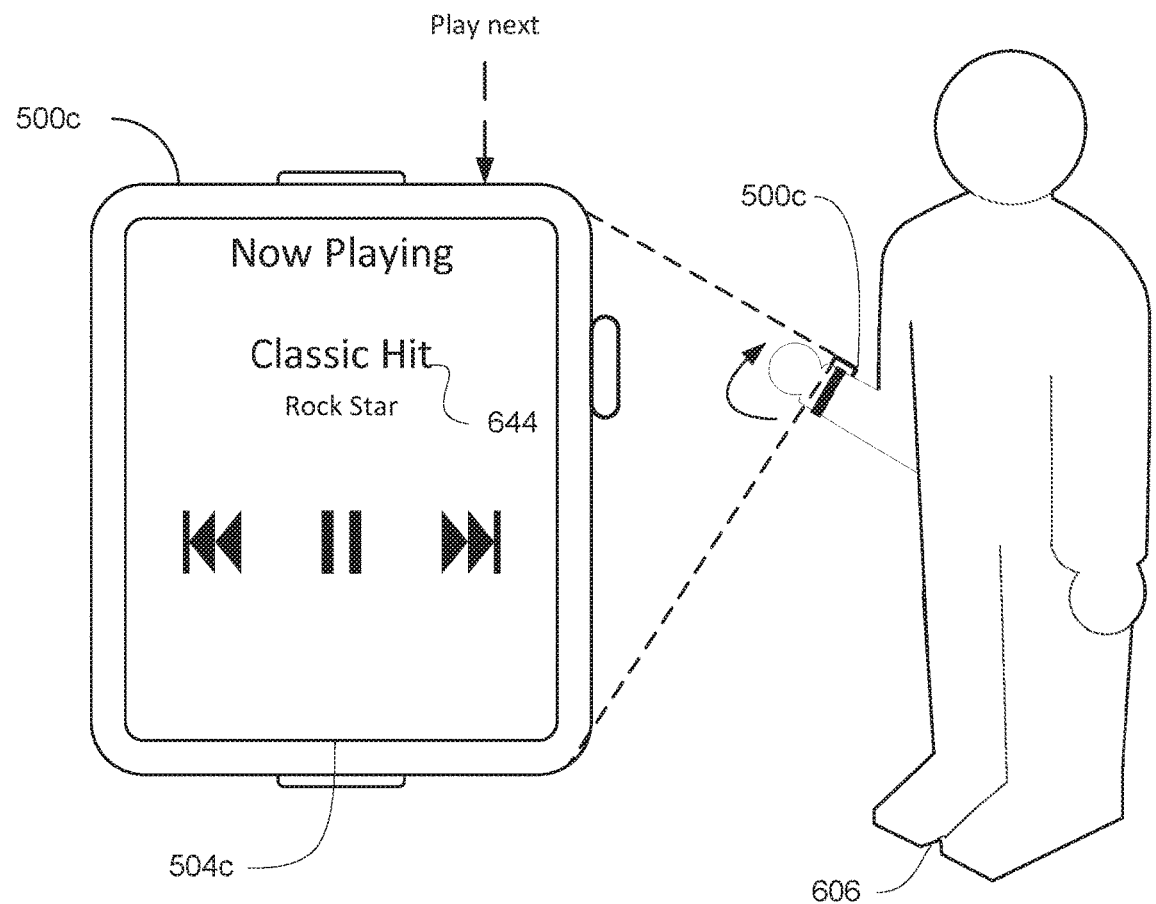
Figure 6I:
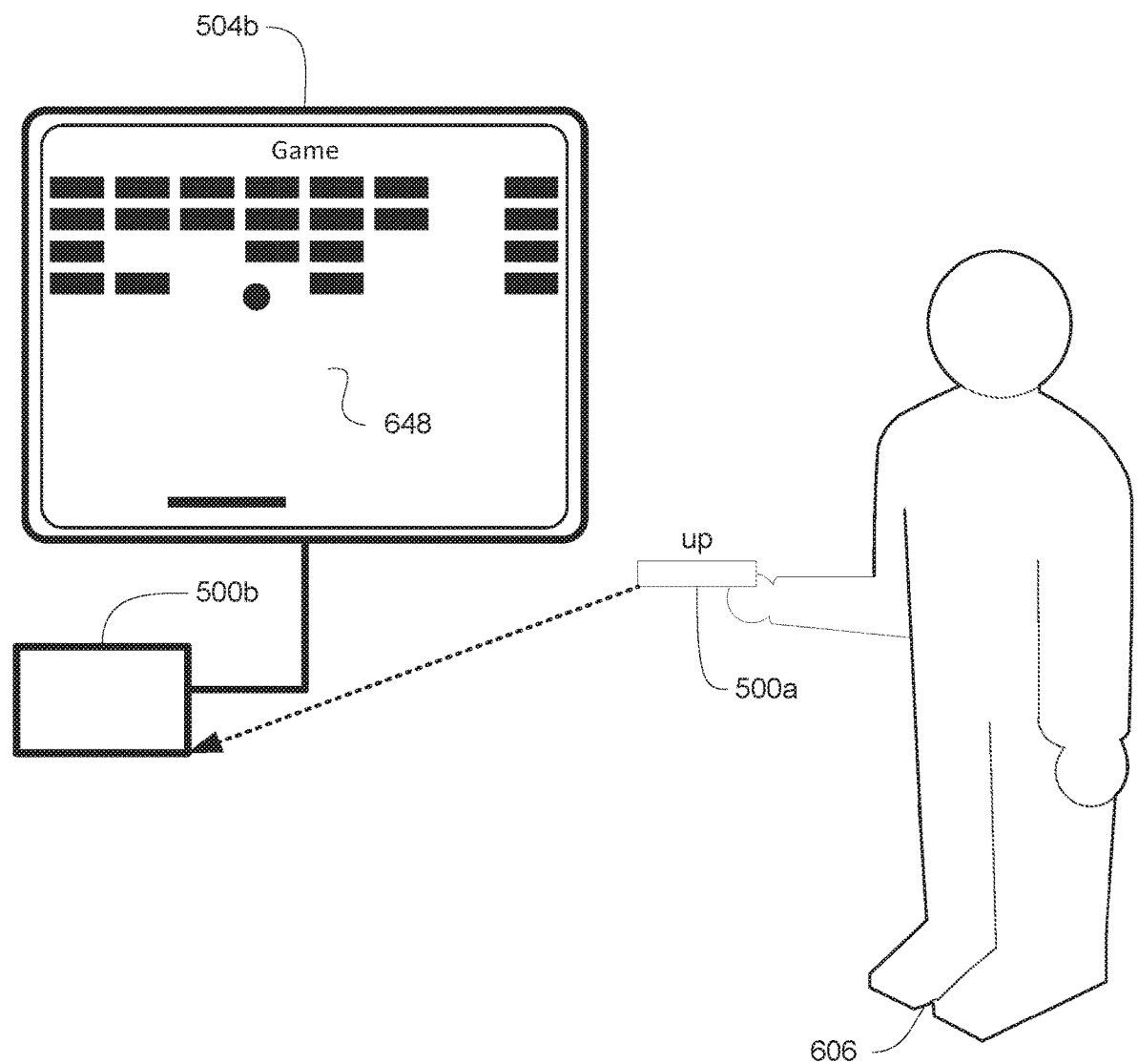
Figure 6J:
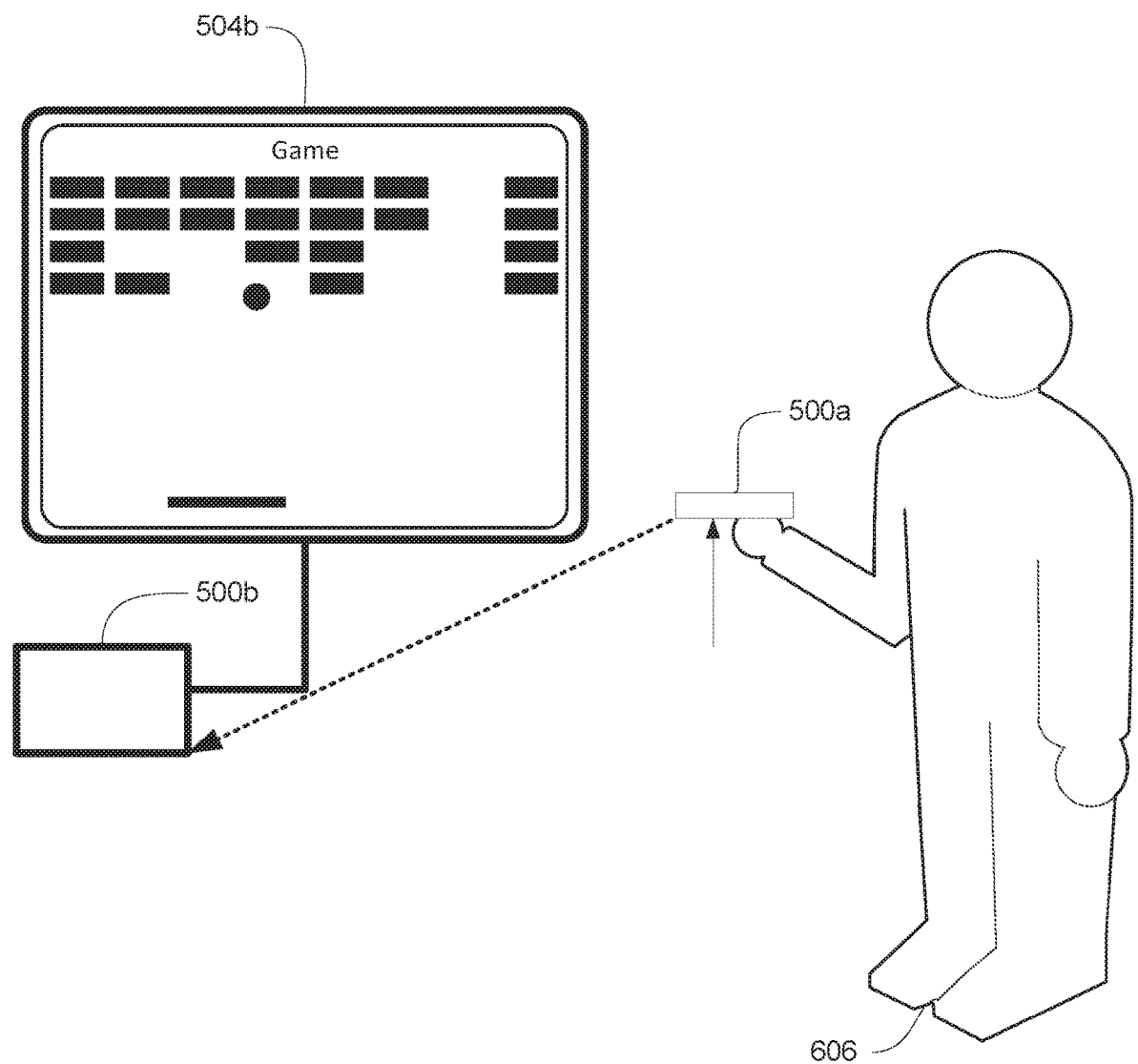
Figure 6K:
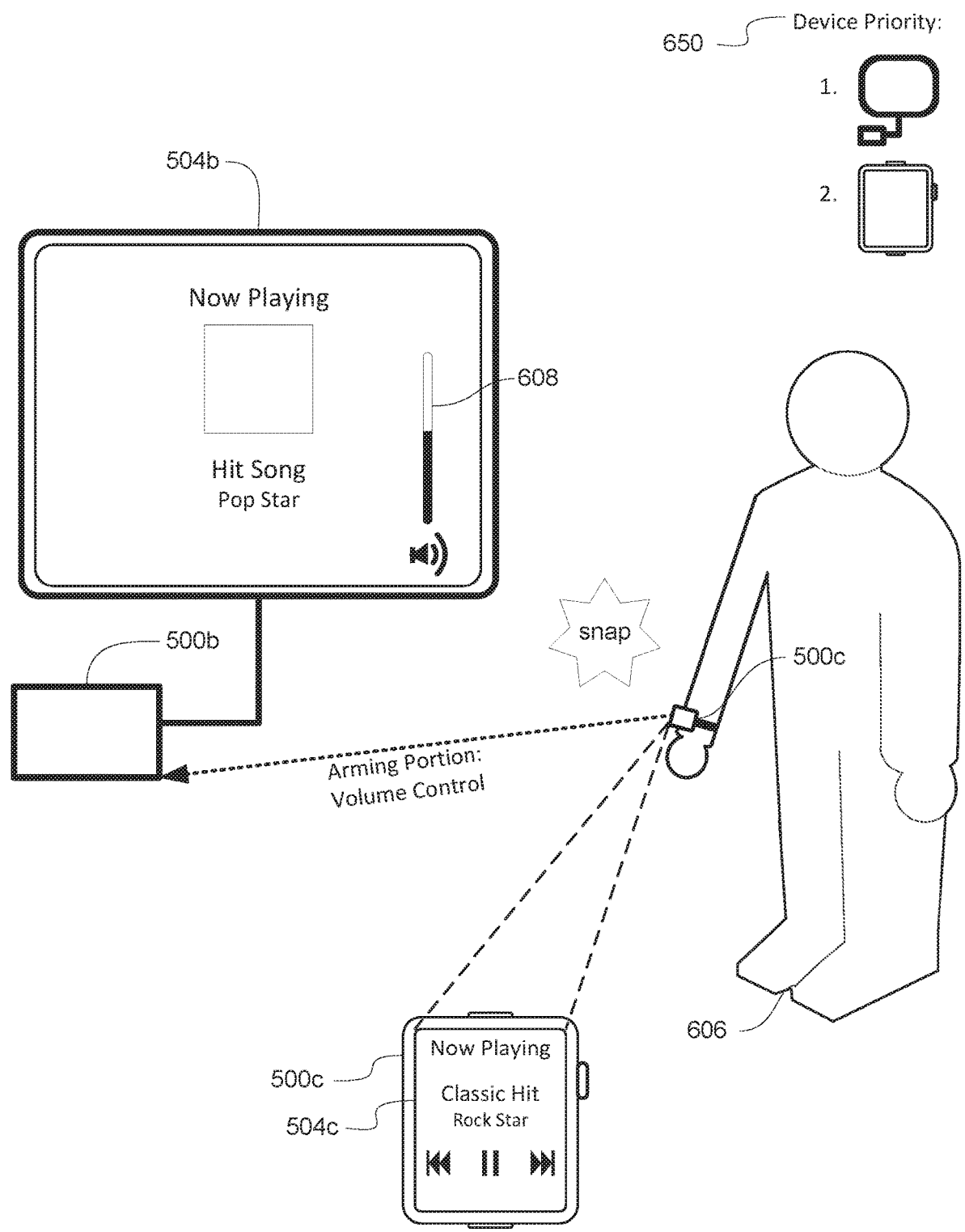
Figure 6L:
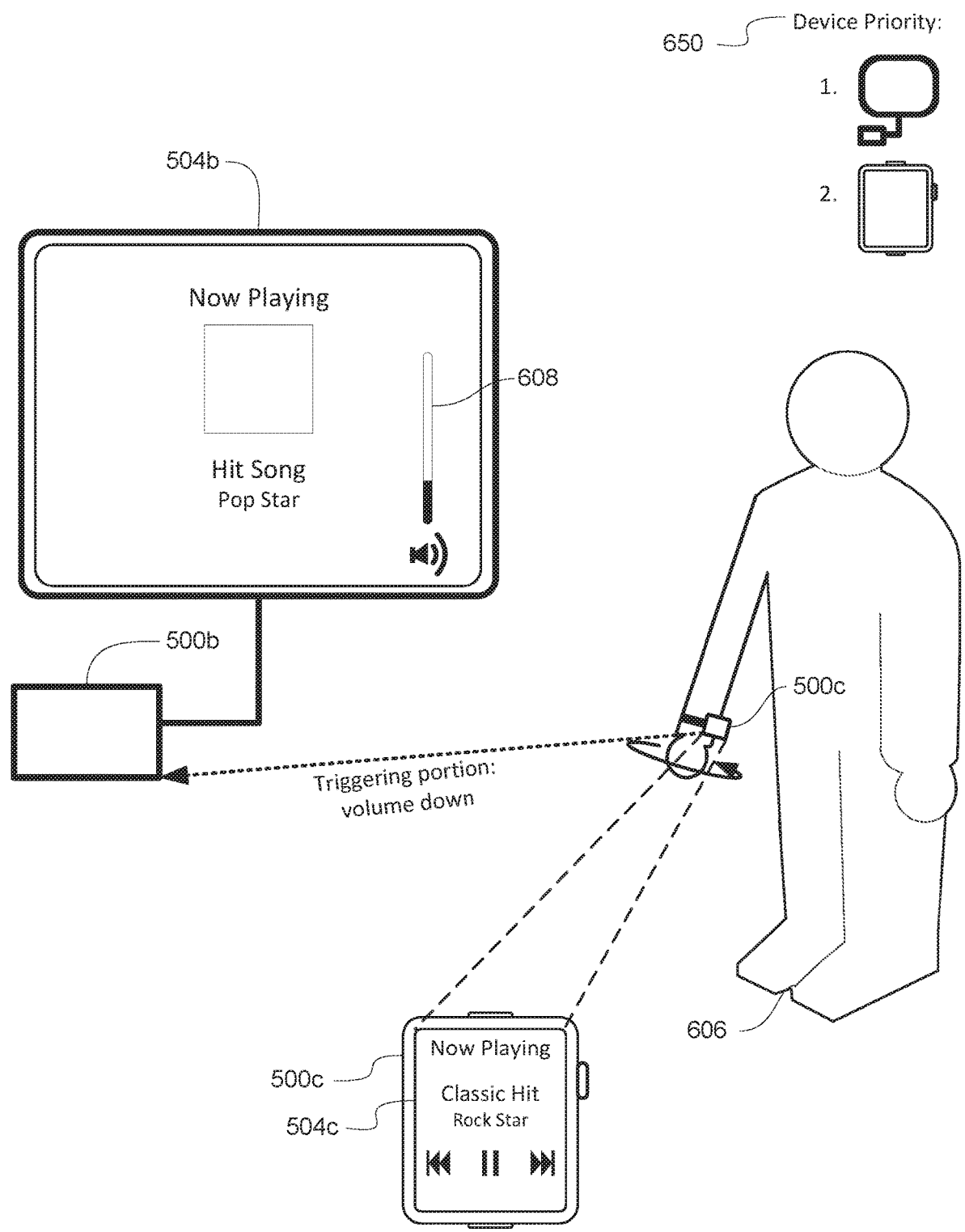
Figure 6M:
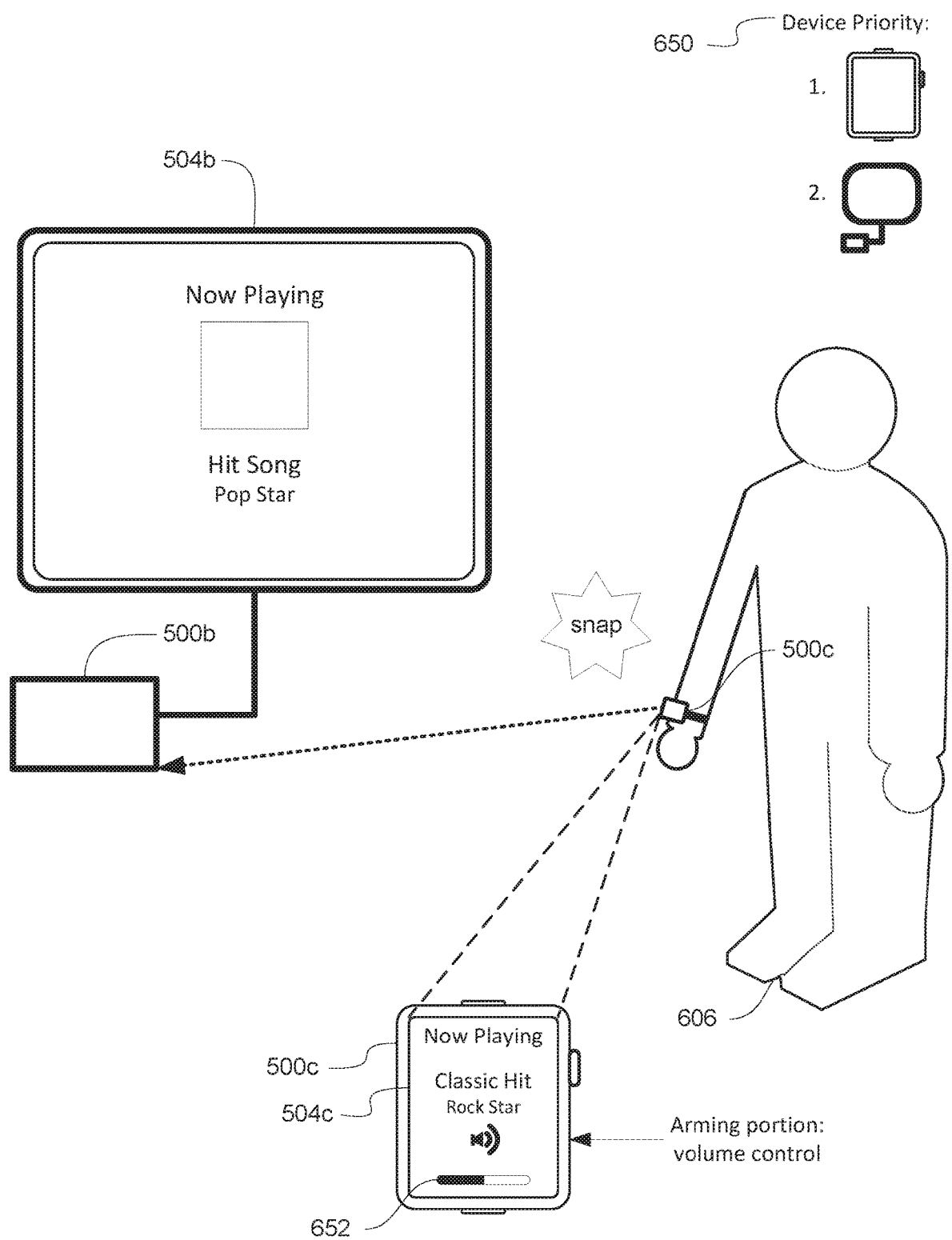
Figure 6N:
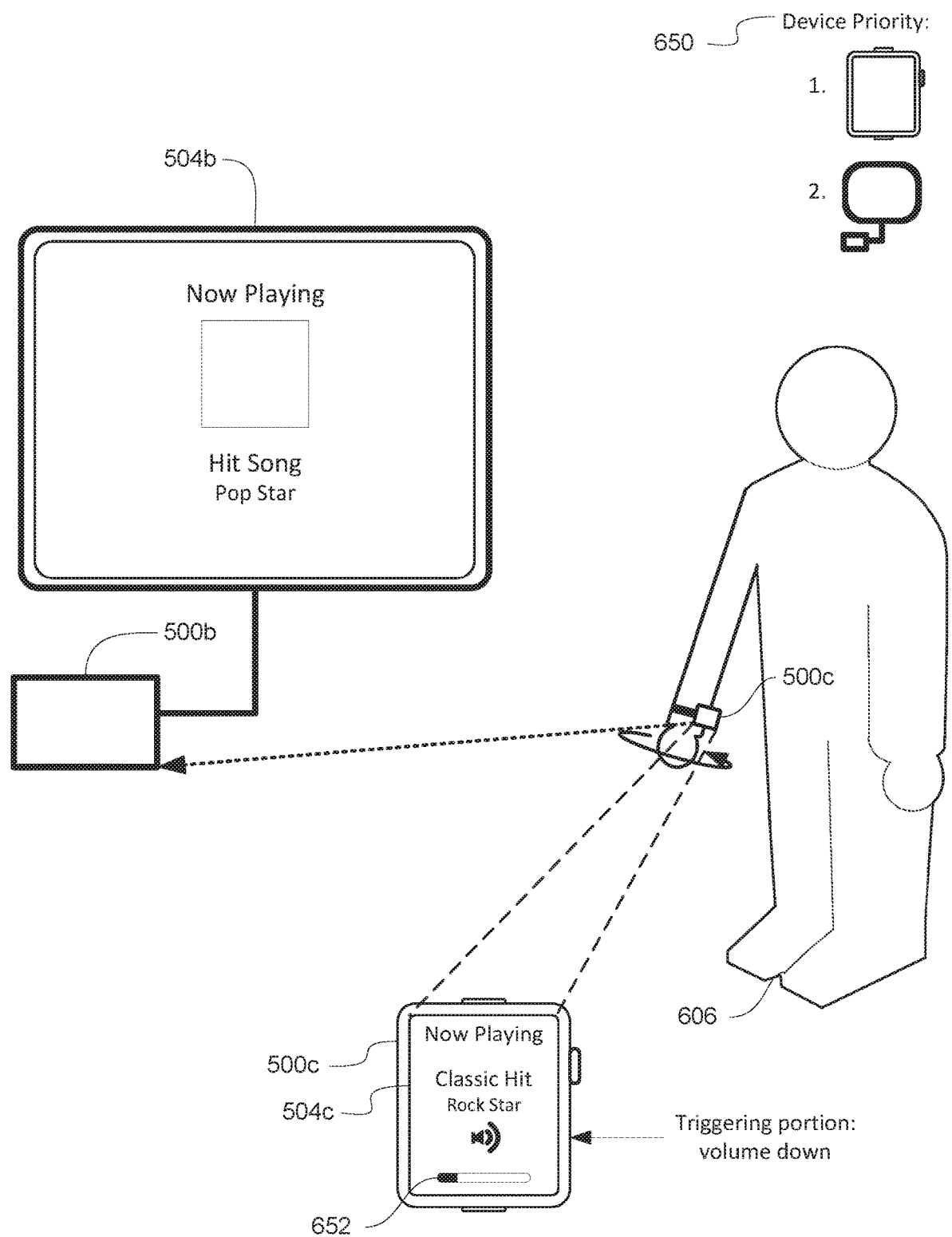
Figure 7B:
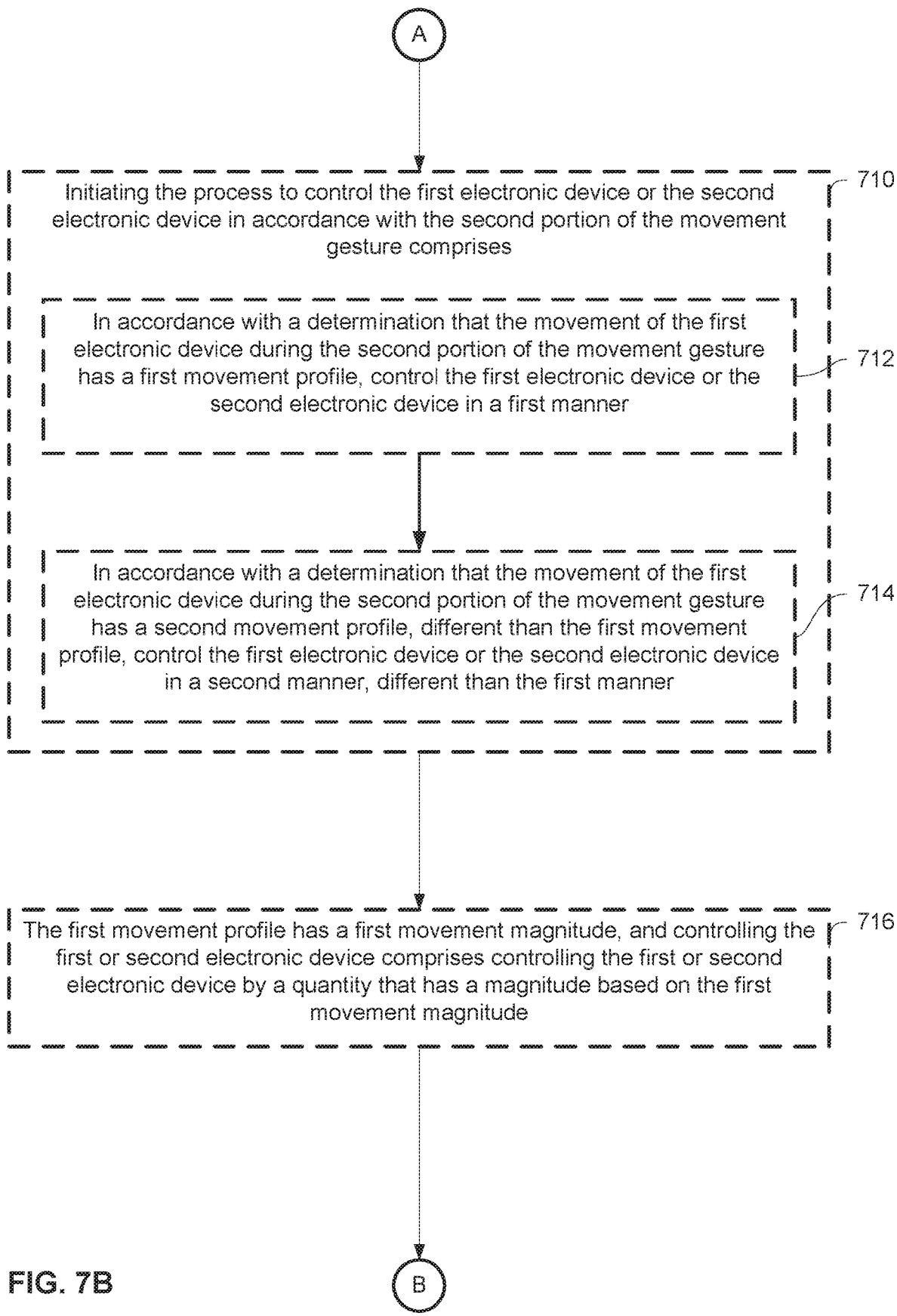
Figure 7C:
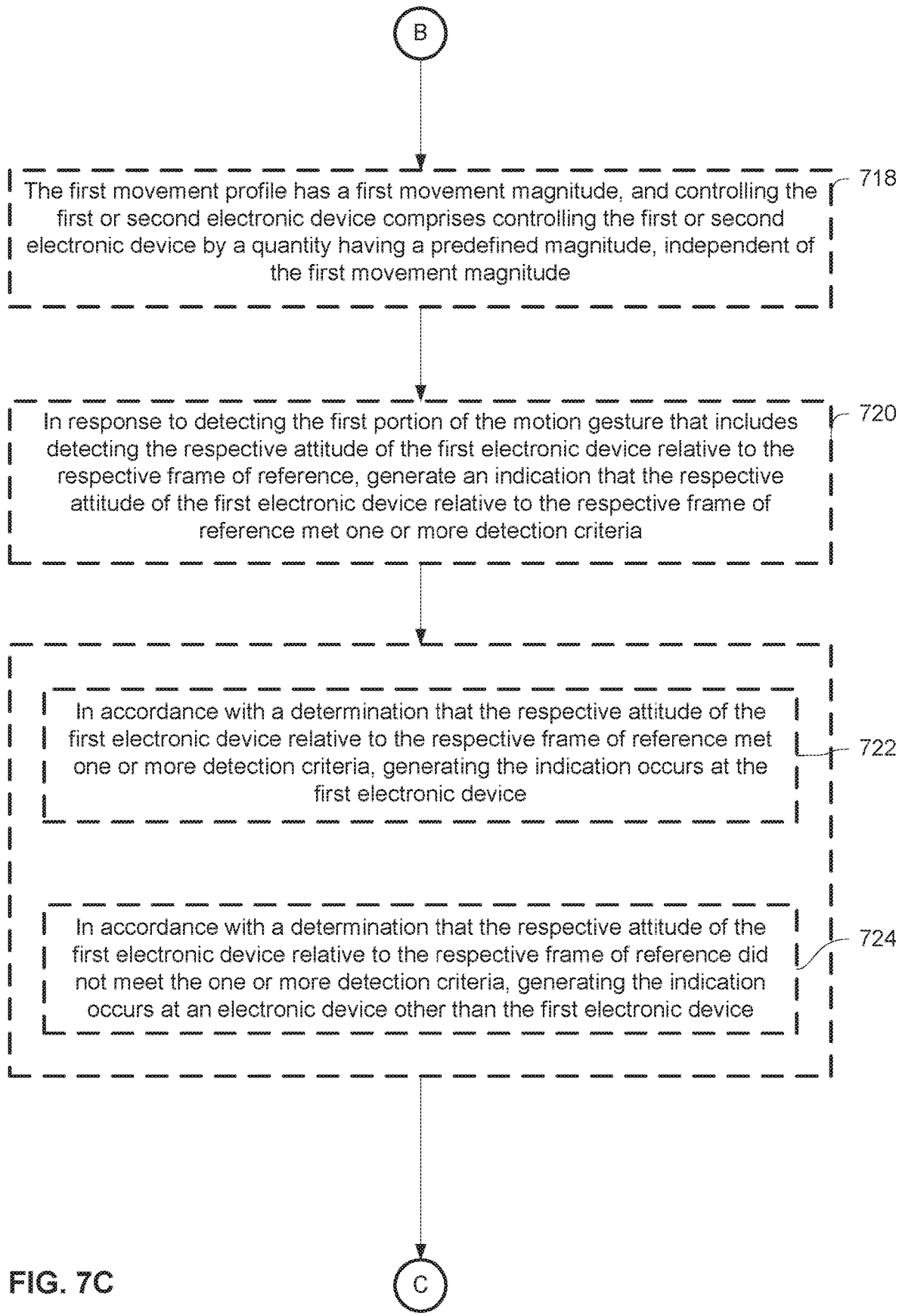
Figure 7D:
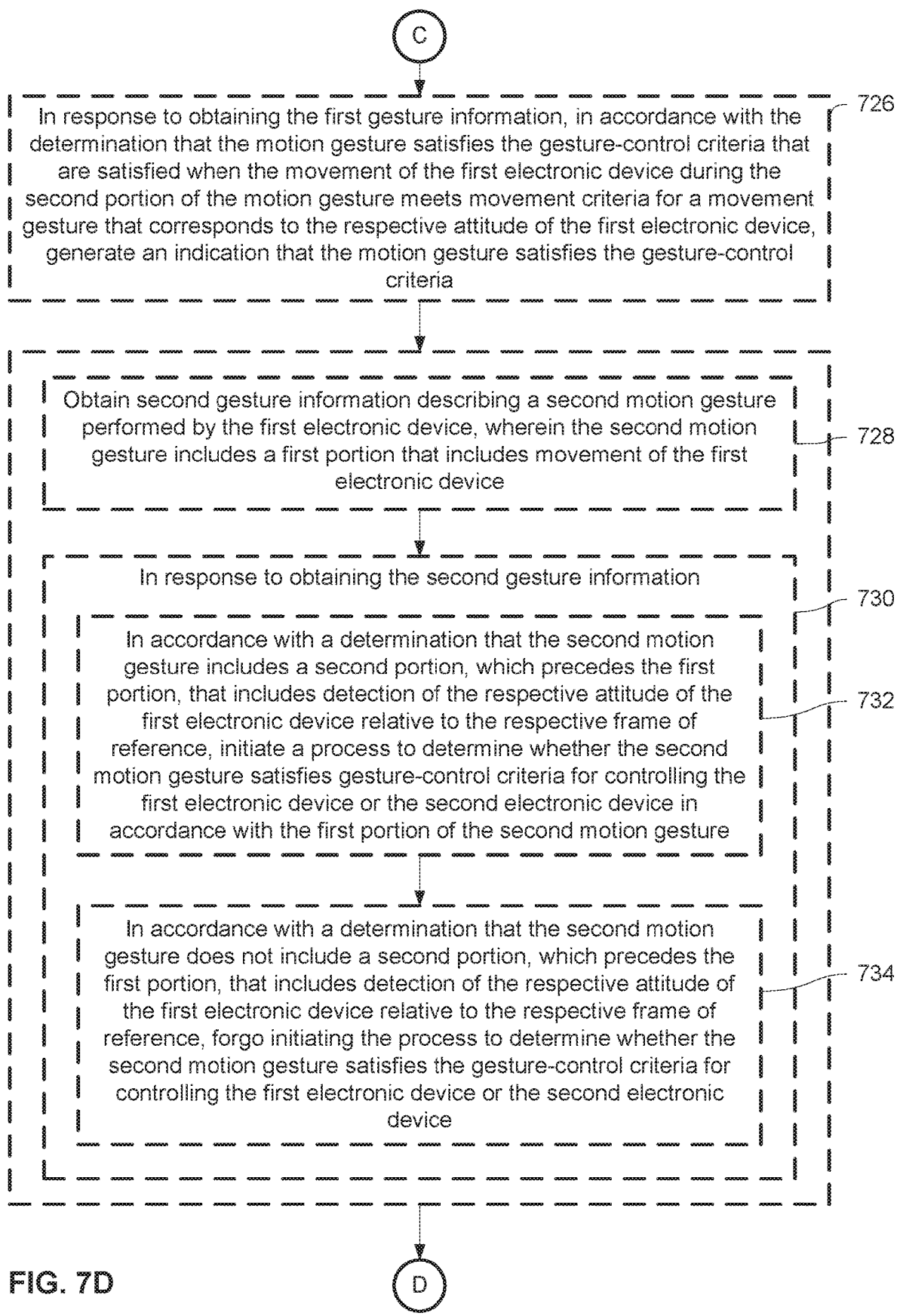
Figure 7E:
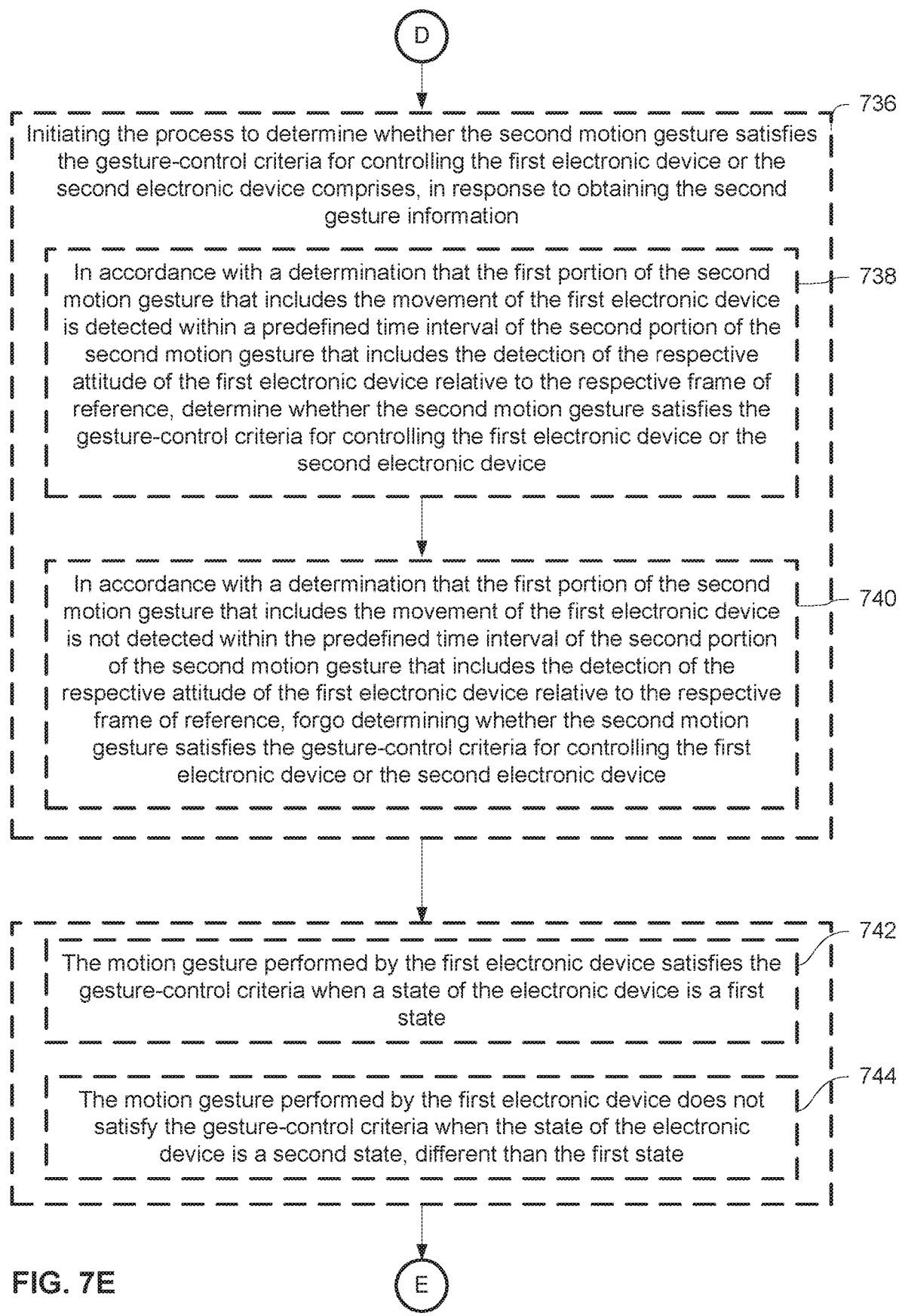
Figure 7F:
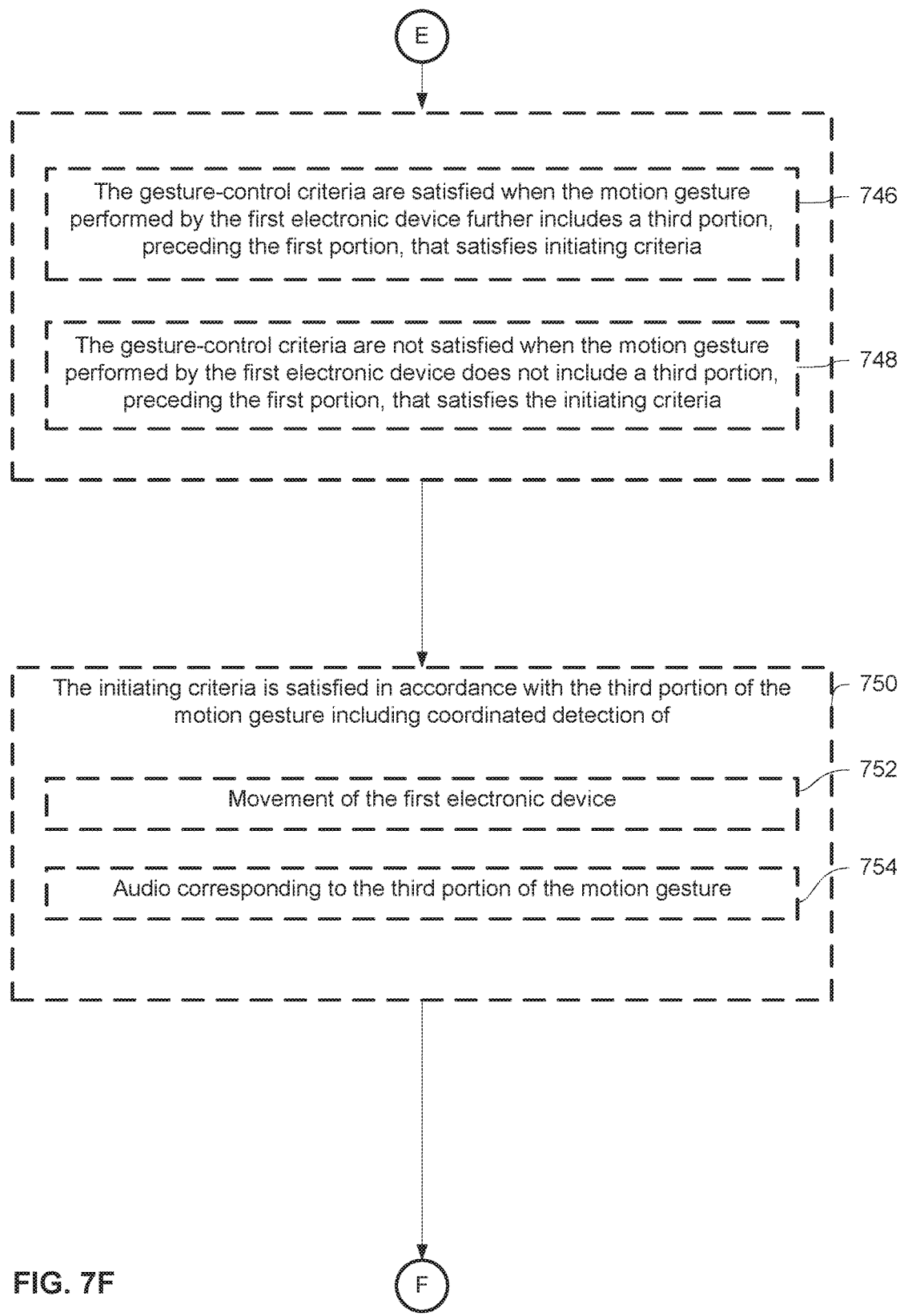
Figure 7G:
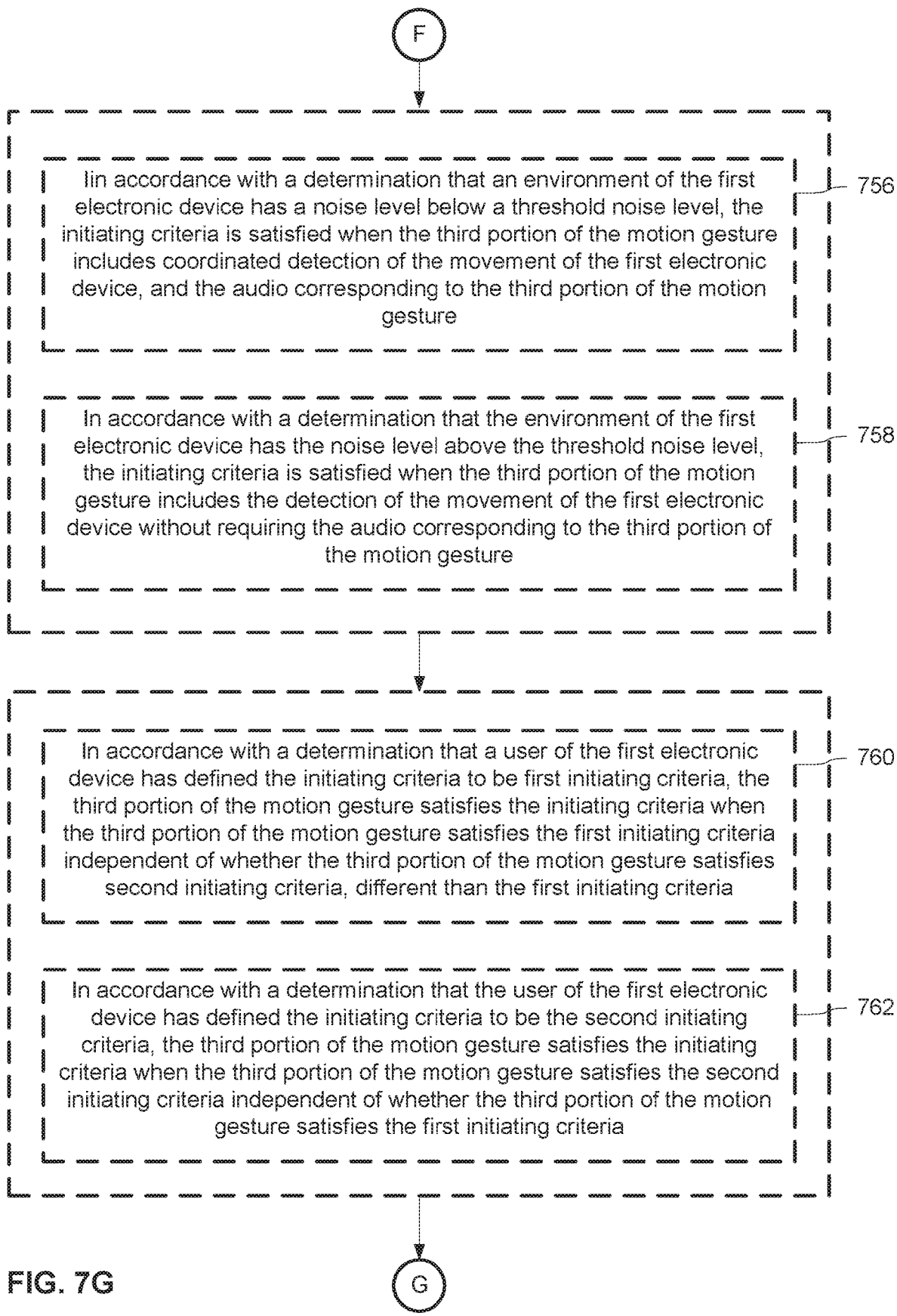
Figure 7H:
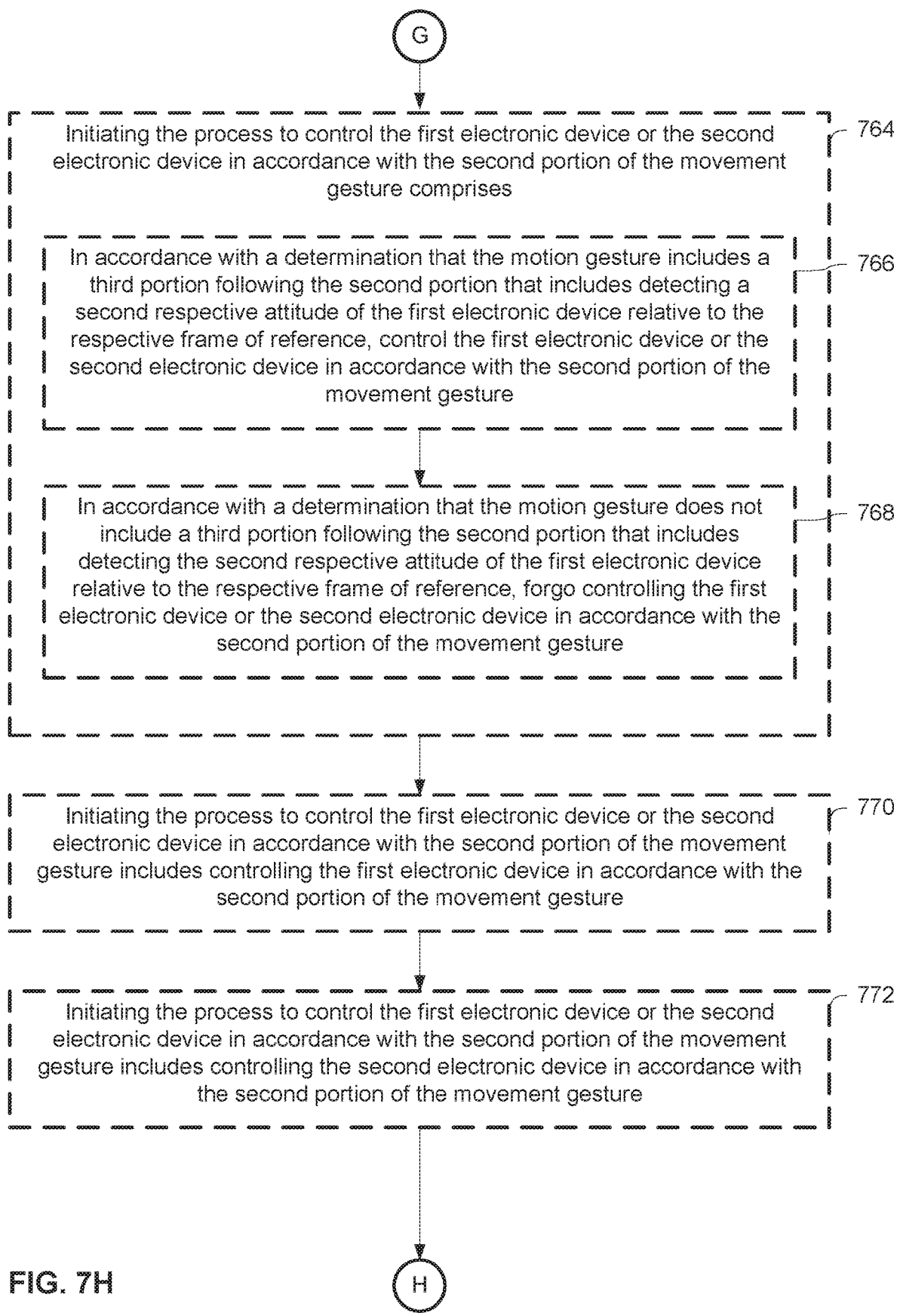
Figure 7I:
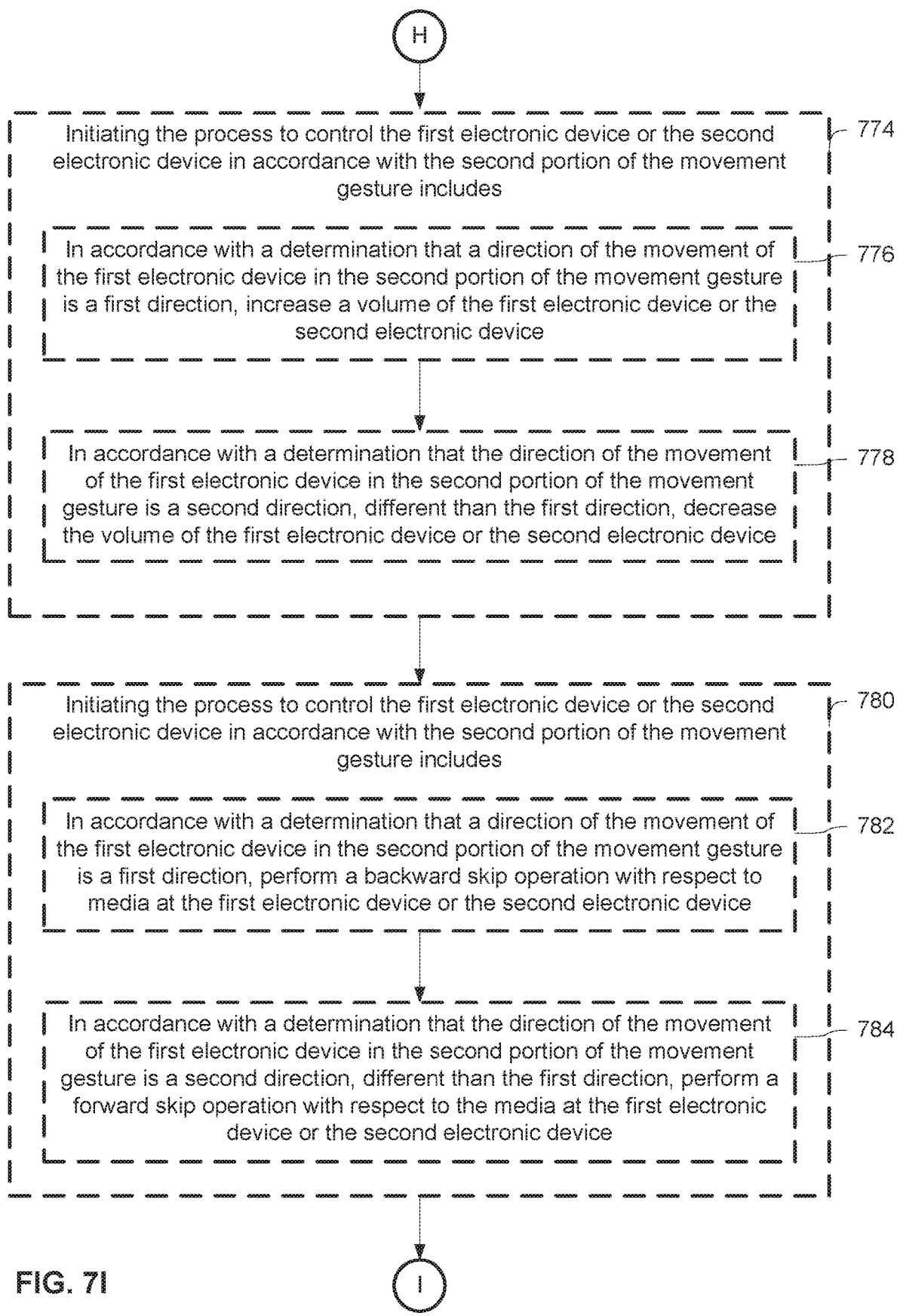
Figure 7J:
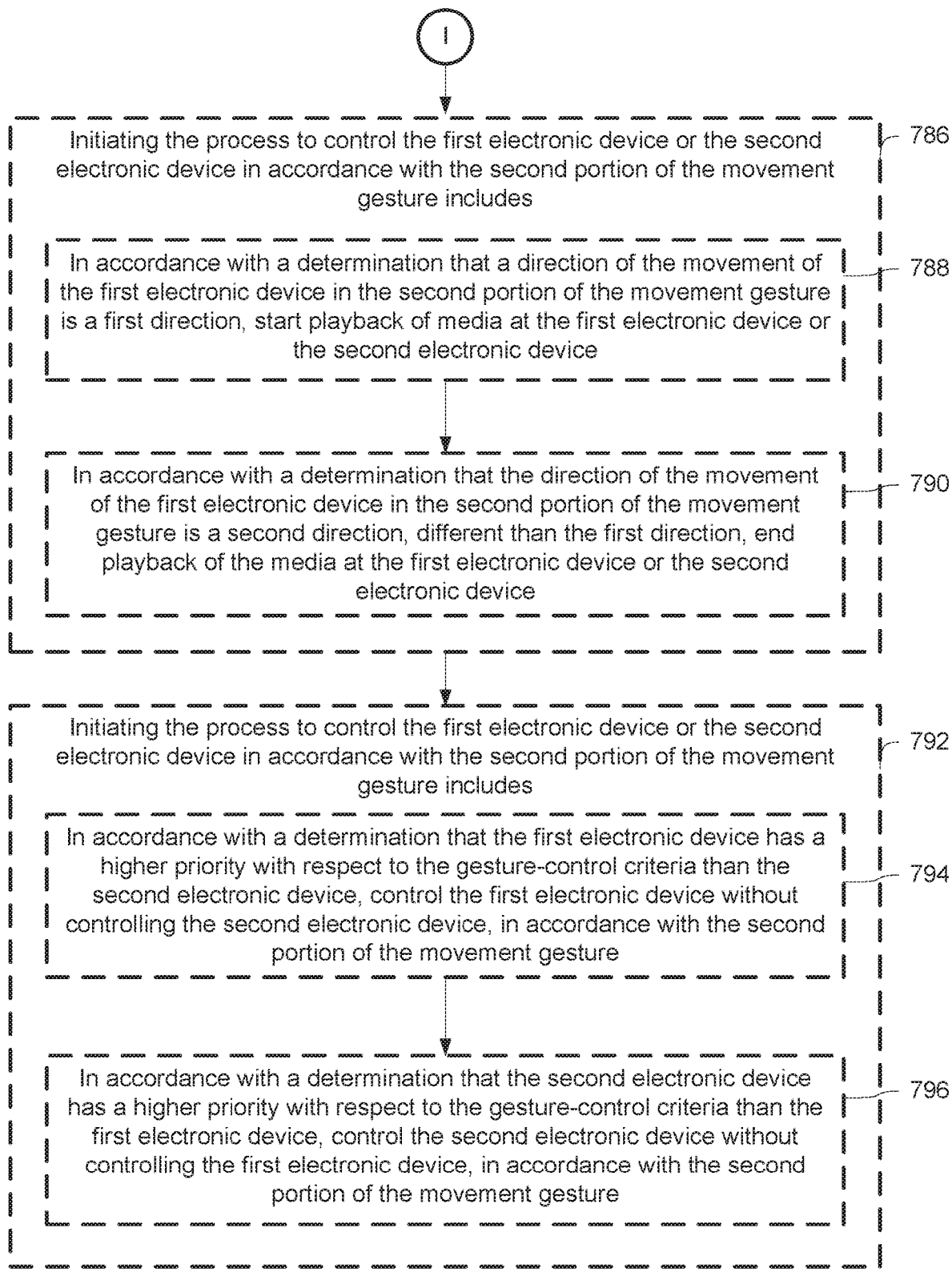

FIGS. 6Y-6CC illustrate creation of a user-defined initiation portion of a motion gesture sequence. FIG. 6Y illustrates a settings user interface of the third electronic device 500c. The settings user interface includes a selectable option 634 for displaying a motion gesture control settings user interface. The user selects (e.g., with contact 603) the option 634 to display the motion gesture control settings user interface. As shown in FIG. 6Z, in response to the user's selection, the third electronic device 500c presents the motion gesture control settings user interface. The motion gesture control settings user interface includes a selectable option 636 for creating an initiating motion gesture. As shown in FIG. 6Z, the user selects (e.g., with contact 603) the option 603 to create an initiating motion gesture. In response to the user's selection, the third electronic device 500c presents a selectable option 638 to record a user-defined initiating motion gesture, as shown in FIG. 6AA. The user selects (e.g., with contact 603) the option 638 to record an initiating motion gesture.

FIG. 6BB illustrates creation of an initiating portion of a motion gesture sequence. While the third electronic device 500c records motion and/or audio data, the user performs the initiating portion of the motion gesture sequence, which in this case is snapping their fingers. While the third electronic device 500c records the initiating portion of the motion gesture sequence, the display 500c presents an indication 640 that the initiating motion gesture is being recorded and a selectable option 642 to stop recording. As shown in FIG. 6CC, when the user 606 is done performing the initiating portion of the motion gesture sequence, the user selects (e.g., with contact 603) the option 642 to stop recording. Thus, the third electronic device 500c is able to store a user-defined initiating motion gesture for use when performing subsequent motion gesture sequences.

FIGS. 6DD-6HH illustrate a motion gesture sequence performed at the third electronic device 500c that, if performed, causes the third electronic device 500c to perform a play next operation using the initiating motion gesture recorded in FIGS. 6BB-6CC. FIG. 6DD illustrates the third electronic device 500c playing media content (e.g., via one or more speakers in communication with the third electronic device 500c). While the media content is playing, the display 504 presents an indication 644 of the media content.

In some embodiments, the third electronic device 500c detects the initiating portion of the motion gesture sequence based on motion data and, when the background noise is below a predetermined threshold noise level, audio data. Likewise, when the background noise is at or above the predetermined threshold noise level, the third electronic device 500c detects the initiating gesture based on motion data alone in some embodiments. Relying on motion data alone in noisy (e.g., noise above the predetermined noise threshold) environments optionally enables the third electronic device 500c to detect the initiating motion gesture even when audio data is unavailable, while providing increased detection accuracy of the initiating motion gesture in quiet (e.g., noise below the predetermined threshold noise level) environments.

FIGS. 6EE and 6FF illustrate an initiating portion of a motion gesture sequence for enabling motion gesture control on the third electronic device 500*c*. In some embodiments, the initiating portion of the motion gesture sequence is the same for multiple motion gesture sequences (e.g., a motion gesture sequence for volume control, a motion gesture sequence for play/pause, a motion gesture sequence for next/previous, etc.).

As shown in FIG. 6EE, the third electronic device 500*c* detects the initiating portion of the motion gesture sequence in an environment with background noise 646 that is below a predetermined noise threshold. Because the background noise 646 is below the noise threshold, the third electronic device 500*c* senses motion and sound to detect the initiating portion of the motion gesture sequence. The initiating portion of the motion gesture sequence is detected in response to the motion data and audio data of the third electronic device 500*c* indicating that the user 606 snaps their fingers.

FIG. 6FF illustrates detection of the initiating portion of the motion gesture sequence in an environment where the background noise 646 is above the predetermined background noise threshold level. Because the background noise 646 is above the predetermined background noise threshold, the third electronic device 500*c* senses motion (but not audio) to detect the initiating portion of the motion gesture sequence. The initiating portion of the motion gesture sequence is detected in response to the motion data of the third electronic device 500*c* indicating that the user 606 snaps their fingers. Thus, in some embodiments, the third electronic device 500*c* senses audio in addition to motion in quiet environments (e.g., where the noise level is below the predetermined threshold noise level) and only senses motion in noisy environments (e.g., where the noise level is above the predetermined threshold noise level) when detecting the initiating portion of the motion gesture sequence.

FIG. 6GG illustrates an arming portion of a motion gesture sequence performed at the third electronic device 500*c* that, if performed, causes the third electronic device 500*c* to perform a play next or play previous operation. The arming portion of the previous/next motion gesture sequence is detected after the initiating portion of the previous/next motion gesture sequence illustrated in FIG. 6EE or FIG. 6FF. As shown in FIG. 6GG, the arming portion of the previous/next motion gesture sequence is detected when the motion data of the third electronic device 500*c* indicates that the user positions the third electronic device 500*c* such that a specific face of the third electronic device 500*c* (e.g., a face with the display 504*c*) faces the to the right. While the arming portion of the previous/next motion gesture sequence is performed, the display 504*c* of the third electronic device 500*c* indicates that the third electronic device 500*c* is playing a song "Hit Song".

FIG. 6HH illustrates a triggering portion of a play next motion gesture sequence performed at the third electronic device 500*c* that, if performed, causes the third electronic device 500*c* to perform a play next operation. The triggering portion of the play next motion gesture sequence is detected after the arming portion of the play next motion gesture sequence illustrated in FIG. 6GG. As shown in FIG. 6HH, the triggering portion of the play next motion gesture sequence is detected when the motion data of the third electronic device 500*c* indicates that the user 606 moves the third electronic device 500 to the right. In some embodiments, the triggering portion of the motion gesture sequence is detected in response to the translational motion of the first electronic device 500*a* (e.g., motion data in one dimension to detect motion to the right), in some embodiments without other types of motion (e.g., rotational) of the device. In response to detection of the triggering portion of the motion gesture sequence, the third electronic device 500*c* plays the next item of content in a list of media content. The display 504*c* updates to indicate that the third electronic device 500*c* is now playing the next song, "Classic Hit".

It is understood that, in some embodiments, a play previous motion gesture sequence, if performed, causes the third electronic device 500*c* to play the previous item of media content. For example, the initiating motion gesture and arming portion of the play previous motion gesture sequence are optionally the same as the initiating motion gesture and arming portion of the play next motion gesture sequence and the triggering portion of the play previous motion gesture sequence is detected when the motion data of the third electronic device 500*c* indicates that the third electronic device 500*c* is moved to the left. Further, additional motion gesture sequences that, if performed, cause the third electronic device 500*c* to perform other operations (e.g., play/pause, scrub, etc.) are possible.

In some embodiments, electronic devices perform actions in response to motion gesture sequences only when they are in particular states of operation, such as playing media content or performing another operation that has associated motion gesture control sequences. FIGS. 6II-6JJ illustrate the second electronic device 500*b* running a game application. In some embodiments, the second electronic device 500*b* cannot be controlled by motion gesture sequences while running the game application.

FIGS. 6II-JJ illustrate performance of motion gestures while the second electronic device 500*b* is running a game application. While running the game application, the display 504*b* presents a game user interface 648. As shown in FIG. 6II, the user 606 places the first electronic device 500*a* such that a particular side (e.g., the top or bottom side) of the first electronic device 500*a* faces up. Although the motion gesture matches an arming portion of a motion gesture sequence that, if performed, causes the second electronic device 500*b* to change playback volume of media content playing on the second electronic device 500*b*, the motion gesture is not detected or recognized as a motion gesture control action because the second electronic device 500*b* is not in a state that accepts motion gesture control (e.g., playing media content).

As shown in FIG. 6JJ, the user 606 moves the first electronic device 500*a* up. Although the motion gesture matches a triggering portion of a motion gesture sequence that, if performed, causes the second electronic device 500*b* to increase playback volume of media content playing on the second electronic device 500*b*, the motion gesture is not detected or recognized as a motion gesture control action because the second electronic device 500*b* is not in a state that accepts motion gesture control (e.g., playing media content). In some embodiments, motion data of the first electronic device 500*a* is not sensed (e.g., by device 500*a* or device 500*b*) when the second electronic device 500*b* is not in a state that can be controlled by motion gesture sequences.

In some embodiments, multiple devices in communication with one another are enabled to be controlled with motion gesture sequences. Device priority among the electronic devices optionally determines which electronic device performs a function in response to the detected motion gesture sequence. FIGS. 6KK-6NN illustrate controlling an electronic device with a motion gesture sequence based on device priority when multiple electronic devices that are able to be controlled with motion gesture sequences are present.

FIG. 6KK illustrates an arming portion of a motion gesture sequence performed at the third electronic device 500*c* that, if performed, causes the second electronic device 500*b* to change the playback volume of media content playing on the second electronic device 500*b*, which has priority 650 over the third electronic device 500*c*. As shown in FIG. 6KK, the device priority 650 prioritizes the second electronic device 500*b* over the third electronic device 500*c* for being controlled by a motion gesture sequence. Because the second electronic device 500*b* has priority 650, performance of a volume control motion gesture sequence will cause the playback volume of the second electronic device 500*b* to change while the playback volume of the third electronic device 500*c* does not change in response to the motion gesture sequence.

In FIG. 6KK, the user 606 performs an arming portion of a volume control motion gesture sequence. The arming portion is detected when the motion and/or audio data of the third electronic device 500*c* indicate that the user snaps their fingers while wearing the third electronic device 500*c*. In response to the arming portion of the volume control motion gesture sequence, the display 504*b* presents the indication 608 of the playback volume of the second electronic device 500*b*, while the display 504*c* of the third electronic device 500*c* does present an indication of the volume control motion gesture sequence.

FIG. 6LL illustrates the triggering portion of the volume control motion gesture sequence performed at the third electronic device 500*c* that, if performed, causes the second electronic device 500*b* to lower the playback volume. The triggering portion of the volume control motion gesture sequence is detected after the arming portion illustrated in FIG. 6KK. As shown in FIG. 6LL, the triggering portion of the motion gesture sequence is detected when the motion data of the third electronic device 500*c* indicates that the user twists their wrist counterclockwise (e.g., as though the user is turning a volume knob counterclockwise). In response to the triggering portion of the motion gesture sequence for lowering the playback volume of the second electronic device 500*b*, the second electronic device 500*b* lowers the playback volume of media content playing on the second electronic device 500*b*. The display 504*b* updates the playback volume indication 608 in accordance with the change in playback volume. The playback volume of the third electronic device 500*c* does not change in response to the volume control motion gesture sequence.

FIG. 6MM illustrates an arming portion of a motion gesture sequence performed at the third electronic device 500*c* that, if performed, causes the third electronic device 500*c* to change the playback volume of media content playing on the third electronic device 500*c* because the third electronic device 500*c* has priority 650 over the second electronic device 500*b*. As shown in FIG. 6MM, the device priority 650 prioritizes the third electronic device 500*c* over the second electronic device 500*b* for being controlled by a motion gesture sequence. Because the third electronic device 500*c* has priority 650, performance of a volume control motion gesture sequence will cause the playback volume of the third electronic device 500*c* to change while the playback volume of the second electronic device 500*b* does not change in response to the volume control motion gesture sequence.

In FIG. 6MM, the user 606 performs an arming portion of a volume control motion gesture sequence. The arming portion is detected when the motion and/or audio data of the third electronic device 500*c* indicate that the user snaps their fingers while wearing the third electronic device 500*c*. In response to the arming portion of the motion gesture sequence, the display 504*c* presents an indication 652 of the playback volume of the second electronic device 500*b*, while the display 504*b* does not indicate the arming portion of the volume control motion gesture sequence.

FIG. 6NN illustrates the triggering portion of the volume control motion gesture sequence performed at the third electronic device 500*c* that, if performed, causes the third electronic device 500*c* to lower the playback volume. The triggering portion of the motion gesture sequence is detected after the arming portion illustrated in FIG. 6MM. As shown in FIG. 6NN, the triggering portion of the motion gesture sequence is detected when the motion data of the third electronic device 500*c* indicates that the user twists their wrist counterclockwise (e.g., as though the user is turning a volume knob counterclockwise). In response to the triggering portion of the motion gesture sequence for lowering the playback volume of the third electronic device 500*c*, the third electronic device 500*c* lowers the playback volume of media content playing on the second electronic device 500*c*. The display 504*c* updates the playback volume indication 652 in accordance with the change in playback volume. The playback volume of the second electronic device 500*b* does not change.

FIGS. 7A-7J are flow diagrams illustrating a method 700 of performing an action with an electronic device in response to detection of a sequence of one or more motion gestures in accordance with some embodiments of the disclosure. The method 700 is optionally performed at an electronic device such as device 100, device 300, device 500, device 510, device 511 as described above with reference to FIGS. 1A-1B, 2-3, 4A-4B and 5A-5J. Some operations in method 700 are, optionally combined and/or order of some operations is, optionally, changed.

As described below, the method 700 provides ways to perform actions in response to detection of a sequence of one or more motion gestures. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500, a wearable device, a mobile device, a remote control device in communication with a set-top box, etc.) with one or more processors and memory obtains (702) first gesture information (e.g., touch data, motion data, proximity data, audio data, etc.) describing a motion gesture performed by a first electronic device, wherein the motion gesture includes a first portion, such as the arming portion of a gesture sequence performed by the user 606 in FIG. 6B, that includes detection of a respective attitude (e.g., position and/or orientation) of the first electronic device relative to a respective frame of reference, such as the first electronic device 500*a* facing up in FIG. 6B (e.g., relative to gravity and/or a position/orientation of the user of the first electronic device). The "arming portion" optionally arms the first and/or second electronic device to detect a further gesture. Detection of the arming portion is optionally followed by detection of a second portion (e.g., a "triggering portion" that causes the electronic device to perform a function or to send a signal to a second electronic device to perform a function), such as the user 606 moving the first electronic device 500*a* up in FIG. 6C, that includes movement of the first electronic device from the respective attitude of the first electronic device relative to the respective frame of reference. In some examples, the first electronic device optionally includes an accelerometer or other motion sensor that detects the movement of a gesture performed with the first electronic device. The first electronic device optionally includes a microphone or ultrasonic sensor that detects a sound associated with a gesture performed at a first electronic device (e.g., the user snapping his or her fingers, clapping, etc.). In some embodiments, the first electronic device is in wireless communication with a second electronic device (e.g., using Wi-Fi, Bluetooth, cellular data, or another wireless protocol) or in wired communication with the second electronic device. For example, the first electronic device is optionally a remote control and the second electronic device is optionally a set-top box in communication with a display and one or more speakers. As another example, the first device is optionally a wearable device (e.g., a smart watch) in communication with a media player (e.g., a mobile device, a computer, a media player, a set-top box in communication with a display and one or more speakers, a smart phone, etc.). The first gesture is optionally a gesture that involves movement of the first electrode device, such a moving the first electronic device through space.

In some embodiments, in response to obtaining the first gesture information (704), in accordance with a determination that the motion gesture satisfies gesture-control criteria that are satisfied when the movement of the first electronic device during the second portion of the motion gesture meets movement criteria for a movement gesture that corresponds to the respective attitude of the first electronic device, such as detection of the gesture sequence for causing the second electronic device 500*b* to increase the playback volume in FIG. 6C, (e.g., a "triggering" portion that triggers the first electronic device or the second electronic device to perform an action in accordance with the triggering portion) the electronic device initiates (706) a process to control the first electronic device or a second electronic device in accordance with the second portion of the movement gesture, such as increasing the playback volume of the second electronic device 500*b* as shown in FIG. 6C. In some embodiments, the arming portion of the gesture optionally causes the first electronic device or the second electronic device to be "armed" to detect the triggering portion of the gesture (e.g., ready to detect the triggering portion of the gesture. In some embodiments, without the arming portion of the gesture, the first electronic device does not detect/identify the triggering portion of the gesture), and the trigging portion of the gesture optionally causes the second device to perform an action associated with the gesture. For example, when the first electronic device (e.g., a remote) and/or the second electronic device (e.g., a set top box) detect an arming portion of a gesture for changing the volume of media playing at the set top box followed by a triggering portion of the gesture for lowering the volume, the set top box optionally lowers the volume of the media in accordance with the triggering portion of the gesture. In some embodiments, the first electronic device processes the obtained gesture information to determine that the gesture satisfies the gesture-control criteria and transmits a signal to the second electronic device indicative of the matching gesture. In some embodiments, the first electronic device transmits a signal to the second electronic device indicative of the obtained gesture information and the second electronic device determines, based on the gesture information received from the first electronic device, that the gesture satisfies the gesture-control criteria.

In some embodiments, in accordance with a determination that the motion gesture does not satisfy the gesture-control criteria because the movement of the first electronic device during the second portion of the motion gesture does not meet the movement criteria for a movement gesture that corresponds to the respective attitude of the first electronic device, such as performance of the incorrect triggering portion of the gesture sequence illustrated in FIG. 6T, the electronic device forgoes (708) initiating the process to control the first electronic device or the second electronic device in accordance with the second portion of the movement gesture (e.g., regardless of whether or not the triggering portion of the gesture is performed), as illustrated in FIG. 6T. In some embodiments, the triggering portion of a respective gesture for performing a respective operation on the second electronic device is associated with a specific arming portion of the respective gesture. For example, when the first electronic device (e.g., a smart watch) and/or the second electronic device (e.g., a media player) detect an arming portion associated with changing the volume of media playing on the media player followed by a triggering portion for pausing the media playing on the media player, the media player optionally does not perform either action of adjusting the volume or pausing the media because the triggering portion of the gesture associated with changing the volume was not detected and because the arming portion associated with pausing the media was not detected. That is to say, in some embodiments, the triggering portion and the arming portion must be associated with the same gesture for performing an action at the second electronic device for the action to be performed. As another example, if the smart watch and/or media player do not detect an arming portion at all and detect a triggering portion associated with a respective action to be performed by the media player, the media player optionally does not perform the respective action because the arming portion was not detected (e.g., and instead, the first electronic device optionally performs some other action in accordance with the movement of the first electronic device, or performs no action at all). In some embodiments, the first electronic device processes the obtained gesture information to determine that the arming portion of the gesture is not detected and forgoes transmitting a signal to the second electronic device indicative of a performed gesture. In some embodiments, the first electronic device transmits a signal to the second electronic device indicative of the obtained gesture information and the second electronic device determines, based on the gesture information received from the first electronic device, that the arming portion of the gesture is not detected.

The above-described manner of performing an action on the first or second electronic device in response to detecting the a motion gesture having a second portion that corresponds to a detected respective attitude of the first electronic device and forgoing performing the action on the first or second electronic device when the motion gesture does not satisfy the gesture-control criteria allows the first or second electronic device to be controlled by gestures performed at the first electronic device without incorrectly performing an action when the full gesture is not performed, which simplifies interactions between the user and the first and second electronic devices and enhances the operability of the first and second electronic devices (e.g., by preventing false positive gesture detection and thereby preventing performing an action when the user does not intend to control the second electronic device to perform the action), which, additionally, reduces power and improves battery life of the first electronic device and the second electronic device by enabling the user to use the first and second electronic devices more quickly and efficiently.

In some embodiments, initiating the process to control the first electronic device or the second electronic device in accordance with the second portion of the movement gesture comprises (710) in accordance with a determination that the movement of the first electronic device during the second portion of the movement gesture has a first movement profile, such as the upward movement of the first electronic device 500a illustrated in FIG. 6C (e.g., movement in a first direction, movement having a first magnitude, or movement while the first electronic device is in a first orientation), the electronic device controls (712) the first electronic device or the second electronic device in a first manner, such as increasing the playback volume of the second electronic device 500b in FIG. 6C (e.g., performing a first action, such as making an adjustment to an action being performed by the first electronic device or the second electronic device in a first manner). For example, after detecting the arming portion associated with controlling the playback volume of media playing on the first electronic device or second electronic device, detecting upward movement of the first electronic device and increasing the playback volume in response to the upward movement.

In some embodiments, in accordance with a determination that the movement of the first electronic device during the second portion of the movement gesture has a second movement profile, such as the downward movement of the first electronic device 500a illustrated in FIG. 6E, different than the first movement profile (e.g., movement in a second direction, movement having a second magnitude, or movement while the first electronic device is in a second orientation), the electronic device controls (714) the first electronic device or the second electronic device in a second manner, such as decreasing the playback volume of the second electronic device 500b, different than the first manner (e.g., performing a second action, such as making an adjustment to an action being performed by the first electronic device or the second electronic device in a second manner). For example, after detecting the arming portion associated with controlling the playback volume of media playing on the first electronic device or second electronic device, detecting downward movement of the first electronic device and decreasing the playback volume in response to the downward movement.

The above-described manner of controlling the first or second electronic device in different manners in response to different movement profiles allows the user to control the first or second electronic device in multiple ways based on a movement gesture performed at the first electronic device, which simplifies interactions between the user and the first and/or second electronic device and enhances the operability of the first or second electronic device, which, additionally, reduces power and improves battery life of the first electronic device and the second electronic device by enabling the user to use the electronic device more quickly and efficiently.

In some embodiments, the first movement profile has a first movement magnitude, such as the slow and/or short movement of the first electronic device 500a illustrated in FIG. 6E or the fast and/or long movement of the first electronic device 500a illustrated in FIG. 6F, and controlling the first or second electronic device comprises controlling the first or second electronic device by a quantity (e.g., an amount of change in volume, an amount of advancing or reversing through content, an amount of scrolling through content, or the like) that has a magnitude based on the first movement magnitude (716), such as decreasing the playback volume of the second electronic device 500b by a relatively small amount as shown in FIG. 6E or by a relatively large amount as shown in FIG. 6F (e.g., the larger, faster, or longer duration the movement is, the greater degree the first or second electronic device performs the action). For example, a first upward movement with a first magnitude causes the first or second electronic device to increase the volume of media content by a first amount and a second, larger upward movement causes the first or second electronic device to increase the playback volume of media content to increase by a second, larger amount.

The above-described manner of controlling the first or second electronic device by a quantity with a magnitude based on a magnitude of a movement of the first electronic device allows the first or second electronic device to provide to the user a way of controlling the first or second electronic device with nuance using a motion gesture performed at the first electronic device, which simplifies interactions between the user and the first or second electronic device and enhances the operability of the first or second electronic device, which, additionally, reduces power and improves battery life of the first electronic device and the second electronic device by enabling the user to use the electronic device more quickly and efficiently.

The first movement profile has a first movement magnitude, such as the relatively large and/or fast movement of the first electronic device 500a illustrated in FIG. 6C and the relatively small and/or slow movement of the first electronic device 500a illustrated in FIG. 6D, and controlling the first or second electronic device comprises controlling the first or second electronic device by a quantity having a predefined magnitude (e.g., advancing to a next or previous content item, changing a volume or channel setting to a next or previous setting, or the like), independent of the first movement magnitude (718), such as increasing the playback volume of the second electronic device 500b by a predetermined amount in either FIG. 6C or FIG. 6D (e.g., the degree to which the first or second electronic device performs the action is independent of the magnitude, speed, or duration of the first movement profile). For example, a first upward movement with a first magnitude causes the first or second electronic device to increase the volume of media content by a predetermined amount and a second, larger upward movement causes the first or second electronic device to increase the playback volume of media content to increase by the same predetermined amount.

The above-described manner of controlling the first or second electronic device by a quantity with a predetermined magnitude regardless of a magnitude of movement at the first electronic device allows the first or second electronic device to be performed in a consistent manner, which simplifies interactions between the user and the first or second electronic device and enhances the operability of the first or second electronic device (e.g., by behaving in a manner that is resistant to user inconsistencies and error), which, additionally, reduces power and improves battery life of the first electronic device and the second electronic device by enabling the user to use the electronic device more quickly and efficiently.

In some embodiments, in response to detecting the first portion of the motion gesture that includes detecting the respective attitude of the first electronic device relative to the respective frame of reference, the electronic device generates (720) an indication (e.g., an audio, tactile, or other indication), such as visual indication 612a or audio indication 612b illustrated in FIG. 6H, that the respective attitude of the first electronic device relative to the respective frame of reference met one or more detection criteria (e.g., that the device was detected at a particular attitude or was detected within a particular range of attitudes for at least a threshold amount of time). In some embodiments, the first electronic device, the second electronic device, or a third electronic device plays a sound that indicates that the respective attitude of the first electronic device was detected or the first electronic device, the second electronic device, or a third electronic device generates a tactile (e.g., haptic or vibration) feedback that indicates that the respective attitude of the first electronic device was detected. The indication optionally indicates to the user that the first electronic device and/or second electronic device are ready to detect the second portion (e.g., the triggering portion) of the motion gesture. In some embodiments, the indication is not generated when the respective attitude of the first electronic device does not meet the one or more detection criteria.

The above-described manner of generating an indication in response to the arming portion of the gesture allows the first or second electronic device to indicate to the user that the arming portion of the gesture was identified, which simplifies interactions between the user and the first or second electronic device and enhances the operability of the first or second electronic device (e.g., by communicating to the user when to proceed to perform the triggering portion of the gesture), which, additionally, reduces power and improves battery life of the first electronic device and the second electronic device by enabling the user to use the electronic device more quickly and efficiently.

In some embodiments, in accordance with a determination that the respective attitude of the first electronic device relative to the respective frame of reference met one or more detection criteria (e.g., the first electronic device includes speakers for generating an audio feedback or a tactile feedback generator (e.g., a mechanism that vibrates or creates haptic feedback)), generating (722) the indication occurs at the first electronic device, such as the visual indication 630a and audio/tactile indication 628 generated at the third electronic device 500c that also detected the motion data that corresponds to an arming portion of a motion gesture, illustrated in FIG. 6V.

In some embodiments, in accordance with a determination that the respective attitude of the first electronic device relative to the respective frame of reference did not meet the one or more detection criteria (e.g., the first electronic device does not include speakers for generating an audio feedback and/or does not include a tactile feedback generator (e.g., a mechanism that vibrates or creates haptic feedback)), generating (724) the indication occurs at an electronic device other than the first electronic device (e.g., generating the indication occurs at the second electronic device or a third electronic device), such as presenting the visual indication 612a and audio indication 612b at the second electronic device 500b, which is different from the first electronic device 500a that detected the motion data corresponding to the arming portion of the gesture sequence illustrated in FIG. 6H. For example, when the first electronic device is a remote that does not include a speaker or a mechanism for generating tactile feedback, the indication optionally occurs at the second electronic device (e.g., a set top box, a television, a smartphone, a media player, a speaker, a computer, or another device being controlled by the remote control) or at a third electronic device that is not being controlled by the first electronic device to perform an action in accordance with the motion gesture but is in communication with the first electronic device and/or the second electronic device (e.g., a set top box, a smartphone, a media player, a speaker, a computer, or another device not presently being controlled by the remote control).

The above-described manner of providing, at the first electronic device or other electronic device, an indication to the user that the arming portion of the gesture was detected at the first electronic device allows the first electronic device to detect a motion gesture even if it is not equipped to provide the indication of the arming portion of the gesture, which simplifies interactions between the user and the first electronic device and enhances the operability of the first electronic device (e.g., by providing the indication to the user in an available manner), which, additionally, reduces power and improves battery life of the first electronic device and the second electronic device by enabling the user to use the electronic device more quickly and efficiently.

In some embodiments, in response to obtaining the first gesture information, in accordance with the determination that the motion gesture satisfies the gesture-control criteria that are satisfied when the movement of the first electronic device during the second portion of the motion gesture meets movement criteria for a movement gesture that corresponds to the respective attitude of the first electronic device, the electronic device generates (726) an indication, such as audio indication 616 and updating the indication 618 of the content playing on the second electronic device 500b in FIG. 6J (e.g., an audio, tactile, or other indication) that the motion gesture satisfies the gesture-control criteria. In some embodiments, the first electronic device, the second electronic device, or a third electronic device plays a sound that indicates that the motion gesture satisfies the gesture-control criteria, or the first electronic device, the second electronic device, or a third electronic device generates a tactile (e.g., haptic or vibration) feedback that indicates that the motion gesture satisfies the gesture-control criteria (e.g., the triggering portion of the motion gesture was successfully detected). The indication optionally indicates to the user that the triggering portion of the motion gesture was successfully detected. In some embodiments, in accordance with a determination that the motion gesture does not satisfy the gesture-control criteria that are satisfied when the movement of the first electronic device during the second portion of the motion gesture meets movement criteria for a movement gesture that corresponds to the respective attitude of the first electronic device, the electronic device does not generate the indication that the motion gesture satisfies the gesture-control criteria.

The above-described manner of indicating to the user when the triggering portion of the gesture is identified allows the first or second electronic device to confirm to the user that the triggering portion of the gesture has been identified, which simplifies interactions between the user and the first or second electronic device and enhances the operability of the first or second electronic device (e.g., by confirming to the user that the gesture was received in a manner that is separate from controlling the first or second electronic device in accordance with the motion gesture), which, additionally, reduces power and improves battery life of the first electronic device and the second electronic device by enabling the user to use the electronic device more quickly and efficiently.

In some embodiments, the electronic device obtains (728) second gesture information describing a second motion gesture performed by the first electronic device, wherein the second motion gesture includes a first portion that includes movement of the first electronic device, such as the triggering portion of a gesture sequence performed at the first electronic device 500a illustrated in FIG. 6C. For example, a triggering portion is associated with causing the first electronic device or the second electronic device to perform an action in response to the triggering portion, such that if a proper arming portion precedes the triggering portion, the action would be caused to be performed on the first or second electronic devices.

In some embodiments, in response to obtaining the second gesture information (730): in accordance with a determination that the second motion gesture includes a second portion, which precedes the first portion, that includes detection of the respective attitude of the first electronic device relative to the respective frame of reference (e.g., an arming portion), such as the arming portion of the gesture sequence performed at the first electronic device 500a illustrated in FIG. 6B, the electronic device initiates (732) a process to determine whether the second motion gesture satisfies gesture-control criteria for controlling the first electronic device or the second electronic device in accordance with the first portion of the second motion gesture, such as causing the second electronic device 500b to increase its playback volume in response to the arming portion and triggering portion of the gesture sequence illustrated in FIGS. 6B-6C. In some embodiments, when the arming portion is detected, the first or second electronic device is "armed" for detecting the triggering portion of the motion gesture. Following detecting an arming portion and detecting a respective triggering portion that are associated with the same function of the first or second electronic device, the first or second electronic device optionally performs the associated function.

In some embodiments, in accordance with a determination that the second motion gesture does not include a second portion, which precedes the first portion, that includes detection of the respective attitude of the first electronic device relative to the respective frame of reference, the electronic device forgoes (734) initiating the process to determine whether the second motion gesture satisfies the gesture-control criteria for controlling the first electronic device or the second electronic device, such as forgoing performing an operation at the second electronic device 500b in response to the gestures performed in FIGS. 6S and 6T, which are not part of the same gesture sequence. In some embodiments, if no arming portion is detected, the first and/or second electronic device are not "armed" for detecting the triggering portion of the motion gesture. Even if a triggering portion associated with a function of the first or second electronic device is detected, the function is optionally not performed if the triggering portion of the motion gesture is detected without first detecting an arming portion of the motion gesture.

The above-described manner of satisfying the gesture control criteria when the arming portion of the gesture precedes the triggering portion of the gesture allows the first electronic device to reduce false positive matches of the gesture control criteria, which simplifies interactions between the user and the first electronic device and enhances the operability of the first or second electronic device (e.g., by reducing inadvertent control of the first or second electronic device), which, additionally, reduces power and improves battery life of the first electronic device and the second electronic device by enabling the user to use the electronic device more quickly and efficiently.

In some embodiments, initiating the process to determine whether the second motion gesture satisfies the gesture-control criteria for controlling the first electronic device or the second electronic device comprises, in response to obtaining the second gesture information (736) in accordance with a determination that the first portion of the second motion gesture that includes the movement of the first electronic device is detected within a predefined time interval (e.g., 0.3 seconds, 0.5 seconds, 1 second, some other predetermined interval of time, or a user-defined interval of time) of the second portion of the second motion gesture that includes the detection of the respective attitude of the first electronic device relative to the respective frame of reference, such as the time delay 614 between detecting the arming portion of the gesture sequence illustrated in FIG. 6H and the triggering portion of the gesture sequence illustrated in FIG. 6J, the electronic device determines (738) whether the second motion gesture satisfies the gesture-control criteria for controlling the first electronic device or the second electronic device, such as controlling the second electronic device 500b to play the next item of media content, as illustrated in FIG. 6J. In some embodiments, when the triggering portion of the motion gesture is detected within the predetermined time interval of the arming portion of the motion gesture, the electronic device determines if the motion gesture satisfies the gesture-control criteria for controlling the first electronic device or second electronic device, and in some embodiments, proceeds accordingly. In some embodiments, if it does satisfy the gesture-control criteria, appropriate action is taken, and if it does not satisfy the gesture-control criteria, no further action is taken, as described above.

In some embodiments, in accordance with a determination that the first portion of the second motion gesture that includes the movement of the first electronic device is not detected within the predefined time interval of the second portion of the second motion gesture that includes the detection of the respective attitude of the first electronic device relative to the respective frame of reference, such as the time delay 614 between detecting the arming portion of the gesture sequence illustrated in FIG. 6H and the triggering portion illustrated in FIG. 6I, the electronic device forgoes (740) determining whether the second motion gesture satisfies the gesture-control criteria for controlling the first electronic device or the second electronic device, such as not causing the second electronic device 500b to perform an action as shown in FIG. 6I. In some embodiments, when the triggering portion of the motion gesture is not detected within the predetermined time interval of the arming portion of the motion gesture, the electronic device does not determine if the motion gesture satisfies the gesture-control criteria for controlling the first electronic device or second electronic device. In other words, the first and/or second electronic devices optionally "listen" for the triggering portion of the motion gesture for the predetermined time interval after the arming portion of the motion gesture has been performed. In some embodiments, if the triggering portion of the motion gesture is not detected within the predetermined time interval after the arming portion of the motion gesture has been performed, then no action is performed in accordance with the motion gesture, even if the triggering portion is performed at a subsequent time outside of the predetermined time interval of a corresponding arming portion.

The above-described manner of requiring the triggering portion of the gesture to be detected within a predetermined amount of time of the arming portion of the gesture for the gesture control criteria to be satisfied reduces the number of false-positive detections of motion gestures, which simplifies interactions between the user and the first or second electronic device and enhances the operability of the first or second electronic device (e.g., by allowing the user to change his or her mind about performing a gesture for controlling the first or second electronic device), which, additionally, reduces power and improves battery life of the first electronic device and the second electronic device by enabling the user to use the electronic device more quickly and efficiently.

In some embodiments, the motion gesture performed by the first electronic device satisfies the gesture-control criteria when a state of the electronic device is a first state (742), such as the second electronic device 500*b* playing media content as illustrated in FIGS. 6A-6T. In some embodiments, the first electronic device or second electronic device is actively running a respective application or performing a respective operation. Example first states include a smartphone running a remote application for controlling a set top box and a media player playing media content.

In some embodiments, the motion gesture performed by the first electronic device does not satisfy the gesture-control criteria when the state of the electronic device is a second state, different than the first state (744), such as the second electronic device 500*b* running a game application as illustrated in FIGS. 6II-JJ. In some embodiments, the first state is required for satisfying the gesture-control criteria. For example, although the gesture control criteria are able to be satisfied when a user performs a motion gesture at a smartphone while a remote application for controlling a set-top box is running on the smartphone, when the remote application is not running on the smartphone, performing the motion gesture optionally does not satisfy the gesture-control criteria.

The above-described manner of requiring the electronic device to be in a first state for the gesture-control criteria to be satisfied allows the electronic device to ignore gestures at the first electronic device that are inadvertently performed, which simplifies interactions between the user and the electronic device and enhances the operability of the electronic device (e.g., by reducing the number of false positive matches of the gesture-control criteria), which, additionally, reduces power and improves battery life of the first electronic device and the second electronic device by enabling the user to use the electronic device more quickly and efficiently.

In some embodiments, the gesture-control criteria are satisfied when the motion gesture performed by the first electronic device further includes a third portion, preceding the first portion, that satisfies initiating criteria (746), such as performance of the initiating gesture performed at the third electronic device 500*c* in FIG. 6FF. For example, an initiating gesture is optionally performed prior to the arming portion of the motion gesture. When the initiating gesture, the arming portion, and the triggering portion are performed in sequence, the gesture control criteria are optionally satisfied, enabling the user to control an operation at the first or second electronic device with a motion gesture at the first electronic device.

In some embodiments, the gesture-control criteria are not satisfied when the motion gesture performed by the first electronic device does not include a third portion, preceding the first portion, that satisfies the initiating criteria (748). FIGS. 6FF-HH illustrate the third electronic device 500*c* performing a play next operation in response to an initiating portion, an arming portion, and a triggering portion of the gesture sequence. If, user 606 forgoes first performing the initiating portion of the gesture sequence before the arming portion and triggering portion, in some embodiments, the third electronic device 500*c* does not perform the play next operation in response to the arming portion and triggering portion of the gesture sequence. In some examples, even when the arming portion and the triggering portion are performed in sequence, the gesture control criteria are optionally not satisfied if the initiating gesture is not detected prior to the arming portion of the motion gesture.

The above-described manner of requiring an initiating gesture for the gesture-control criteria to be satisfied allows the electronic device to ignore motion gestures that do not include the initiating gesture, which simplifies interactions between the user and the electronic device and enhances the operability of the electronic device (e.g., by reducing false positive matches of the gesture-control criteria and by reducing the need (and thus energy used) for the device to collect and evaluate sensor inputs until the initiating gesture is detected), which, additionally, reduces power and improves battery life of the first electronic device and the second electronic device by enabling the user to use the electronic device more quickly and efficiently.

In some embodiments, the initiating criteria is satisfied in accordance with the third portion of the motion gesture including coordinated (e.g., with respect to time) detection of (750) movement of the first electronic device (752) (e.g., the first and/or second electronic devices detect a movement of the first electronic device that matches movement criteria of the initiating gesture); and audio corresponding to the third portion of the motion gesture (754) (e.g., the first and/or second electronic devices detect audio that matches audio criteria of the initiating gesture), such as detection of coordinated audio data and movement data sensed by the third electronic device 500*c* indicating that the user snaps their fingers as illustrated in FIG. 6EE. In some embodiments, the first electronic device is a wearable device (e.g., a smart watch) and the initiating gesture is a knock on a surface (e.g., which includes coordinated movement of the first device during the knock motion, and audio detection of the knock motion when the user's knuckles hit a surface) or a snap of the user's fingers performed while wearing the first electronic device (e.g., which includes coordinated movement of the first device during the snapping motion, and audio detection of the snapping motion when the user completes the snap). Coordinated detection of the movement of the first electronic device and audio corresponding to the third portion of the motion gesture optionally includes detecting a movement that matches movement criteria and audio that matches audio criteria, wherein the movement criteria and audio criteria are associated with one another and are met within a predetermined time interval of one another (e.g., 0.1 second, 0.5 seconds, 1 second, etc.). In some embodiments, the movement and the audio match one another.

The above-described manner of detecting the initiating gesture based on detected movement and detected audio allows the electronic device to confirm detection of the initiating gesture using two sources of data, which simplifies interactions between the user and the electronic device and enhances the operability of the electronic device (e.g., by reducing false positive matches of the gesture-control criteria), which, additionally, reduces power and improves battery life of the first electronic device and the second electronic device by enabling the user to use the electronic device more quickly and efficiently.

In some embodiments, in accordance with a determination that an environment of the first electronic device has a noise (e.g., overall audio magnitude) level below a threshold noise level, such as the noise level 646 illustrated in FIG. 6EE, the initiating criteria is satisfied when the third portion of the motion gesture includes coordinated detection of the movement of the first electronic device, and the audio corresponding to the third portion of the motion gesture (756) (e.g., in environments that are sufficiently quiet for detecting the audio component of the third portion of the motion gesture). In some embodiments, the audio component is required for the initiating criteria to be satisfied.

In some embodiments, in accordance with a determination that the environment of the first electronic device has the noise level above the threshold noise level, such as the noise level 646 illustrated in FIG. 6FF, the initiating criteria is satisfied when the third portion of the motion gesture includes the detection of the movement of the first electronic device without requiring the audio corresponding to the third portion of the motion gesture (758) (e.g., in environments that are too noisy to reliably detect the audio component of the third portion of the motion gesture). In some embodiments, the audio component is not required for the initiating criteria to be satisfied. The third portion of the motion gesture is optionally detected based on detection of movement of the first electronic device only.

The above-described manner of detecting the initiating gesture based only on motion data when the environment of the first electronic device has a noise level above a threshold noise level allows the electronic device to detect the initiating gesture in a noisy environment, while allowing more accurate detection (e.g., using audio and motion) of the gesture in quiet environments, which simplifies interactions between the user and the electronic device and enhances the operability of the electronic device, which, additionally, reduces power and improves battery life of the first electronic device and the second electronic device by enabling the user to use the electronic device more quickly and efficiently.

In some embodiments, in accordance with a determination that a user of the first electronic device has defined the initiating criteria to be first initiating criteria, such as, for example, by creating an initiating gesture as illustrated in FIG. 6BB, the third portion of the motion gesture satisfies the initiating criteria when the third portion of the motion gesture satisfies the first initiating criteria independent of whether the third portion of the motion gesture satisfies second initiating criteria, different than the first initiating criteria (760), such as criteria associated with a different possible initiating gesture. In some embodiments, the user defines a first gesture as the initiating gesture. For example, the first electronic device is optionally a wearable device (e.g., a smart watch) and the user defines the initiating gesture as snapping his or her fingers while wearing the wearable device, such as during a setup procedure of the first device. Although it is possible for the user to define an alternate gesture as the initiating gesture, when the user defines snapping his or her fingers while wearing the wearable device as the initiating gesture, the gesture-control criteria are met when the snapping fingers gesture is detected prior to the first and second portions of the motion gesture, and the gesture-control criteria are not met when a different gesture is performed prior to the first and second portions of the motion gesture.

In some embodiments, in accordance with a determination that the user of the first electronic device has defined the initiating criteria to be the second initiating criteria, such as if the user were to perform a gesture other than snapping their fingers while recording an initiating gesture as illustrated in FIG. 6BB, the third portion of the motion gesture satisfies the initiating criteria when the third portion of the motion gesture satisfies the second initiating criteria independent of whether the third portion of the motion gesture satisfies the first initiating criteria (762), such as criteria associated with the user snapping their fingers. In some embodiments, the user defines a second gesture as the initiating gesture. For example, the first electronic device is a wearable device (e.g., a smart watch) and the user defines the initiating gesture as knocking on a surface (e.g., a wall, a table, etc.) while wearing the wearable device. Although it is possible for the user to define an alternate gesture as the initiating gesture, when the user defines knocking on a surface while wearing the wearable device as the initiating gesture, the gesture-control criteria are met when the knocking gesture is detected prior to the first and second portions of the motion gesture, and the gesture-control criteria are not met when a different gesture (e.g., a snapping fingers gesture) is performed prior to the first and second portions of the motion gesture.

The above-described manner of defining the initiating gesture in one of multiple possible ways allows the electronic device to operate with an initiating gesture selected by the user, which simplifies interactions between the user and the electronic device and enhances the operability of the electronic device (e.g., by selecting initiating criteria that are agreed upon by the user), which, additionally, reduces power and improves battery life of the first electronic device and the second electronic device by enabling the user to use the electronic device more quickly and efficiently.

In some embodiments, initiating the process to control the first electronic device or the second electronic device in accordance with the second portion of the movement gesture comprises (764): in accordance with a determination that the motion gesture includes a third portion (e.g., a confirmation gesture) following the second portion that includes detecting a second respective attitude (e.g., position and/or orientation) of the first electronic device relative to the respective frame of reference, such as the confirmation portion of the gesture sequence performed at the first electronic device 500a illustrated in FIG. 6M, the electronic device controls (766) the first electronic device or the second electronic device in accordance with the second portion of the movement gesture, such as causing the second electronic device 500b to play the previous item of media content as illustrated in FIG. 6M. In some embodiments, the first electronic device or the second electronic device is controlled by the motion gesture of the first electronic device in response to detecting the confirmation gesture after receiving the first and second portions of the movement gesture. The confirmation gesture is optionally the same as the arming gesture or, in some embodiments, the confirmation gesture is different from the arming gesture.

In some embodiments, in accordance with a determination that the motion gesture does not include a third portion following the second portion that includes detecting the second respective attitude of the first electronic device relative to the respective frame of reference, the electronic device forgoes (768) controlling the first electronic device or the second electronic device in accordance with the second portion of the movement gesture. As shown in FIG. 6L, the second electronic device 500b does not play the next item of content in the list of items of content in absence of detection of the confirmation portion of the gesture sequence illustrated in FIG. 6M. In some embodiments, if the confirmation gesture is not detected, the first or second electronic device is not controlled in accordance with the motion gesture of the first electronic device.

The above-described manner of requiring a confirmation gesture for controlling the first or second electronic device with a motion gesture of the first electronic device allows the electronic device to require confirmation before being controlled by a motion gesture, which simplifies interactions between the user and the electronic device and enhances the operability of the electronic device (e.g., by reducing inadvertent control of the electronic device based on motion of the first electronic device), which, additionally, reduces power and improves battery life of the first electronic device and the second electronic device by enabling the user to use the electronic device more quickly and efficiently.

In some embodiments, initiating the process to control the first electronic device or the second electronic device in accordance with the second portion of the movement gesture includes controlling the first electronic device in accordance with the second portion of the movement gesture (770), such as causing the third electronic device 500c to increase the playback volume in response to a gesture performed at the third electronic device 500c as illustrated in FIG. 6W. In some embodiments, the first electronic device performs an operation in response to the movement gesture. For example, the first electronic device is a smartphone that is able to play media content (e.g., music) and the user is able to control the playback volume of the media content, pause the media content, and/or cause the smartphone to play the next track or the previous track in a list of media content items (e.g., in a playlist) by performing a motion gesture with the smartphone.

The above-described manner of controlling the first electronic device with the movement gesture of the first electronic device allows the first electronic device to be controlled based on motion of the first electronic device, which simplifies interactions between the user and the first electronic device and enhances the operability of the first electronic device (e.g., by providing an input mechanism that does not require navigation of a graphical user interface presented by the first electronic device), which, additionally, reduces power and improves battery life of the first electronic device and the second electronic device by enabling the user to use the first electronic device more quickly and efficiently.

In some embodiments, initiating the process to control the first electronic device or the second electronic device in accordance with the second portion of the movement gesture includes controlling the second electronic device in accordance with the second portion of the movement gesture (772), such as increasing the playback volume of the second electronic device 500b in response to a gesture sequence performed at the first electronic device 500a. In some embodiments, the second electronic device performs an operation in response to the movement gesture. In some embodiments, the first electronic device is a remote control in communication with a set-top box coupled to a display and speakers. As an example, when the set top box is optionally used to present media content (e.g., to play a video), the user is able to play or pause the video, increase or decrease the playback volume of audio content associated with the video, rewind the video, fast forward the video, and perform other operations using a motion gesture performed with the remote control (or another analogous device in communication with the set-top box, such as a smartwatch or smartphone).

The above-described manner of controlling the second electronic device with a motion gesture of the first electronic device allows the first electronic device to act as an input device for the second electronic device, which simplifies interactions between the user and the second electronic device and enhances the operability of the second electronic device (e.g., by accepting a motion gesture input at the first electronic device, rather than requiring an input involving a user interface presented at the second electronic device), which, additionally, reduces power and improves battery life of the first electronic device and the second electronic device by enabling the user to use the second electronic device more quickly and efficiently.

In some embodiments, initiating the process to control the first electronic device or the second electronic device in accordance with the second portion of the movement gesture includes (774) in accordance with a determination that a direction of the movement of the first electronic device in the second portion of the movement gesture is a first direction, the electronic device increases (776) a volume of the first electronic device or the second electronic device, such as increasing the playback volume of the second electronic device 500b in response to upward movement of the first electronic device 500a in FIG. 6C. In some embodiments, while the first or second electronic device is presenting media content (e.g., video and/or audio content), the electronic device receives a movement gesture including a triggering portion that comprises an upward movement or rotation in a first (e.g., clockwise) direction. In some embodiments, the arming portion of the gesture comprises positioning the first electronic device in a predetermined orientation, such as positioning a smart watch while the arm wearing the smart watch is extended with the hand facing either up or down, and the triggering portion of the gesture comprises moving the first electronic device upward (e.g., away from the floor, against gravity). Likewise, if the first electronic device is a remote control or a smartphone, the arming portion optionally comprises holding the first electronic device out such that it is facing up or down and the triggering portion comprises moving the first electronic device upward. In some embodiments, the first electronic device is a wearable device (e.g., a smart watch) and the arming portion comprises detecting movement and optionally a sound associated with the user snapping his or her fingers and the triggering portion of the gesture comprises a clockwise rotation of the first electronic device about the axis defined by the arm wearing the smart watch (e.g., a rotation in accordance with the user rotating his or her hand as though adjusting a virtual volume knob). In response to the detected triggering portion, the playback volume of the media content playing on the first or second device is increased.

In some embodiments, in accordance with a determination that the direction of the movement of the first electronic device in the second portion of the movement gesture is a second direction, different than the first direction, the electronic device decreases (778) the volume of the first electronic device or the second electronic device, such as decreasing the playback volume of the second electronic device 500b in response to downward movement of the first electronic device 500a in FIG. 6E. In some embodiments, while the first or second electronic device is presenting media content (e.g., video and/or audio content), the electronic device receives a movement gesture including a triggering portion that comprises a downward movement or rotation in a second (e.g., counter-clockwise) direction. In some embodiments, the arming portion of the gesture comprises positioning the first electronic device in a predetermined orientation, such as positioning a wearable device (e.g., a smart watch) while the arm wearing the wearable device is extended with the hand facing either up or down, and the triggering portion of the gesture comprises moving the first electronic device downward (e.g., towards the floor, with gravity). Likewise, if the first electronic device is a remote control or a smartphone, the arming portion optionally comprises holding the first electronic device out such that it is facing up or down and the triggering portion comprises moving the first electronic device down. In some embodiments, the first electronic device is a wearable device (e.g., a smart watch) and the arming portion comprises detecting movement and optionally a sound associated with the user snapping his or her fingers and the triggering portion of the gesture comprises rotation of the first electronic device in a counter-clockwise direction about the axis defined by the arm wearing the smart watch (e.g., a rotation in accordance with the user rotating his or her hand as though adjusting a virtual volume knob). In response to the detected triggering portion, the playback volume of the media content playing on the first or second electronic device is decreased.

The above-described manner of controlling playback volume of the first or second electronic device in response to a motion gesture of the first electronic device allows the first electronic device to control the volume of the first or second electronic device based on movement, which simplifies interactions between the user and the first or second electronic device and enhances the operability of the first or second electronic device (e.g., by adjusting the volume without actuation of buttons or switches and optionally without requiring the user to navigate a user interface for adjusting the volume), which, additionally, reduces power and improves battery life of the first electronic device and the second electronic device by enabling the user to use the first and/or second electronic device more quickly and efficiently.

In some embodiments, initiating the process to control the first electronic device or the second electronic device in accordance with the second portion of the movement gesture includes (780) in accordance with a determination that a direction of the movement of the first electronic device in the second portion of the movement gesture is a first direction, the electronic device performs (782) a backward skip operation with respect to media at the first electronic device or the second electronic device, such as the second electronic device 500b performing the play previous operation in response to the first electronic device 500a moving to the left in FIG. 6L. In some embodiments, while the first or second electronic device is presenting media content (e.g., video and/or audio content), the electronic device receives a movement gesture including a triggering portion that comprises a movement to the right (e.g., parallel to the floor). In some embodiments, the arming portion of the gesture comprises positioning the first electronic device in a predetermined orientation, such as positioning a smart watch while the arm wearing the smart watch is extended with the hand facing either right or left. Likewise, if the first electronic device is a remote control or a smartphone, the arming portion optionally comprises holding the first electronic device out such that it is facing right or left. In response to the detected triggering portion, the media content playing on the first or second device advances forward (e.g., the next item in a playlist begins playing or a fast-forwarding operation of the media content is initiated).

In some embodiments, in accordance with a determination that the direction of the movement of the first electronic device in the second portion of the movement gesture is a second direction, different than the first direction, the electronic device performs (784) a forward skip operation with respect to the media at the first electronic device or the second electronic device, such as the second electronic device 500b performing the play next operation in response to the first electronic device 500a moving to the right in FIG. 6J. In some embodiments, while the first or second electronic device is presenting media content (e.g., video and/or audio content), the electronic device receives a movement gesture including a triggering portion that comprises a movement to the left (e.g., parallel to the floor). In some embodiments, the arming portion of the gesture comprises positioning the first electronic device in a predetermined orientation, such as positioning a smart watch while the arm wearing the smart watch is extended with the hand facing either right or left. Likewise, if the first electronic device is a remote control or a smartphone, the arming portion optionally comprises holding the first electronic device out such that it is facing right or left. In response to the detected triggering portion, the media content playing on the first or second device advances backward (e.g., the previous item in a playlist begins playing or a rewind operation of the media content is initiated).

The above-described manner of controlling playback position (e.g., advancing forward or backwards within media content) of the first or second electronic device in response to a motion gesture of the first electronic device allows the first electronic device to control the media of the first or second electronic device based on movement, which simplifies interactions between the user and the first or second electronic device and enhances the operability of the first or second electronic device (e.g., by advancing forwards or backwards without actuation of buttons or switches and optionally without requiring the user to navigate a user interface for advancing forwards or backwards), which, additionally, reduces power and improves battery life of the first electronic device and the second electronic device by enabling the user to use the first and/or second electronic device more quickly and efficiently.

In some embodiments, initiating the process to control the first electronic device or the second electronic device in accordance with the second portion of the movement gesture includes (786): in accordance with a determination that a direction of the movement of the first electronic device in the second portion of the movement gesture is a first direction, the electronic device starts (788) playback of media at the first electronic device or the second electronic device, such as the second electronic device 500b playing the media content in response to movement of the first electronic device 500a away from the user 606. In some embodiments, while the first or second electronic device runs an application for presenting media content (e.g., video and/or audio content), the electronic device receives a movement gesture including a triggering portion that comprises a movement forward (e.g., away from the torso of the user). In some embodiments, the arming portion of the gesture comprises positioning the first electronic device in a predetermined orientation, such as positioning a wearable device (e.g., a smart watch) while the arm wearing the wearable device is extended with the hand facing outward. Likewise, if the first electronic device is a remote control or a smartphone, the arming portion optionally comprises holding the first electronic device out such that it is held upright or outward. Based on the motion data collected while the arming portion of the gesture is being performed, the first or second electronic device is optionally able to determine that, from the position of the first electronic device during the arming portion, the triggering portion of the gesture comprises movement of the first electronic device away from the user's torso. In response to the detected triggering portion, the media content on the first or second device begins playing (e.g., the media content was previously paused).

In some embodiments, in accordance with a determination that the direction of the movement of the first electronic device in the second portion of the movement gesture is a second direction, different than the first direction, the electronic device ends (790) playback (e.g., pausing or stopping) of the media at the first electronic device or the second electronic device, such as the second electronic device 500*b* pausing playback of the media content in response to the first electronic device 500*a* moving towards the user 606. In some embodiments, while the first or second electronic device is presenting media content (e.g., video and/or audio content), the electronic device receives a movement gesture including a triggering portion that comprises a movement backward (e.g., towards the torso of the user). In some embodiments, the arming portion of the gesture comprises positioning the first electronic device in a predetermined orientation, such as positioning a wearable device (e.g., a smart watch) while the arm wearing the wearable device is extended with the hand facing outward. Likewise, if the first electronic device is a remote control or a smartphone, the arming portion optionally comprises holding the first electronic device out such that it is held upright or outward. Based on the motion data collected while the arming portion of the gesture is being performed, the first or second electronic device is optionally able to determine that, from the position of the first electronic device during the arming portion, the triggering portion of the gesture comprises movement of the first electronic device towards the user's torso. In response to the detected triggering portion, the media content on the first or second device is paused. In some embodiments, after pausing the media content, the electronic device detects movement of the first electronic device left (e.g., parallel to the ground) or right (e.g., parallel to the ground). In response to detecting this movement within a predetermined amount of time (e.g., 0.5 seconds, 1 second, some other predetermined amount of time set by the device, or some other user-defined amount of time) of pausing the media content, the electronic device playing the media content optionally scrubs the media content in accordance with the detected movement. The electronic device optionally scrubs the media content forward in accordance with rightward movement of the first electronic device, and the electronic device optionally scrubs the media content backward in accordance with leftward movement of the first electronic device. In some embodiments, if the leftward/rightward movement is detected after the predetermined amount of time since pausing the media content, the electronic device playing the media content optionally does not scrub the media content in accordance with the leftward/rightward movement of the first electronic device. In some embodiments, the triggering portion of the gesture sequence for playing or pausing media content is in the same direction and the electronic device determines whether to play or pause the media content based on whether the media content is currently playing or currently paused. In other words, the same gesture causes paused media content to play and causes playing media content to pause, for example.

The above-described manner of starting and ending playback of media on the first or second electronic device in response to a motion gesture of the first electronic device allows the first electronic device to control a media player function of the first or second electronic device based on movement, which simplifies interactions between the user and the first or second electronic device and enhances the operability of the first or second electronic device (e.g., by playing or pausing the media without actuation of buttons or switches and optionally without requiring the user to navigate a user interface for playing or pausing the media), which, additionally, reduces power and improves battery life of the first electronic device and the second electronic device by enabling the user to use the first and/or second electronic device more quickly and efficiently.

In some embodiments, initiating the process to control the first electronic device or the second electronic device in accordance with the second portion of the movement gesture includes (792) in accordance with a determination that the first electronic device has a higher priority with respect to the gesture-control criteria than the second electronic device, such as the second electronic device 500*b* having higher priority 650 than the third electronic device 500*c* in FIGS. 6KK-LL, the electronic device controls (794) the first electronic device without (e.g., instead of) controlling the second electronic device, in accordance with the second portion of the movement gesture. As shown in FIG. 6LL, in response to the gesture sequence performed at the third electronic device 500*c*, the second electronic device 500*b* lowers its playback volume without the playback volume of the second electronic device 500*b* being changed. In some embodiments, although in some embodiments it is possible to control either of the first electronic device or the second electronic device with a movement gesture, if the first electronic device has a higher priority than the second electronic device in a defined (e.g., user-defined) prioritization order, the movement gesture controls an operation of the first electronic device and not the second electronic device.

In some embodiments, in accordance with a determination that the second electronic device has a higher priority with respect to the gesture-control criteria than the first electronic device, such as the third electronic device 500*c* having higher priority 650 than the second electronic device 500*b* in FIGS. 6MM-NN, the electronic device controls (796) the second electronic device without (e.g., instead of) controlling the first electronic device, in accordance with the second portion of the movement gesture. In FIG. 6NN, in response to the gesture sequence performed at the third electronic device 500*c*, the third electronic device 500*c* lowers its playback volume without the second electronic device 500*b* changing its playback volume. In some embodiments, although in some embodiments it is possible to control either of the first electronic device or the second electronic device with a movement gesture, if the second electronic device has a higher priority in a defined (e.g., user-defined) prioritization order than the first electronic device, the movement gesture controls an operation of the second electronic device and not the first electronic device. Priority is optionally determined based on one or more applications running on the first electronic device or the second electronic device (e.g., an electronic device that is being used to present media content has higher priority than an electronic device not being used to present media content, or a device that is performing an operation that is able to be controlled with a motion gesture has a higher priority than a device that is not performing an operation that is able to be controlled with a motion gesture) or based on a device-defined or user-defined priority order.

The above-described manner of prioritizing the first or second device to be controlled by the motion gesture of the first electronic device allows the electronic devices to differentiate between inputs for controlling the first electronic device and inputs for controlling the second electronic device, which simplifies interactions between the user and the first and second electronic devices and enhances the operability of the first and second electronic devices (e.g., by prioritizing the electronic devices in a way that is known to the user), which, additionally, reduces power and improves battery life of the first electronic device and the second electronic device by enabling the user to use the first and second electronic devices more quickly and efficiently.

It should be understood that the particular order in which the operations in FIGS. 7A-7J have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 7A-7J are, optionally, implemented by components depicted in FIGS. 1A-1B. For example, obtaining operation 702 and initiating operation 706 are, optionally, implemented by event sorter 170, event recognizer 180, and event handler 190. Event monitor 171 in event sorter 170 detects a motion gesture, and event dispatcher module 174 delivers the event information to application 136-1. A respective event recognizer 180 of application 136-1 compares the event information to respective event definitions 186, and determines whether a motion gesture corresponds to a predefined event or sub-event. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
    at a respective electronic device with one or more processors and memory:
        obtaining first gesture information describing a respective motion gesture performed by a first electronic device, wherein the respective motion gesture begins with a respective first portion that begins with detection of a respective attitude of the first electronic device relative to a respective frame of reference followed by detection of a respective second portion that includes movement of the first electronic device from the respective attitude of the first electronic device relative to the respective frame of reference;
        in response to detecting the respective attitude of the respective motion gesture and before detecting motion of the first electronic device corresponding to the respective motion gesture:
            in accordance with a determination that the respective attitude of the first electronic device during the respective first portion of the respective motion gesture corresponds to a first portion of a first motion gesture, generating a first indication indicating that:
                the respective attitude of the first electronic device relative to the respective frame of reference corresponds to the first portion of the first motion gesture; and
                the first electronic device is ready to detect motion of the first electronic device corresponding to the first motion gesture; and
            in accordance with a determination that the respective attitude of the first electronic device during the respective first portion of the respective motion gesture corresponds to a first portion of a second motion gesture, different from the first portion of the first motion gesture, generating a second indication indicating that:
                the respective attitude of the first electronic device relative to the respective frame of reference corresponds to the first portion of the second motion gesture, and
                the first electronic device is ready to detect motion of the first electronic device corresponding to the second motion gesture; and
        in response to obtaining the first gesture information:
            in accordance with a determination that the respective attitude of the first electronic device relative to the respective frame of reference during the respective first portion of the respective motion gesture corresponds to the first portion of the first motion gesture:
                in accordance with a determination that the respective motion gesture satisfies first gesture-control criteria that are satisfied when the movement of the first electronic device during the respective second portion of the respective motion gesture meets first movement criteria for a motion gesture that corresponds to a second portion of the first motion gesture, initiating a first process to control the first electronic device or a second electronic device in accordance with the respective second portion of the respective motion-gesture; and
                in accordance with a determination that the respective motion gesture does not satisfy the first gesture-control criteria because the movement of the first electronic device during the respective second portion of the respective motion gesture does not meet the first movement criteria for the motion gesture that corresponds to the second portion of the first motion gesture, forgoing initiating the first process; and
            in accordance with a determination that the respective attitude of the first electronic device relative to the respective frame of reference during the respective first portion of the respective motion gesture corresponds to the first portion of the second motion gesture:
                in accordance with a determination that the respective motion gesture satisfies second gesture-control criteria that are satisfied when the movement of the first electronic device during the respective second portion of the respective motion gesture meets second movement criteria for a motion gesture that corresponds to a second portion of the second motion gesture, initiating a second process, different from the first process, to control the first electronic device or the second electronic device in accordance with the respective second portion of the respective motion gesture; and in accordance with a determination that the respective motion gesture does not satisfy the second gesture-control criteria because the movement of the first electronic device during the respective second portion of the respective motion gesture does not meet the second movement criteria for the motion gesture that corresponds to the second portion of the second motion gesture, forgoing initiating the second process.

2. The method of claim 1, wherein initiating the first process to control the first electronic device or the second electronic device in accordance with the respective second portion of the respective motion gesture comprises:

in accordance with a determination that the movement of the first electronic device during the respective second portion of the respective motion gesture has a first movement profile, controlling the first electronic device or the second electronic device in a first manner; and in accordance with a determination that the movement of the first electronic device during the respective second portion of the respective motion gesture has a second movement profile, different than the first movement profile, controlling the first electronic device or the second electronic device in a second manner, different than the first manner.

3. The method of claim 2, wherein the first movement profile has a first movement magnitude, and controlling the first or second electronic device comprises controlling the first or second electronic device by a quantity that has a magnitude based on the first movement magnitude.

4. The method of claim 2, wherein the first movement profile has a first movement magnitude, and controlling the first or second electronic device comprises controlling the first or second electronic device by a quantity having a predefined magnitude, independent of the first movement magnitude.

5. The method of claim 1, wherein:

in response to detecting the respective attitude of the respective motion gesture:

in accordance with a determination that one or more criteria are satisfied, the first indication or the second indication are generated at the first electronic device; and in accordance with a determination that the one or more criteria are not satisfied, the first indication or the second indication are generated at an electronic device other than the first electronic device.

6. The method of claim 1, further comprising:

in response to obtaining the first gesture information, in accordance with the determination that the respective motion gesture satisfies the first gesture-control criteria that are satisfied when the movement of the first electronic device during the respective second portion of the respective motion gesture meets first movement criteria for the motion gesture that corresponds to the second portion of the first motion gesture, generating an indication that the respective motion gesture satisfies the first gesture-control criteria.

7. The method of claim 1, further comprising:

obtaining second gesture information describing a second respective motion gesture performed by the first electronic device, wherein the second respective motion gesture includes a respective first portion that includes movement of the first electronic device; and in response to obtaining the second gesture information:

in accordance with a determination that the second respective motion gesture includes a respective second portion, which precedes the respective first portion of the second respective motion gesture, that includes detection of the respective attitude of the first electronic device relative to the respective frame of reference, initiating a process to determine whether the second respective motion gesture satisfies the first gesture-control criteria for controlling the first electronic device or the second electronic device in accordance with the respective first portion of the second respective motion gesture; and in accordance with a determination that the second respective motion gesture does not include the respective second portion, which precedes the respective first portion of the second respective motion gesture, that includes detection of the respective attitude of the first electronic device relative to the respective frame of reference, forgoing initiating the process to determine whether the second respective motion gesture satisfies the first gesture-control criteria for controlling the first electronic device or the second electronic device.

8. The method of claim 7, wherein initiating the process to determine whether the second respective motion gesture satisfies the first gesture-control criteria for controlling the first electronic device or the second electronic device comprises, in response to obtaining the second gesture information:

in accordance with a determination that the respective first portion of the second respective motion gesture that includes the movement of the first electronic device is detected within a predefined time interval of the respective second portion of the second respective motion gesture that includes the detection of the respective attitude of the first electronic device relative to the respective frame of reference, determining whether the second respective motion gesture satisfies the first gesture-control criteria for controlling the first electronic device or the second electronic device; and in accordance with a determination that the respective first portion of the second respective motion gesture that includes the movement of the first electronic device is not detected within the predefined time interval of the respective second portion of the second respective motion gesture that includes the detection of the respective attitude of the first electronic device relative to the respective frame of reference, forgoing determining whether the second respective motion gesture satisfies the first gesture-control criteria for controlling the first electronic device or the second electronic device.

9. The method of claim 1, wherein the respective motion gesture performed by the first electronic device satisfies the first gesture-control criteria when a state of the first electronic device or the second electronic device is a first state, and the respective motion gesture performed by the first electronic device does not satisfy the first gesture-control criteria when the state of the first electronic device or the second electronic device is a second state, different than the first state.

10. The method of claim 1, wherein initiating the first process to control the first electronic device or the second electronic device in accordance with the respective second portion of the respective motion gesture comprises:
in accordance with a determination that the respective motion gesture includes a respective third portion following the respective second portion that includes detecting a second respective attitude of the first electronic device relative to the respective frame of reference, controlling the first electronic device or the second electronic device in accordance with the respective second portion of the respective motion gesture; and
in accordance with a determination that the respective motion gesture does not include a respective third portion following the respective second portion that includes detecting the second respective attitude of the first electronic device relative to the respective frame of reference, forgoing controlling the first electronic device or the second electronic device in accordance with the respective second portion of the respective motion gesture.

11. The method of claim 1, wherein initiating the first process to control the first electronic device or the second electronic device in accordance with the respective second portion of the respective motion gesture includes controlling the first electronic device in accordance with the respective second portion of the respective motion gesture.

12. The method of claim 1, wherein initiating the first process to control the first electronic device or the second electronic device in accordance with the respective second portion of the respective motion gesture includes controlling the second electronic device in accordance with the respective second portion of the respective motion gesture.

13. The method of claim 1, wherein initiating the first process to control the first electronic device or the second electronic device in accordance with the respective second portion of the respective motion gesture includes:
in accordance with a determination that a direction of the movement of the first electronic device in the respective second portion of the respective motion gesture is a first direction, increasing a volume of the first electronic device or the second electronic device; and
in accordance with a determination that the direction of the movement of the first electronic device in the respective second portion of the respective motion gesture is a second direction, different than the first direction, decreasing the volume of the first electronic device or the second electronic device.

14. The method of claim 1, wherein initiating the first process to control the first electronic device or the second electronic device in accordance with the respective second portion of the respective motion gesture includes:
in accordance with a determination that a direction of the movement of the first electronic device in the respective second portion of the respective motion gesture is a first direction, performing a backward skip operation with respect to media at the first electronic device or the second electronic device; and
in accordance with a determination that the direction of the movement of the first electronic device in the respective second portion of the respective motion gesture is a second direction, different than the first direction, performing a forward skip operation with respect to the media at the first electronic device or the second electronic device.

15. The method of claim 1, wherein initiating the first process to control the first electronic device or the second electronic device in accordance with the respective second portion of the respective motion gesture includes:
in accordance with a determination that a direction of the movement of the first electronic device in the respective second portion of the respective motion gesture is a first direction, starting playback of media at the first electronic device or the second electronic device; and
in accordance with a determination that the direction of the movement of the first electronic device in the respective second portion of the respective motion gesture is a second direction, different than the first direction, ending playback of the media at the first electronic device or the second electronic device.

16. The method of claim 1, wherein initiating the first process to control the first electronic device or the second electronic device in accordance with the respective second portion of the respective motion gesture includes:
in accordance with a determination that the first electronic device has a higher priority with respect to the first gesture-control criteria than the second electronic device, controlling the first electronic device without controlling the second electronic device, in accordance with the respective second portion of the respective motion gesture; and
in accordance with a determination that the second electronic device has a higher priority with respect to the first gesture-control criteria than the first electronic device, controlling the second electronic device without controlling the first electronic device, in accordance with the respective second portion of the respective motion gesture.

17. A respective electronic device, comprising:
one or more processors;
memory; and
one or more programs, wherein the one or more programs are stored in the memory and configured to be executed by the one or more processors, the one or more programs including instructions for:
obtaining first gesture information describing a respective motion gesture performed by a first electronic device, wherein the respective motion gesture begins with a respective first portion that begins with detection of a respective attitude of the first electronic device relative to a respective frame of reference followed by detection of a respective second portion that includes movement of the first electronic device from the respective attitude of the first electronic device relative to the respective frame of reference;
in response to detecting the respective attitude of the respective motion gesture and before detecting motion of the first electronic device corresponding to the respective motion gesture:
in accordance with a determination that the respective attitude of the first electronic device during the respective first portion of the respective motion gesture corresponds to a first portion of a first motion gesture, generating a first indication indicating that:
the respective attitude of the first electronic device relative to the respective frame of reference corresponds to the first portion of the first motion gesture, and the first electronic device is ready to detect motion of the first electronic device corresponding to the first motion gesture; and in accordance with a determination that the respective attitude of the first electronic device during the respective first portion of the respective motion gesture corresponds to a first portion of a second motion gesture, different from the first portion of the first motion gesture, generating a second indication indicating that:

the respective attitude of the first electronic device relative to the respective frame of reference corresponds to the first portion of the second motion gesture, and the first electronic device is ready to detect motion of the first electronic device corresponding to the second motion gesture; and in response to obtaining the first gesture information:

in accordance with a determination that the respective attitude of the first electronic device relative to the respective frame of reference during the respective first portion of the respective motion gesture corresponds to the first portion of the first motion gesture:

in accordance with a determination that the respective motion gesture satisfies first gesture-control criteria that are satisfied when the movement of the first electronic device during the respective second portion of the respective motion gesture meets first movement criteria for a motion gesture that corresponds to a second portion of the first motion gesture, initiating a first process to control the first electronic device or a second electronic device in accordance with the respective second portion of the respective motion gesture; and in accordance with a determination that the respective motion gesture does not satisfy the first gesture-control criteria because the movement of the first electronic device during the respective second portion of the respective motion gesture does not meet the first movement criteria for the motion gesture that corresponds to the second portion of the first motion gesture, forgoing initiating the first process; and in accordance with a determination that the respective attitude of the first electronic device relative to the respective frame of reference during the respective first portion of the respective motion gesture corresponds to the first portion of the second motion gesture:

in accordance with a determination that the respective motion gesture satisfies second gesture-control criteria that are satisfied when the movement of the first electronic device during the respective second portion of the respective motion gesture meets second movement criteria for a motion gesture that corresponds to a second portion of the second motion gesture, initiating a second process, different from the first process, to control the first electronic device or the second electronic device in accordance with the respective second portion of the respective motion gesture; and in accordance with a determination that the respective motion gesture does not satisfy the second gesture-control criteria because the movement of the first electronic device during the respective second portion of the respective motion gesture does not meet the second movement criteria for the motion gesture that corresponds to the second portion of the second motion gesture, forgoing initiating the second process.

18. The respective electronic device of claim 17, wherein initiating the first process to control the first electronic device or the second electronic device in accordance with the respective second portion of the respective motion gesture comprises:

in accordance with a determination that the movement of the first electronic device during the respective second portion of the respective motion gesture has a first movement profile, controlling the first electronic device or the second electronic device in a first manner; and in accordance with a determination that the movement of the first electronic device during the respective second portion of the respective motion gesture has a second movement profile, different than the first movement profile, controlling the first electronic device or the second electronic device in a second manner, different than the first manner.

19. The respective electronic device of claim 18, wherein the first movement profile has a first movement magnitude, and controlling the first or second electronic device comprises controlling the first or second electronic device by a quantity that has a magnitude based on the first movement magnitude.

20. The respective electronic device of claim 18, wherein the first movement profile has a first movement magnitude, and controlling the first or second electronic device comprises controlling the first or second electronic device by a quantity having a predefined magnitude, independent of the first movement magnitude.

21. The respective electronic device of claim 17, wherein:

in response to detecting the respective attitude of the respective motion gesture:

in accordance with a determination that one or more criteria are satisfied, the first indication or the second indication are generated at the first electronic device; and in accordance with a determination that the one or more criteria are not satisfied, the first indication or the second indication are generated at an electronic device other than the first electronic device.

22. The respective electronic device of claim 17, the one or more programs including instructions further for:

in response to obtaining the first gesture information, in accordance with the determination that the respective motion gesture satisfies the first gesture-control criteria that are satisfied when the movement of the first electronic device during the respective second portion of the respective motion gesture meets first movement criteria for the motion gesture that corresponds to the second portion of the first motion gesture, generating an indication that the respective motion gesture satisfies the first gesture-control criteria.

23. The respective electronic device of claim 17, the one or more programs including instructions further for:

obtaining second gesture information describing a second respective motion gesture performed by the first electronic device, wherein the second respective motion gesture includes a respective first portion that includes movement of the first electronic device; and in response to obtaining the second gesture information:

in accordance with a determination that the second respective motion gesture includes a respective second portion, which precedes the respective first portion of the second respective motion gesture, that includes detection of the respective attitude of the first electronic device relative to the respective frame of reference, initiating a process to determine whether the second respective motion gesture satisfies the first gesture-control criteria for controlling the first electronic device or the second electronic device in accordance with the respective first portion of the second respective motion gesture; and in accordance with a determination that the second respective motion gesture does not include the respective second portion, which precedes the respective first portion of the second respective motion gesture, that includes detection of the respective attitude of the first electronic device relative to the respective frame of reference, forgoing initiating the process to determine whether the second respective motion gesture satisfies the first gesture-control criteria for controlling the first electronic device or the second electronic device.

24. The respective electronic device of claim 23, wherein initiating the process to determine whether the second respective motion gesture satisfies the first gesture-control criteria for controlling the first electronic device or the second electronic device comprises, in response to obtaining the second gesture information:

in accordance with a determination that the respective first portion of the second respective motion gesture that includes the movement of the first electronic device is detected within a predefined time interval of the respective second portion of the second respective motion gesture that includes the detection of the respective attitude of the first electronic device relative to the respective frame of reference, determining whether the second respective motion gesture satisfies the first gesture-control criteria for controlling the first electronic device or the second electronic device; and in accordance with a determination that the respective first portion of the second respective motion gesture that includes the movement of the first electronic device is not detected within the predefined time interval of the respective second portion of the second respective motion gesture that includes the detection of the respective attitude of the first electronic device relative to the respective frame of reference, forgoing determining whether the second respective motion gesture satisfies the first gesture-control criteria for controlling the first electronic device or the second electronic device.

25. The respective electronic device of claim 17, wherein the respective motion gesture performed by the first electronic device satisfies the first gesture-control criteria when a state of the first electronic device or the second electronic device is a first state, and the respective motion gesture performed by the first electronic device does not satisfy the first gesture-control criteria when the state of the first electronic device or the second electronic device is a second state, different than the first state.

26. The respective electronic device of claim 17, wherein initiating the first process to control the first electronic device or the second electronic device in accordance with the respective second portion of the respective motion gesture comprises:

in accordance with a determination that the respective motion gesture includes a respective third portion following the respective second portion that includes detecting a second respective attitude of the first electronic device relative to the respective frame of reference, controlling the first electronic device or the second electronic device in accordance with the respective second portion of the respective motion gesture; and in accordance with a determination that the respective motion gesture does not include a respective third portion following the respective second portion that includes detecting the second respective attitude of the first electronic device relative to the respective frame of reference, forgoing controlling the first electronic device or the second electronic device in accordance with the respective second portion of the respective motion gesture.

27. The respective electronic device of claim 17, wherein initiating the first process to control the first electronic device or the second electronic device in accordance with the respective second portion of the respective motion gesture includes controlling the first electronic device in accordance with the respective second portion of the respective motion gesture.

28. The respective electronic device of claim 17, wherein initiating the first process to control the first electronic device or the second electronic device in accordance with the respective second portion of the respective motion gesture includes controlling the second electronic device in accordance with the respective second portion of the respective motion gesture.

29. The respective electronic device of claim 17, wherein initiating the first process to control the first electronic device or the second electronic device in accordance with the respective second portion of the respective motion gesture includes:

in accordance with a determination that a direction of the movement of the first electronic device in the respective second portion of the respective motion gesture is a first direction, increasing a volume of the first electronic device or the second electronic device; and in accordance with a determination that the direction of the movement of the first electronic device in the respective second portion of the respective motion gesture is a second direction, different than the first direction, decreasing the volume of the first electronic device or the second electronic device.

30. The respective electronic device of claim 17, wherein initiating the first process to control the first electronic device or the second electronic device in accordance with the respective second portion of the respective motion gesture includes:

in accordance with a determination that a direction of the movement of the first electronic device in the respective second portion of the respective motion gesture is a first direction, performing a backward skip operation with respect to media at the first electronic device or the second electronic device; and in accordance with a determination that the direction of the movement of the first electronic device in the respective second portion of the respective motion gesture is a second direction, different than the first direction, performing a forward skip operation with respect to the media at the first electronic device or the second electronic device.

31. The respective electronic device of claim 17, wherein initiating the first process to control the first electronic device or the second electronic device in accordance with the respective second portion of the respective motion gesture includes:

in accordance with a determination that a direction of the movement of the first electronic device in the respective second portion of the respective motion gesture is a first direction, starting playback of media at the first electronic device or the second electronic device; and in accordance with a determination that the direction of the movement of the first electronic device in the respective second portion of the respective motion gesture is a second direction, different than the first direction, ending playback of the media at the first electronic device or the second electronic device.

32. The respective electronic device of claim 17, wherein initiating the first process to control the first electronic device or the second electronic device in accordance with the respective second portion of the respective motion gesture includes:

in accordance with a determination that the first electronic device has a higher priority with respect to the first gesture-control criteria than the second electronic device, controlling the first electronic device without controlling the second electronic device, in accordance with the respective second portion of the respective motion gesture; and in accordance with a determination that the second electronic device has a higher priority with respect to the first gesture-control criteria than the first electronic device, controlling the second electronic device without controlling the first electronic device, in accordance with the respective second portion of the respective motion gesture.

33. A non-transitory computer readable storage medium storing one or more programs, the one or more programs comprising instructions, which when executed by one or more processors of a respective electronic device, cause the respective electronic device to:

obtain first gesture information describing a respective motion gesture performed by a first electronic device, wherein the respective motion gesture begins with a respective first portion that begins with detection of a respective attitude of the first electronic device relative to a respective frame of reference followed by detection of a respective second portion that includes movement of the first electronic device from the respective attitude of the first electronic device relative to the respective frame of reference;

in response to detecting the respective attitude of the respective motion gesture and before detecting motion of the first electronic device corresponding to the respective motion gesture:

in accordance with a determination that the respective attitude of the first electronic device during the respective first portion of the respective motion gesture corresponds to a first portion of a first motion gesture, generate a first indication indicating that:

the respective attitude of the first electronic device relative to the respective frame of reference corresponds to the first portion of the first motion gesture, and the first electronic device is ready to detect motion of the first electronic device corresponding to the first motion gesture; and in accordance with a determination that the respective attitude of the first electronic device during the respective first portion of the respective motion gesture corresponds to a first portion of a second motion gesture, different from the first portion of the first motion gesture, generate a second indication indicating that:

the respective attitude of the first electronic device relative to the respective frame of reference corresponds to the first portion of the second motion gesture, and the first electronic device is ready to detect motion of the first electronic device corresponding to the second motion gesture; and in response to obtaining the first gesture information:

in accordance with a determination that the respective attitude of the first electronic device relative to the respective frame of reference during the respective first portion of the respective motion gesture corresponds to the first portion of the first motion gesture:

in accordance with a determination that the respective motion gesture satisfies first gesture-control criteria that are satisfied when the movement of the first electronic device during the respective second portion of the respective motion gesture meets first movement criteria for a motion gesture that corresponds to a second portion of the first motion gesture, initiate a first process to control the first electronic device or a second electronic device in accordance with the respective second portion of the respective motion gesture; and in accordance with a determination that the respective motion gesture does not satisfy the first gesture-control criteria because the movement of the first electronic device during the respective second portion of the respective motion gesture does not meet the first movement criteria for the motion gesture that corresponds to the second portion of the first motion gesture, forgo initiating the first process; and in accordance with a determination that the respective attitude of the first electronic device relative to the respective frame of reference during the respective first portion of the respective motion gesture corresponds to the first portion of the second motion gesture:

in accordance with a determination that the respective motion gesture satisfies second gesture-control criteria that are satisfied when the movement of the first electronic device during the respective second portion of the respective motion gesture meets second movement criteria for a motion gesture that corresponds to a second portion of the second motion gesture, initiate a second process, different from the first process, to control the first electronic device or the second electronic device in accordance with the respective second portion of the respective motion gesture; and in accordance with a determination that the respective motion gesture does not satisfy the second gesture-control criteria because the movement of the first electronic device during the respective second portion of the respective motion gesture does not meet the second movement criteria for the motion gesture that corresponds to the second portion of the second motion gesture, forgo initiating the second process.

34. The non-transitory computer readable storage medium of claim 33, wherein initiating the first process to control the first electronic device or the second electronic device in accordance with the respective second portion of the respective motion gesture comprises:

in accordance with a determination that the movement of the first electronic device during the respective second portion of the respective motion gesture has a first movement profile, controlling the first electronic device or the second electronic device in a first manner; and in accordance with a determination that the movement of the first electronic device during the respective second portion of the respective motion gesture has a second movement profile, different than the first movement profile, controlling the first electronic device or the second electronic device in a second manner, different than the first manner.

35. The non-transitory computer readable storage medium of claim 34, wherein the first movement profile has a first movement magnitude, and controlling the first or second electronic device comprises controlling the first or second electronic device by a quantity that has a magnitude based on the first movement magnitude.

36. The non-transitory computer readable storage medium of claim 34, wherein the first movement profile has a first movement magnitude, and controlling the first or second electronic device comprises controlling the first or second electronic device by a quantity having a predefined magnitude, independent of the first movement magnitude.

37. The non-transitory computer readable storage medium of claim 33, wherein:

in response to detecting the respective attitude of the respective motion gesture:
  in accordance with a determination that one or more criteria are satisfied, the first indication or the second indication are generated at the first electronic device; and
  in accordance with a determination that the one or more criteria are not satisfied, the first indication or the second indication are generated at an electronic device other than the first electronic device.

38. The non-transitory computer readable storage medium of claim 33, wherein when executed by the one or more processors of the respective electronic device, the instructions further cause the respective electronic device to:

in response to obtaining the first gesture information, in accordance with the determination that the respective motion gesture satisfies the first gesture-control criteria that are satisfied when the movement of the first electronic device during the respective second portion of the respective motion gesture meets first movement criteria for the motion gesture that corresponds to the second portion of the first motion gesture, generate an indication that the respective motion gesture satisfies the first gesture-control criteria.

39. The non-transitory computer readable storage medium of claim 33, wherein when executed by the one or more processors of the respective electronic device, the instructions further cause the respective electronic device to:

obtain second gesture information describing a second respective motion gesture performed by the first electronic device, wherein the second respective motion gesture includes a respective first portion that includes movement of the first electronic device; and
in response to obtaining the second gesture information:
  in accordance with a determination that the second respective motion gesture includes a respective second portion, which precedes the respective first portion of the second respective motion gesture, that includes detection of the respective attitude of the first electronic device relative to the respective frame of reference, initiate a process to determine whether the second respective motion gesture satisfies the first gesture-control criteria for controlling the first electronic device or the second electronic device in accordance with the respective first portion of the second respective motion gesture; and
  in accordance with a determination that the second respective motion gesture does not include the respective second portion, which precedes the respective first portion of the second respective motion gesture, that includes detection of the respective attitude of the first electronic device relative to the respective frame of reference, forgo initiating the process to determine whether the second respective motion gesture satisfies the first gesture-control criteria for controlling the first electronic device or the second electronic device.

40. The non-transitory computer readable storage medium of claim 39, wherein initiating the process to determine whether the second respective motion gesture satisfies the first gesture-control criteria for controlling the first electronic device or the second electronic device comprises, in response to obtaining the second gesture information:

in accordance with a determination that the respective first portion of the second respective motion gesture that includes the movement of the first electronic device is detected within a predefined time interval of the respective second portion of the second respective motion gesture that includes the detection of the respective attitude of the first electronic device relative to the respective frame of reference, determining whether the second respective motion gesture satisfies the first gesture-control criteria for controlling the first electronic device or the second electronic device; and
in accordance with a determination that the respective first portion of the second respective motion gesture that includes the movement of the first electronic device is not detected within the predefined time interval of the respective second portion of the second respective motion gesture that includes the detection of the respective attitude of the first electronic device relative to the respective frame of reference, forgoing determining whether the second respective motion gesture satisfies the first gesture-control criteria for controlling the first electronic device or the second electronic device.

41. The non-transitory computer readable storage medium of claim 33, wherein the respective motion gesture performed by the first electronic device satisfies the first gesture-control criteria when a state of the first electronic device or the second electronic device is a first state, and the respective motion gesture performed by the first electronic device does not satisfy the first gesture-control criteria when the state of the first electronic device or the second electronic device is a second state, different than the first state.

42. The non-transitory computer readable storage medium of claim 33, wherein initiating the first process to control the first electronic device or the second electronic device in accordance with the respective second portion of the respective motion gesture comprises:

in accordance with a determination that the respective motion gesture includes a respective third portion following the respective second portion that includes detecting a second respective attitude of the first electronic device relative to the respective frame of reference, controlling the first electronic device or the second electronic device in accordance with the respective second portion of the respective motion gesture; and
in accordance with a determination that the respective motion gesture does not include a respective third portion following the respective second portion that includes detecting the second respective attitude of the first electronic device relative to the respective frame of reference, forgoing controlling the first electronic device or the second electronic device in accordance with the respective second portion of the respective motion gesture.

43. The non-transitory computer readable storage medium of claim 33, wherein initiating the first process to control the first electronic device or the second electronic device in accordance with the respective second portion of the respective motion gesture includes controlling the first electronic device in accordance with the respective second portion of the respective motion gesture.

44. The non-transitory computer readable storage medium of claim 33, wherein initiating the first process to control the first electronic device or the second electronic device in accordance with the respective second portion of the respective motion gesture includes controlling the second electronic device in accordance with the respective second portion of the respective motion gesture.

45. The non-transitory computer readable storage medium of claim 33, wherein initiating the first process to control the first electronic device or the second electronic device in accordance with the respective second portion of the respective motion gesture includes:
in accordance with a determination that a direction of the movement of the first electronic device in the respective second portion of the respective motion gesture is a first direction, increasing a volume of the first electronic device or the second electronic device; and
in accordance with a determination that the direction of the movement of the first electronic device in the respective second portion of the respective motion gesture is a second direction, different than the first direction, decreasing the volume of the first electronic device or the second electronic device.

46. The non-transitory computer readable storage medium of claim 33, wherein initiating the first process to control the first electronic device or the second electronic device in accordance with the respective second portion of the respective motion gesture includes:
in accordance with a determination that a direction of the movement of the first electronic device in the respective second portion of the respective motion gesture is a first direction, performing a backward skip operation with respect to media at the first electronic device or the second electronic device; and
in accordance with a determination that the direction of the movement of the first electronic device in the respective second portion of the respective motion gesture is a second direction, different than the first direction, performing a forward skip operation with respect to the media at the first electronic device or the second electronic device.

47. The non-transitory computer readable storage medium of claim 33, wherein initiating the first process to control the first electronic device or the second electronic device in accordance with the respective second portion of the respective motion gesture includes:
in accordance with a determination that a direction of the movement of the first electronic device in the respective second portion of the respective motion gesture is a first direction, starting playback of media at the first electronic device or the second electronic device; and
in accordance with a determination that the direction of the movement of the first electronic device in the respective second portion of the respective motion gesture is a second direction, different than the first direction, ending playback of the media at the first electronic device or the second electronic device.

48. The non-transitory computer readable storage medium of claim 33, wherein initiating the first process to control the first electronic device or the second electronic device in accordance with the respective second portion of the respective motion gesture includes:
in accordance with a determination that the first electronic device has a higher priority with respect to the first gesture-control criteria than the second electronic device, controlling the first electronic device without controlling the second electronic device, in accordance with the respective second portion of the respective motion gesture; and
in accordance with a determination that the second electronic device has a higher priority with respect to the first gesture-control criteria than the first electronic device, controlling the second electronic device without controlling the first electronic device, in accordance with the respective second portion of the respective motion gesture.

* * * * *